(12) United States Patent
Kozuka et al.

(10) Patent No.: US 12,395,691 B2
(45) Date of Patent: Aug. 19, 2025

(54) VIDEO DISPLAY SYSTEM AND VIDEO DISPLAY METHOD

(71) Applicant: Panasonic Intellectual Property Management Co., Ltd., Osaka (JP)

(72) Inventors: Masayuki Kozuka, Tokyo (JP); Yoshihiro Mori, Osaka (JP); Junya Suzuki, Kyoto (JP); Yoshiichiro Kashiwagi, Kyoto (JP); Yasutoshi Yamamoto, Osaka (JP); Toshiro Nishio, Osaka (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 0 days.

(21) Appl. No.: 18/286,357

(22) PCT Filed: Apr. 18, 2022

(86) PCT No.: PCT/JP2022/018089
§ 371 (c)(1),
(2) Date: Oct. 10, 2023

(87) PCT Pub. No.: WO2022/220308
PCT Pub. Date: Oct. 20, 2022

(65) Prior Publication Data
US 2024/0196062 A1    Jun. 13, 2024

Related U.S. Application Data

(60) Provisional application No. 63/176,004, filed on Apr. 16, 2021.

(51) Int. Cl.
*H04N 21/218* (2011.01)
*G02B 27/01* (2006.01)
(Continued)

(52) U.S. Cl.
CPC ..... *H04N 21/4316* (2013.01); *G02B 27/0172* (2013.01); *G06F 3/011* (2013.01);
(Continued)

(58) Field of Classification Search
CPC ......... H04N 21/4316; H04N 21/21805; H04N 21/2353; H04N 21/439; H04N 21/472;
(Continued)

(56) References Cited

U.S. PATENT DOCUMENTS 9,794,514 B1\* 10/2017 Yoakum ................ H04M 3/564
9,911,238 B2    3/2018 Doronichev et al.
(Continued)

FOREIGN PATENT DOCUMENTS

CA    3032295 A1    2/2018
EP    3793259 A1    3/2021
(Continued)

OTHER PUBLICATIONS

Extended European Search Report dated Aug. 27, 2024 issued in the corresponding European Patent Application No. 22788231.3.
(Continued)

*Primary Examiner* — Alazar Tilahun
(74) *Attorney, Agent, or Firm* — Rimon P.C.

(57) ABSTRACT

A video display system includes: a VR system including a display that displays a VR space to a participant who participates in a VR experience, and an audio processor that receives and outputs voice; an explainer terminal that receives and outputs voice from and to an explainer who provides an explanation to the participant in the VR space; a video distributor that distributes a 360-degree video for the VR space to the VR system; an audio conversation unit that assists an audio conversation between the participant and the explainer; and a controller that manages an operation mode that selectively takes a first state in which questions from the
(Continued)

participant to the explainer are not allowed, a second state in which questions are allowed, and a third state in which a question is being asked, and causes the VR system to display information specifying the operation mode on the display.

24 Claims, 39 Drawing Sheets

(51) Int. Cl.

| | | |
|---|---|---|
| G06F 3/01 | (2006.01) | |
| G06F 40/58 | (2020.01) | |
| G06T 5/50 | (2006.01) | |
| G06T 7/20 | (2017.01) | |
| G06T 15/00 | (2011.01) | |
| G06T 17/00 | (2006.01) | |
| G09G 5/36 | (2006.01) | |
| H04N 21/235 | (2011.01) | |
| H04N 21/431 | (2011.01) | |
| H04N 21/439 | (2011.01) | |
| H04N 21/472 | (2011.01) | |
| H04N 21/4788 | (2011.01) | |
| H04N 21/81 | (2011.01) | |

(52) U.S. Cl.
CPC .............. *G06F 3/013* (2013.01); *G06F 40/58* (2020.01); *G06T 5/50* (2013.01); *G06T 7/20* (2013.01); *G06T 15/00* (2013.01); *G06T 17/00* (2013.01); *G09G 5/36* (2013.01); *H04N 21/21805* (2013.01); *H04N 21/2353* (2013.01); *H04N 21/439* (2013.01); *H04N 21/472* (2013.01); *H04N 21/4788* (2013.01); *H04N 21/8106* (2013.01); *H04N 21/816* (2013.01); *G06T 2207/20221* (2013.01)

(58) Field of Classification Search
CPC ........... H04N 21/4788; H04N 21/8106; H04N 21/816; H04N 7/183; H04N 21/4312; H04N 21/4728; G06F 3/013; G06F 40/58; G06T 5/50; G06T 7/20; G06T 15/00; G06T 17/00; G06T 2207/20221; G06Q 30/0643; G06Q 50/01; G06Q 50/10; G06Q 90/20; G09G 5/37
See application file for complete search history.

(56) References Cited

U.S. PATENT DOCUMENTS

| | | |
|---|---|---|
| 2013/0038692 A1 | 2/2013 | Ohtomo et al. |
| 2016/0117853 A1 | 4/2016 | Zhong et al. |
| 2016/0300392 A1 | 10/2016 | Jonczyk et al. |
| 2016/0350977 A1* | 12/2016 | Doronichev ............ H04W 4/21 |
| 2017/0061231 A1 | 3/2017 | Higa |
| 2017/0061813 A1 | 3/2017 | Tao et al. |
| 2017/0142486 A1 | 5/2017 | Masuda |
| 2017/0329144 A1 | 11/2017 | Usami |
| 2018/0196425 A1 | 7/2018 | Kobayashi |
| 2018/0249148 A1 | 8/2018 | Roulet et al. |
| 2019/0005283 A1 | 1/2019 | Nikitin et al. |
| 2019/0052838 A1 | 2/2019 | Ashkenazi et al. |
| 2019/0139430 A1 | 5/2019 | Ghatage et al. |
| 2019/0250601 A1 | 8/2019 | Donahoe et al. |
| 2019/0266424 A1 | 8/2019 | Nishimura et al. |
| 2020/0160740 A1* | 5/2020 | Nedivi ..................... G09B 7/00 |
| 2020/0218072 A1 | 7/2020 | Inatani et al. |
| 2020/0341714 A1 | 10/2020 | Yuasa et al. |
| 2020/0363866 A1 | 11/2020 | Gerard et al. |
| 2021/0225017 A1 | 7/2021 | Holzer et al. |

FOREIGN PATENT DOCUMENTS

| | | |
|---|---|---|
| JP | 2002-169901 A | 6/2002 |
| JP | 2007-207260 A | 8/2007 |
| JP | 2012-010418 A | 1/2012 |
| JP | 2013-038622 A | 2/2013 |
| JP | 2015-005967 A | 1/2015 |
| JP | 2016-090773 A | 5/2016 |
| JP | 2018-112809 A | 7/2018 |
| JP | 2019-503612 A | 2/2019 |
| JP | 2019-036025 A | 3/2019 |
| JP | 2019-075075 A | 5/2019 |
| JP | 2019-149016 A | 9/2019 |
| JP | 2019-164216 A | 9/2019 |
| JP | 2019-195169 A | 11/2019 |
| JP | 2019-197939 A | 11/2019 |
| JP | 6727388 B2 | 7/2020 |
| JP | 2020-120388 A | 8/2020 |
| JP | 2020-176995 A | 10/2020 |
| WO | 2015/170461 A1 | 11/2015 |
| WO | 2016/009864 A1 | 1/2016 |
| WO | 2017/108668 A1 | 6/2017 |
| WO | 2019/150675 A1 | 8/2019 |
| WO | 2020/116493 A1 | 6/2020 |

OTHER PUBLICATIONS

Extended European Search Report dated Sep. 10, 2024 issued in the corresponding European Patent Application No. 22788228.9.
Extended European Search Report dated Sep. 12, 2024 issued in the corresponding European Patent Application No. 22788230.5.
Extended European Search Report dated Sep. 18, 2024 issued in the corresponding European Patent Application No. 22788229.7.
International Search Report issued on Jun. 28, 2022 in International Patent Application No. PCT/JP2022/018089, with English translation.
International Search Report issued on Jul. 5, 2022 in International Patent Application No. PCT/JP2022/018087, with English translation.
International Search Report issued on Jul. 5, 2022 in International Patent Application No. PCT/JP2022/018088, with English translation.
International Search Report issued on Jun. 28, 2022 in International Patent Application No. PCT/JP2022/018086, with English translation.
Office Action dated Dec. 24, 2024 issued in the corresponding Japanese Patent Application No. 2023-514694, w/ English Translation.
Office Action mailed on Feb. 26, 2025 for the corresponding U.S. Appl. No. 18/286,346.
Office Action mailed on Apr. 2, 2025 for the corresponding U.S. Appl. No. 18/286,353.

* cited by examiner

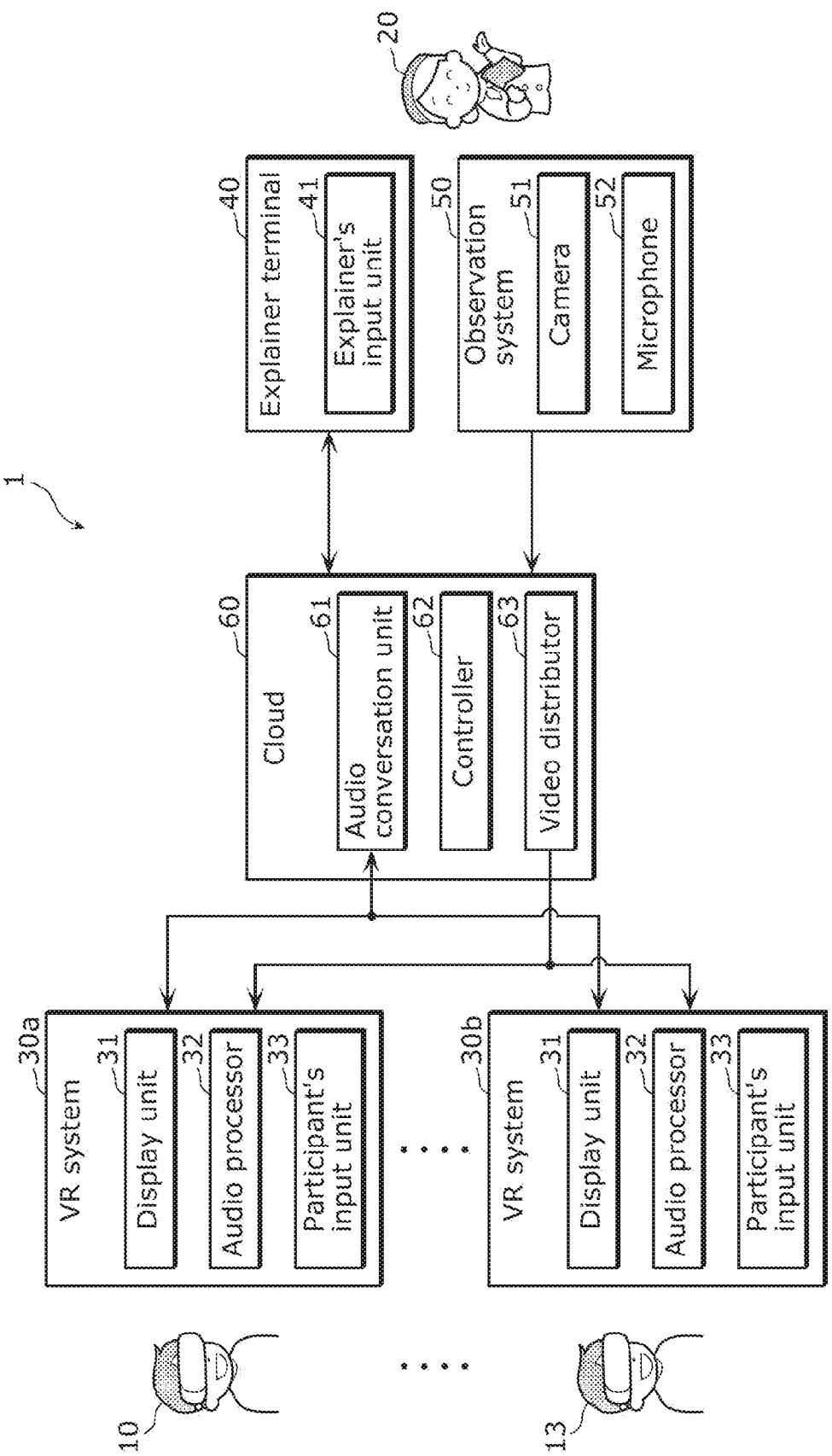

VIDEO DISPLAY SYSTEM AND VIDEO DISPLAY METHOD

CROSS-REFERENCE OF RELATED APPLICATIONS

This application is the U.S. National Phase under 35 U.S.C. § 371 of International Patent Application No. PCT/JP2022/018089, filed on Apr. 18, 2022, which in turn claims the benefit of U.S. Provisional Patent Application No. 63/176,004, filed on Apr. 16, 2021, the entire disclosures of which Applications are incorporated by reference herein.

TECHNICAL FIELD

The present invention relates to video display systems and video display methods, and particularly relates to video display systems that provide services for an experience of a virtual reality (VR).

BACKGROUND ART

Conventionally, various techniques have been proposed as video display systems that provide a service for experiencing VR (virtual reality) (see, for example, Patent Literature (PTL) 1 and PTL 2).

PTL 1 proposes an at-home travel system which can give a remote user, by providing the remote user with a present actual situation of a tourist destination of choice in the form of real-time video, an impression and a realistic sensation as if the remote user is actually visiting the tourist destination.

In addition, PTL 2 proposes an information processing device related to point-of-view control of a participant in sightseeing using VR.

CITATION LIST

Patent Literature

[PTL 1] Japanese Unexamined Patent Application Publication No. 2012-10418
[PTL 2] WO2019/150675

SUMMARY OF INVENTION

Technical Problem

However, the techniques described in PTL 1 and PTL 2 are premised on the participants having high ICT (information and communication technology) competence and have a problem in that not everyone can readily participate.

In consideration thereof, an object of the present disclosure is to provide a video display system and a video display method in which everyone can readily participate.

Solution to Problem

To achieve the above object, a video display system according to one embodiment of the present disclosure is a video display system that provides a service for an experience of a virtual reality (VR), and includes: a VR system including a display that displays a VR space that is a video for the VR to a participant who participates in the experience, and an audio processor that receives and outputs voice from and to the participant; an explainer terminal that receives and outputs voice from and to an explainer, the explainer providing an explanation for the experience to the participant in the VR space; a video distributor that distributes a 360-degree video for generating the VR space to the VR system; an audio conversation unit that assists an audio conversation between the participant and the explainer via the VR system and the explainer terminal; and a controller that controls at least one of the VR system, the explainer terminal, the video distributor, or the audio conversation unit. The controller manages an operation mode that selectively takes a first state in which a question from the participant to the explainer is not allowed, a second state in which the question is allowed, and a third state in which the question is being asked, and causes the VR system to display information specifying the operation mode on the display.

To achieve the above object, a video display method according to one embodiment of the present disclosure is a video display method performed by a video display system that provides a service for an experience of a virtual reality (VR), and includes: a VR system including a display that displays a VR space that is a video for the VR to a participant who participates in the experience, and an audio processor that receives and outputs voice from and to the participant; an explainer terminal that receives and outputs voice from and to an explainer, the explainer providing an explanation for the experience to the participant in the VR space; a video distributor that distributes a 360-degree video for generating the VR space to the VR system; and an audio conversation unit that assists an audio conversation between the participant and the explainer via the VR system and the explainer terminal. The video display method includes: managing an operation mode that selectively takes a first state in which a question from the participant to the explainer is not allowed, a second state in which the question is allowed, and a third state in which the question is being asked, and causing the VR system to display information specifying the operation mode on the display.

Advantageous Effects of Invention

The present disclosure provides a video display system and a video display method in which everyone can readily participate.

BRIEF DESCRIPTION OF DRAWINGS

FIG. 2A is a block diagram illustrating a configuration of a video display system according to an embodiment.

DESCRIPTION OF EMBODIMENTS (Knowledge Obtained by the Inventors)

VR tourism services which realize virtual experiences such as going on a sightseeing tour, attending a trade show, making an inspection tour, going on a factory tour, visiting an art museum, a museum, a zoo, an aquarium, or the like without actually being on-site are gaining momentum.

In a VR tourism service, it is important from the perspective of a tourism experience that a plurality of visitors use a VR system to participate in a VR space of a destination and listen to an explanation on the destination provided by a human (or avatar) tour guide (leader) or ask the guide questions as if on an actual sightseeing tour. Simply listening to an explanation provided by the guide in a one-sided manner is no different than viewing a tourism VR program on YouTube (registered trademark) or the like. It is difficult to charge for such a level of service due to a lack of appeal. What is crucially important to a VR tourism service is that an interactive trip experience involving listening to an explanation provided by a guide with expertise or an expert and having the guide or the expert answer questions be provided.

Since participants in a VR tourism service are people with a wide range of experiences, ICT competence, characteristics, languages, and the like and include both young and old as well as foreigners, it is important to provide a service satisfying requirements such as those presented below.

To this end, support including (1) a user interface that anybody can readily use, (2) coping with bad-mannered participants, (3) private conversations between friends, and (4) accommodating a plurality of languages and accommodating a plurality of guides is required.

In order to solve each of the four problems described above, the VR tourism system according to the present disclosure can provide a VR tourism system in which anyone can readily participate by using a 360-degree video distribution system and a digital audio conference unit and realizing means that allows VR tourism participants and guides to respectively operate three states with a simple UI (user interface) constituted of one button. In other words, based on a VR tourism system that solves the problem described in (1) above, the problems described in (2) to (4) above have been solved by adding various additional functions to such a VR tourism system. Accordingly, since a service by a simple UI in which anybody from the elderly to children can participate without knowledge of ICT can be realized in VR tourism, VR tourism can be enjoyed just like real sightseeing.

Note that the VR tourism system according to the present disclosure need not necessarily solve all of the four problems described above and need only solve at least one of the problems (1) to (4) described above as a video display system in which anyone can readily participate.

(VR Tourism System According to Reference Example)

Figure 1A:
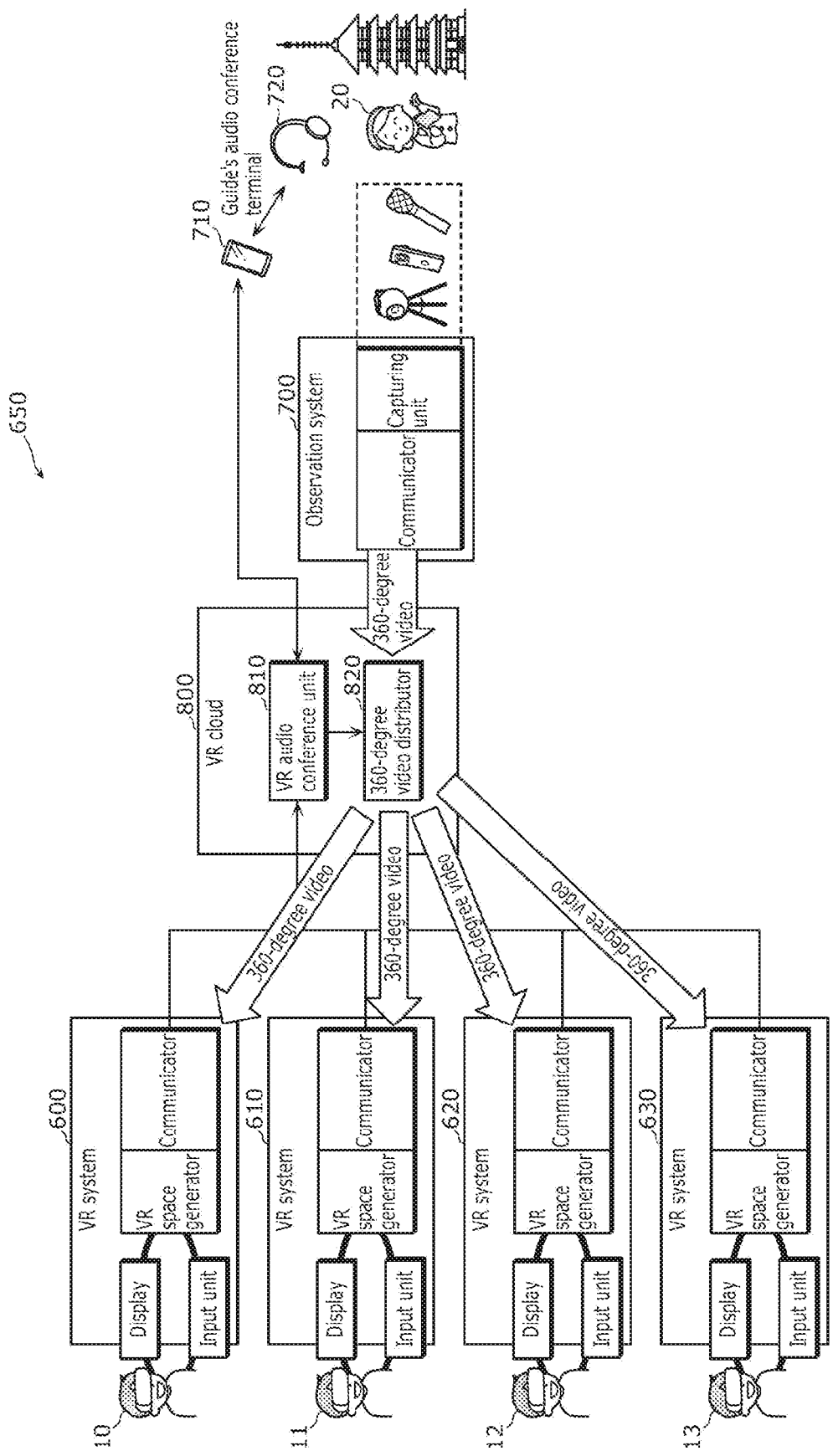
FIG. 1A is a conceptual diagram of a VR tourism system according to a reference example which enables conversations with a guide.

FIG. 1A is a conceptual diagram of VR tourism system 650 according to a reference example which enables conversations with a guide. VR tourism system 650 according to the reference example enables a simulated tourism experience with a realistic sensation with respect to a location by sending, to respective VR users 10 to 13, video and audio (ambient sound of the location, audio of guide 20, and the like) obtained by photographing the location with a 360-degree camera. Note that a "VR user" may also be referred to as a "VR tourism user", a "participant", or simply a "user".

In order to further improve the VR tourism experience, it is important that VR users 10 to 13 do not listen to an explanation provided by guide 20 in a one-sided manner but are capable of engaging in two-way conversations with guide 20 while wearing VR systems 600 to 630. In consideration thereof, as illustrated in FIG. 1A, VR tourism system 650 according to the reference example realizes a function of engaging in a conversation with other VR users 10 to 13 or engaging in a conversation with guide 20 even during VR tourism by appropriately combining VR audio conference unit 810 with 360-degree video distributor 820 in VR cloud 800.

Figure 1B:
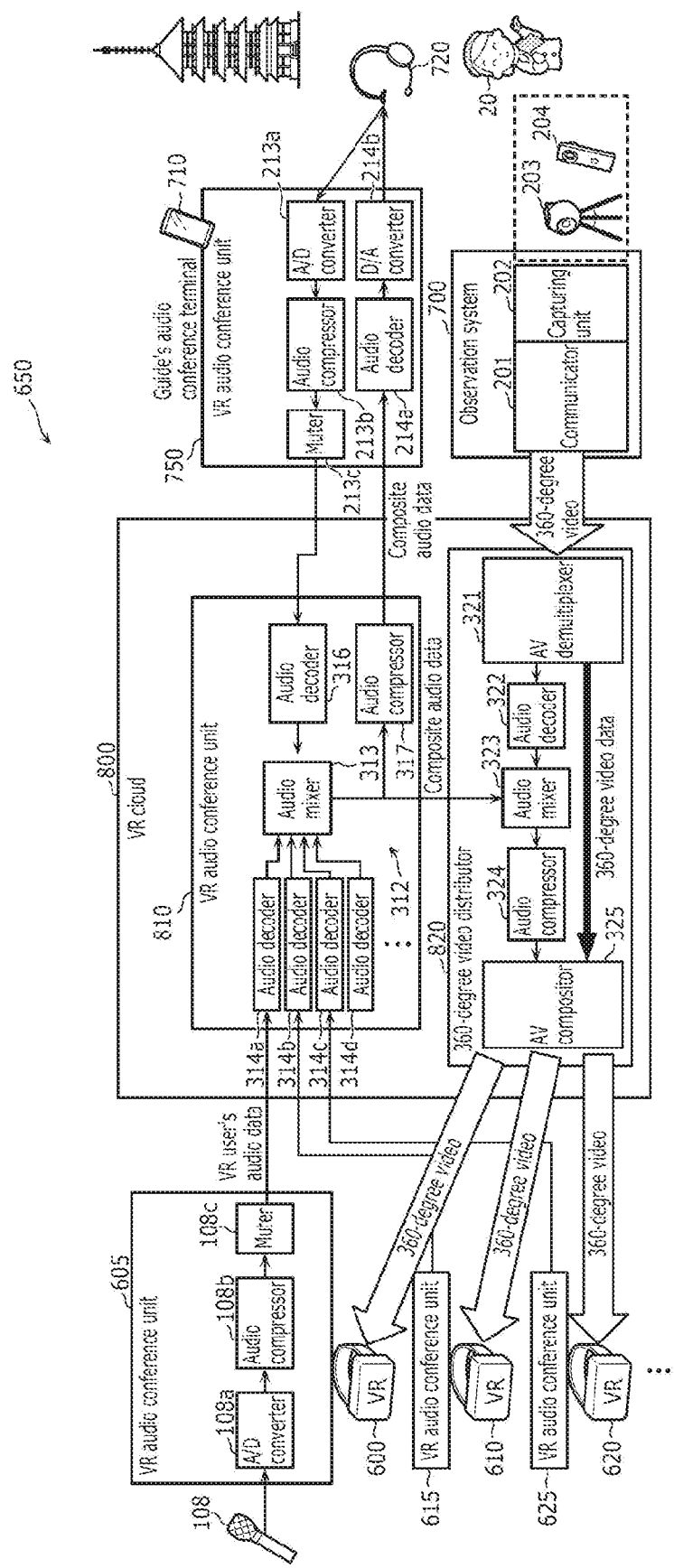
FIG. 1B is a block diagram illustrating a detailed configuration of the VR tourism system illustrated in FIG. 1A.

FIG. 1B is a block diagram illustrating a detailed configuration of VR tourism system 650 illustrated in FIG. 1A. VR systems 600 and the like include VR audio conference unit 605 that enables an audio conversation during VR tourism. VR audio conference unit 605 is constituted of A/D converter 108a that converts an audio signal outputted from microphone 108 to digital audio data, audio compressor 108b that compresses the audio data, and muter 108c that controls whether or not to transmit the compressed audio data to VR cloud 800.

VR audio conference unit 810 included in VR cloud 800 includes audio decoders 314a to 314d that decode audio data transmitted from VR systems 600 and the like, audio decoder 316 that decodes compressed audio data transmitted from smartphone 710 used by guide 20, audio mixer 313 that mixes the audio data from audio decoders 314a to 314d and the audio data from audio decoder 316 to generate composite audio data, and audio compressor 317 that compresses the mixed composite audio data and transmits the compressed composite audio data to smartphone 710 of guide 20.

360-degree video distributor 820 included in VR cloud 800 includes AV demultiplexer 321 that receives a 360-degree video transmitted from observation system 700 and demultiplexes the 360-degree video into video data and audio data, audio decoder 322 that decodes the demultiplexed audio data, audio mixer 323 that mixes the decoded audio data and composite audio data sent from VR audio conference unit 810, audio compressor 324 that compresses the mixed audio data, and AV compositor 325 that composites the compressed audio data and the video data demultiplexed by AV demultiplexer 321 and distributes as a 360-degree video to VR system 600 and the like.

Smartphone 710 that is a guide's audio conference terminal has hardware and an application (APP) which function as VR audio conference unit 750 and, specifically, smartphone 710 is constituted of A/D converter 213a that converts an audio signal outputted from a microphone of headset 720 to digital audio data, audio compressor 213b that compresses the audio data, muter 213c that controls whether or not to transmit the compressed audio data to VR cloud 800, audio decoder 214a that receives and decodes composite audio data transmitted from VR cloud 800, and D/A converter 214b that converts the decoded composite audio data to an analog audio signal and outputs the analog audio signal to a loudspeaker of headset 720.

Observation system 700 includes capturing unit 202 that controls camera 203 for 360-degree photography and acquires signals from camera 203 and remote controller 204 and communicator 201 that transmits signals acquired by capturing unit 202 to VR cloud 800 as a 360-degree video.

In this manner, in VR tourism system 650 according to the reference example, function additions (1) to (3) described below are performed in order to realize conversations between VR users 10 to 13 and guide 20 by combining a general videoconferencing system with the video distribution system including 360-degree video distributor 820.

(1) VR audio conference unit 605 for connecting to VR audio conference unit 810 of VR cloud 800 is added to VR systems 600 and the like.

(2) Guide 20 is caused to use smartphone 710 that is a guide's audio conference terminal for connecting to VR audio conference unit 810 of VR cloud 800 from headset 720 mounted with a microphone, an earphone, or the like via an ICT device such as a smartphone.

(3) Composite audio data obtained by mixing voices of VR users 10 and the like and guide 20 in VR audio conference unit 810 of VR cloud 800 is mixed with only audio data extracted by 360-degree video distributor 820 from 360-degree video data sent from the observation system and the mixed audio data is sent to VR system 600 or the like of each VR user 10 or the like.

Note that a position of muter 108c is not limited to the illustrated position as long as audio captured by microphone 108 is muted before the audio is mixed by audio mixer 313.

For example, in VR audio conference unit 605 in FIG. 1B, muter 108c may be placed between A/D converter 108a and audio compressor 108b or between microphone 108 and A/D converter 108a.

Furthermore, a configuration may be adopted in which muter 108c is placed before audio decoders 314a to 314d (on an input side relative to audio decoders 314a to 314d) or between audio decoders 314a to 314d and audio mixer 313 of VR audio conference unit 810 in VR cloud 800.

(Problems in VR Tourism System According to Reference Example)

In cases of videoconferencing systems such as Zoom (registered trademark) and Teams (registered trademark), since the videoconferencing systems are used for business and their users can be expected to have certain ICT skills, operations such as muting and un-muting can be performed by the users themselves. However, VR tourism users may possibly be users in a wide range of ages from the elderly to children, a wide variety of occupations, educational levels, and the like and all participants cannot be expected to be skilled in ICT. Therefore, problems such as those described below may possibly occur.

In particular, when each VR user is not speaking, defects such as mixing of noise and, at the worst, howling or the like may occur unless the VR user performs muting using a mute function of his/her own VR system. However, it is conceivably difficult to have a VR user unaccustomed to videoconferencing systems such as Zoom (registered trademark) and Teams (registered trademark) perform a mute operation or learn how to perform the operation in a VR system.

(Problems to be Solved)

As described above, the VR tourism system according to the reference example has the following four problems (1) to (4) to be solved.

(1) A simple user interface that enables diverse participants to use the VR tourism service must be provided.

Unlike users of a videoconferencing system that is used for business, education, and the like, people of various age groups and levels of understanding of ICT skills may participate as VR tourism users. In addition, a field of view is blocked by entering a VR space while wearing VR goggles. Therefore, operations using a controller or the like need to be easy and a simple user interface that satisfies conditions such as those described below is required. It is also necessary that a user need not learn a concept of muting or learn how to perform a muting operation. It is also necessary that VR experience does not decline even when a person unable to learn how to perform an operation, a person having forgotten how to perform an operation, or a person who does not follow rules participates. Furthermore, it is important that a description of operations of the VR system can be readily provided before the VR experience.

In addition, a main duty of guide 20 is to provide explanations and guide 20 is unable to perform system operations in a same manner as a host of a videoconferencing system. Guide 20 requires an extremely simple user interface that enables guide 20 to focus on the duty of providing explanations.

(2) Bad-mannered VR users who obstruct provision of an explanation by guide 20 by verbally abusive language, continuous questions, and the like must be eliminated. With a videoconferencing system, since a purpose of use is business, there is no need to consider bad-mannered participants. In addition, even when a problem occurs, a system manager can block an utterance by forced muting or the like. A VR tourism service requires a function which enables, when guide 20 encounters a problem, the problem to be solved (a conversation to be blocked) by a simple operation.

(3) Private conversations by participants with traveling companions must be supported. In other words, free conversations within a group must be supported without obstructing provision of explanations by guide 20 and without the conversations being heard by participants belonging to other groups.

(4) A plurality of languages and a plurality of guides must be accommodated with respect to participants in VR tourism in order to accommodate foreign travel and foreigners. In other words, in order to simultaneously support users who use a plurality of languages, a plurality of guides, simultaneous interpreters, machine translation, and the like must also be supported.

Hereinafter, solutions to each of the four problems listed above will be described using an embodiment and examples. Note that the embodiment and the examples to be described below each present a specific example of the present disclosure. Numerical values, shapes, materials, constituent elements, the arrangement and connection of the constituent elements, steps, an order of the steps, and the like described in the following embodiment and the following examples are merely examples and are not intended to limit the present disclosure. Furthermore, the respective drawings are not necessarily precise illustrations. In the drawings, substantially same components will be denoted by same reference signs and redundant descriptions will be either omitted or simplified.

[Embodiment]

FIG. 2A is a block diagram illustrating a configuration of video display system 1 according to the embodiment. Video display system 1 is a system that provides a service for experiencing VR (virtual reality) and includes VR systems 30a to 30b used by participants 10 to 13, explainer terminal 40, observation system 50, and cloud 60. VR systems 30a to 30b, explainer terminal 40, and observation system 50 are connected to cloud 60 via a communication network.

Each of VR systems 30a and 30b includes display unit 31 that displays a VR space that is a video for VR to participants 10 to 13 who participate in the experience and audio processor 32 that inputs and outputs audio from and to participants 10 to 13.

Explainer terminal 40 is a terminal that inputs and outputs audio of explainer 20 who provides explanations for the experience towards participants 10 to 13 in the VR space and includes explainer's input unit 41 that accepts an operation from explainer 20 indicating whether or not questions are to be accepted.

Observation system 50 is a system that generates a 360-degree video by photographing the real world and transmitting the 360-degree video to video distributor 63 of cloud 60 and includes camera 51 and microphone 52 that picks up audio of explainer 20.

Cloud 60 refers to a computer on a communication network and includes video distributor 63 that distributes a 360-degree video for generating a VR space to VR systems 30a to 30b, audio conversation unit 61 that assists audio conversation between participants 10 to 13 and explainer 20 via VR systems 30a to 30b and explainer terminal 40, and controller 62 that controls at least one of VR systems 30a to 30b, explainer terminal 40, video distributor 63, and audio conversation unit 61.

In this case, controller 62 controls VR systems 30a to 30b so as to manage an operation mode that selectively takes a first state in which questions from participants 10 to 13 to explainer 20 are not allowed, a second state in which questions are allowed, and a third state in which a question is in progress, and causes display unit 31 to display information specifying the operation mode. More specifically, controller 62 controls the plurality of VR systems 30a to 30b so as to manage an operation mode corresponding to each of the plurality of VR systems 30a to 30b and to cause information specifying the operation mode to be displayed on display unit 31 of a corresponding VR system among VR systems 30a to 30b.

Accordingly, each of participants 10 to 13 can immediately know whether his/her own state is the first state in which questions cannot be asked, the second state in which questions can be asked, or the third state in which a question is being asked based on information specifying an operation mode that is displayed on display unit 31, an operation for asking explainer 20 a question is simplified, and the problem (1) (a simple user interface that enables diverse participants to use the VR tourism service must be provided) described above is solved.

Note that video display system 1 does not necessarily need observation system 50. Video distributor 63 of cloud 60 may read a 360-degree video created in advance by photography, CG, or the like from storage in which the 360-degree video had been stored and distribute the 360-degree video to VR systems 30a to 30b.

In addition, controller 62 need not be provided in one computer that constitutes cloud 60 and all of or a part of controller 62 may be provided in other devices such as a plurality of computers, VR systems 30a to 30b, and explainer terminal 40. In other words, controller 62 may be divided into a plurality of functional modules and provided by being distributed among a plurality of devices.

When explainer's input unit 41 accepts an instruction to enter the first state or, in other words, a state of not accepting questions, controller 62 may control the plurality of VR systems 30a to 30b to display an image indicating the first state on display unit 31 of the plurality of VR systems 30a to 30b and to mute the first state or, in other words, audio input from the plurality of participants 10 to 13 but, on the other hand, when explainer's input unit 41 accepts an instruction to enter the second state or, in other words, a state of accepting questions, controller 62 may control the plurality of VR systems 30a to 30b to display an image indicating the second state on display unit 31 of the plurality of VR systems 30a to 30b to create the second state or, in other words, a state in which questions are allowed and to change audio input from the plurality of participants 10 to 13 to the first state or, in other words, to mute the audio input. Accordingly, explainer 20 can control whether or not to allow questions with respect to the plurality of participants 10 to 13 by a simple operation using explainer's input unit 41.

In addition, when participant's input unit 33 of any one of the plurality of VR systems 30a to 30b receives an operation indicating a request to ask a question and an operation mode of VR system 30a or the like corresponding to participant's input unit 33 having received the operation is the second state, controller 62 may control VR system 30a or the like to display information specifying the third state instead of the second state on display unit 31 and, at the same time, change the operation mode to the third state by un-muting audio input from the corresponding participant. Accordingly, participants 10 to 13 can ask explainer 20 questions by a simple operation using participant's input unit 33.

Furthermore, when controller 62 controls VR system 30a or the like so as to unmute audio input from participant 10 or the like or, in other words, create the third state, controller 62 may control VR system 30a or the like so as to display an image indicating the first state on display unit 31 and create the first state by muting audio input from a corresponding participant 13 or the like with respect to another VR system 30b or the like excluding VR system 30a or the like. Accordingly, when one participant asks explainer 20 a question, the other participants are prevented from presenting questions and the other participants can listen to a conversation between the one participant and explainer 20.

In this case, explainer's input unit 41 may be a single button for receiving an operation indicating accepting questions and an operation indicating not accepting questions. Accordingly, explainer 20 can switch between a state of accepting questions and a state of not accepting questions by a simple operation using a single button.

In a similar manner, participant's input unit 33 may be a single button for receiving an operation indicating a request to ask a question and indicating that a question is in progress and an operation indicating that a question is completed. Accordingly, participants 10 to 13 can start asking explainer 20 a question by a simple operation using a single button.

In addition, in place of or in addition to explainer's input unit 41 of explainer terminal 40, audio conversation unit 61 may assist audio conversation between participants 10 to 13 and explainer 20 using audio of explainer 20 acquired by microphone 52 of observation system 50. Accordingly, explainer 20 can provide an explanation such as tourism guidance and engage in conversation including answering questions from participants 10 to 13 using microphone 52 of observation system 50.

Figure 2B:
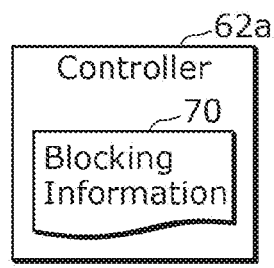
FIG. 2B is a block diagram illustrating a configuration of a controller according to Variation 1 of the video display system illustrated in FIG. 2A.

FIG. 2B is a block diagram illustrating a configuration of controller 62a according to Variation 1 of video display system 1 illustrated in FIG. 2A. In the present variation, controller 62a includes blocking information 70 including permission/refusal information indicating whether or not to block a question to explainer 20 from each of the plurality of participants 10 to 13 and, based on blocking information 70, with respect to participant 10 or the like indicated to be blocked in the permission/refusal information, controls VR system 30a or the like so that an image indicating the first state is displayed on display unit 31 of VR system 30a or the like corresponding to participant 10 or the like and the first state is created by muting audio input from participant 10 or the like. Accordingly, the problem (2) (bad-mannered users who obstruct provision of an explanation by guide 20 by verbally abusive language, continuous questions, and the like must be eliminated) described above is solved.

Figure 2C:
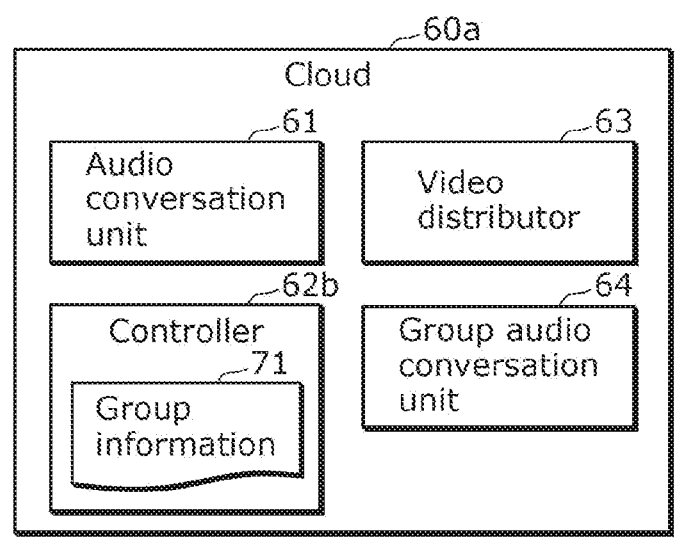
FIG. 2C is a block diagram illustrating a configuration of a cloud according to Variation 2 of the video display system illustrated in FIG. 2A.

FIG. 2C is a block diagram illustrating a configuration of cloud 60a according to Variation 2 of video display system 1 illustrated in FIG. 2A. Cloud 60a includes audio conversation unit 61, controller 62b, video distributor 63, and group audio conversation unit 64. Group audio conversation unit 64 assists a group audio conversation among two or more participants 10 or the like selected from the plurality of participants 10 to 13. Controller 62b includes group information 71 including affiliation information indicating whether or not each of the plurality of participants 10 to 13 belongs to a predetermined group and, based on group information 71, controls group audio conversation unit 64 so as to assist group audio conversation only with respect to the plurality of participants 10 and the like that belong to a same group. Accordingly, the problem (3) (private conversations by participants with traveling companions must be supported) described above is solved.

More specifically, controller 62b controls group audio conversation unit 64 so as to assist group audio conversation when the operation modes of VR systems 30a and the like corresponding to the plurality of participants 10 and the like belonging to the same group are all the first state or the second state.

When the operation mode of VR systems 30a or the like corresponding to any one of participants 10 or the like belonging to the same group makes a transition from the second state to the third state, controller 62b controls VR systems 30a to 30b so as to stop assisting the group audio conversation and, for each of other participants 13 and the like excluding participant 10 or the like, causes display unit 31 of corresponding VR system 30b or the like to display an image indicating the first state and mute audio input from participant 13 and the like. Accordingly, when one participant starts to ask explainer 20 a question during a group conversation, the other participants can listen to the question.

In addition, while assisting the group audio conversation, controller 62b may control a plurality of VR systems 30a and the like that correspond to a plurality of participants 10 and the like who belong to a same group so as to adjust a volume of at least one of audio from explainer 20 to the plurality of participants 10 and the like belonging to the same group and audio of the group audio conversation. Accordingly, the participants of a group audio conversation can listen to the group audio conversation and to an explanation provided by explainer 20 in a state where there is a mixture of the group audio conversation and the explanation.

Figure 2D:
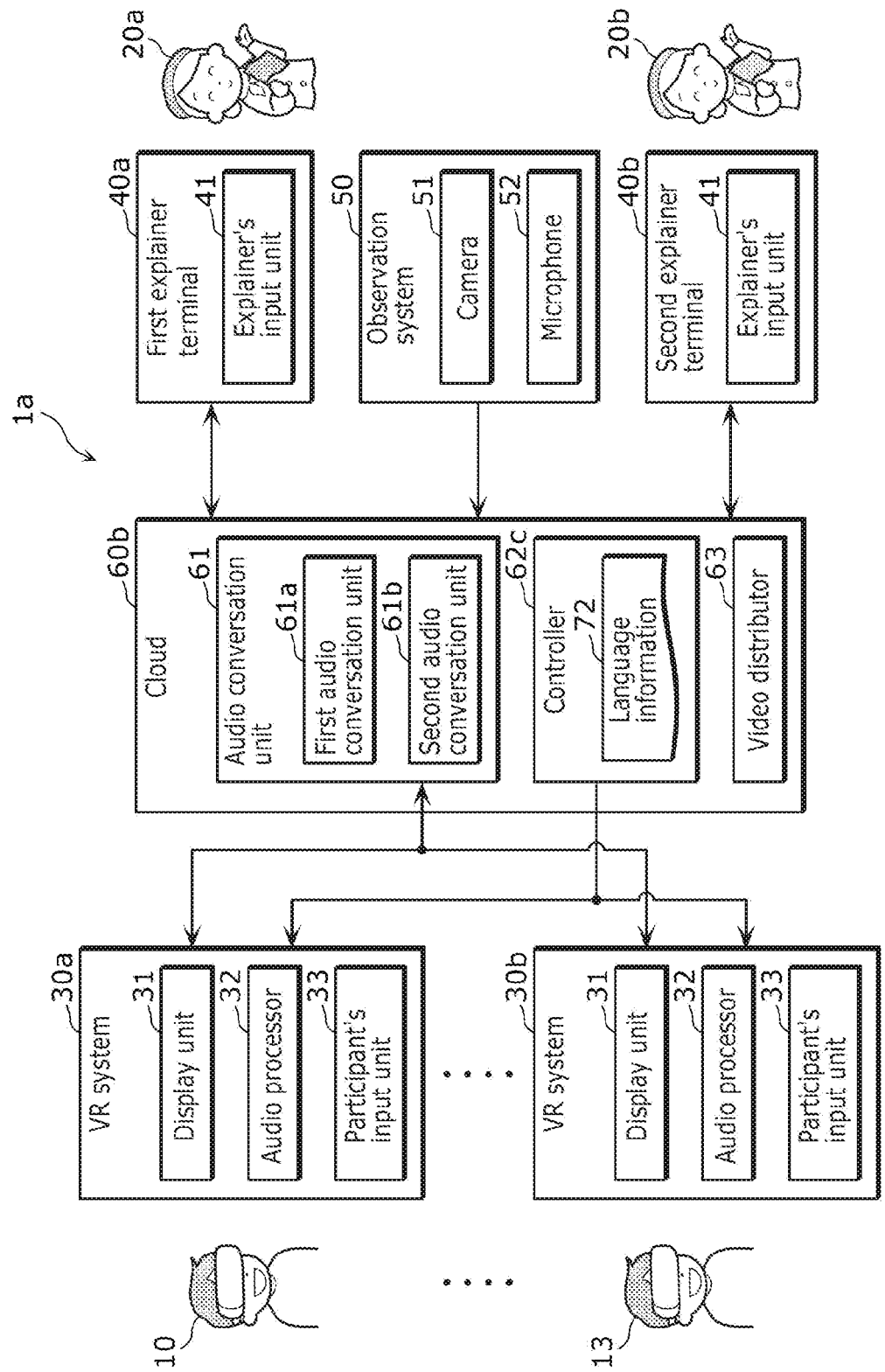
FIG. 2D is a block diagram illustrating a configuration of a video display system according to Variation 3 of the video display system illustrated in FIG. 2A.

FIG. 2D is a block diagram illustrating a configuration of video display system 1a according to Variation 3 of video display system 1 illustrated in FIG. 2A. Video display system 1a includes, in video display system 1 illustrated in FIG. 2A, first explainer terminal 40a and second explainer terminal 40b instead of explainer terminal 40 and cloud 60b instead of cloud 60.

First explainer terminal 40a is a terminal that inputs and outputs audio to and from first explainer 20a who provides explanations in a first language. Second explainer terminal 40b is a terminal that inputs and outputs audio to and from second explainer 20b who provides explanations in a second language.

Cloud 60b includes audio conversation unit 61, controller 62c, and video distributor 63. Audio conversation unit 61 includes first audio conversation unit 61a that assists an audio conversation between participants 10 to 13 and first explainer 20a via the plurality of VR systems 30a to 30b and first explainer terminal 40a and second audio conversation unit 61b that assists an audio conversation between participants 10 to 13 and second explainer 20b via the plurality of VR systems 30a to 30b and second explainer terminal 40b.

Controller 62c includes language information 72 that associates each of the plurality of participants 10 to 13 with a desired language of the provided explanation and controls first audio conversation unit 61a and second audio conversation unit 61b so that, based on language information 72, with respect to participant 10 or the like associated with the first language, an audio conversation between participant 10 or the like and first explainer 20a is assisted by first audio conversation unit 61a and, with respect to participant 13 or the like associated with the second language, an audio conversation between participant 13 or the like and second explainer 20b is assisted by second audio conversation unit 61b. Accordingly, the problem (4) (a plurality of languages and a plurality of guides must be accommodated with respect to participants in VR tourism in order to accommodate foreign travel and foreigners) described above is solved.

Note that second explainer 20b may be a simultaneous interpreter who interprets between the first language and the second language. In such a case, first audio conversation unit 61a also outputs audio from first explainer 20a to second explainer 20b. Accordingly, a video display system that also accommodates cases including a simultaneous interpreter is realized.

Figure 2E:
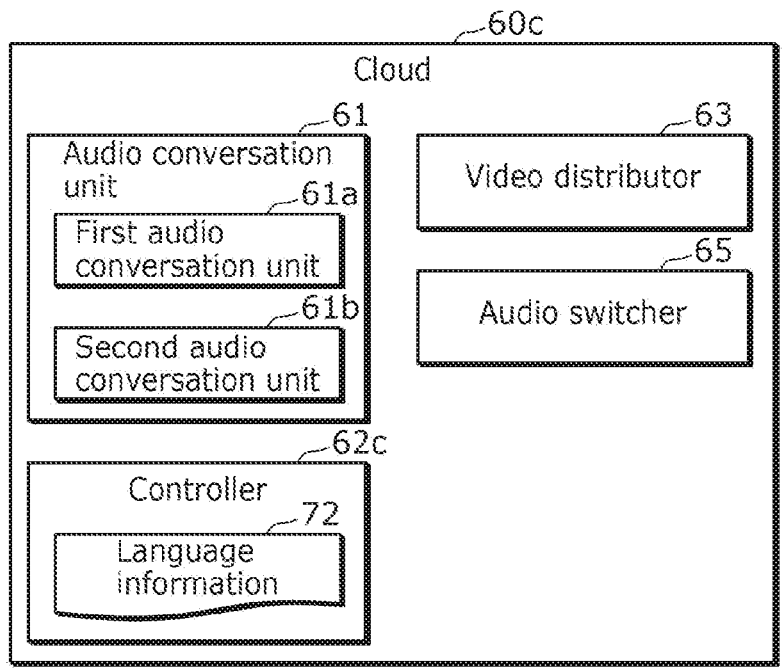
FIG. 2E is a block diagram illustrating a configuration of a cloud according to Variation 1 of the video display system illustrated in FIG. 2D.

FIG. 2E is a block diagram illustrating a configuration of cloud 60c according to Variation 1 of video display system 1a illustrated in FIG. 2D. Cloud 60c includes audio conversation unit 61, controller 62c, video distributor 63, and audio switcher 65. Audio switcher 65 switches between outputting audio from a simultaneous interpreter to participant 10 or the like associated with the second language and outputting audio to first explainer 20a and participant 13 or the like associated with the first language. Accordingly, when second explainer 20b is a simultaneous interpreter, the simultaneous interpreter can switch between speaking to a participant and speaking to first explainer 20a who speaks the first language and convenience is improved.

Figure 2F:
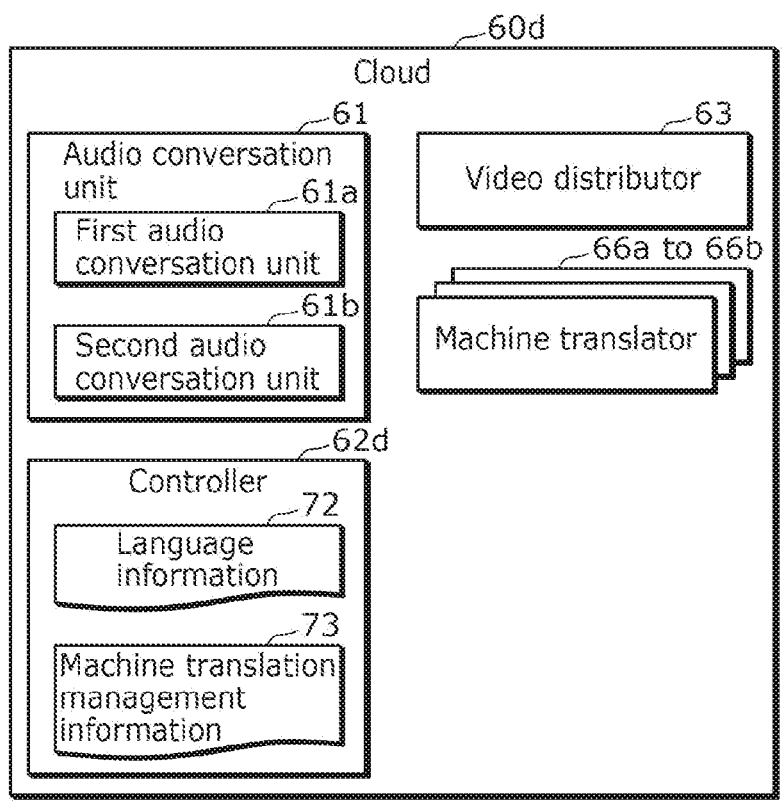
FIG. 2F is a block diagram illustrating a configuration of a cloud according to Variation 2 of the video display system illustrated in FIG. 2D.

FIG. 2F is a block diagram illustrating a configuration of cloud 60d according to Variation 2 of video display system 1a illustrated in FIG. 2D. Cloud 60d includes audio conversation unit 61, controller 62d, video distributor 63, and machine translators 66a to 66b. Machine translators 66a to 66b perform machine translation between two different languages (such as the first language and the second language).

Controller 62d includes language information 72 that associates each of the plurality of participants 10 to 13 with a desired language of the provided explanation and controls machine translators 66a and the like so that, based on language information 72, with respect to participant 10 or the like associated with the first language, participant 10 or the like and explainer 20 engage in an audio conversation without involving machine translators 66a to 66b and, with respect to participant 13 or the like associated with the second language, participant 13 or the like and explainer 20 engage in an audio conversation through machine translators 66a and the like. Accordingly, a plurality of languages can be accommodated due to machine translation.

In addition, controller 62 may include machine translation management information 73 indicating two languages handled by the plurality of machine translators 66a to 66b and, based on language information 72 and machine translation management information 73, controller 62 may control the plurality of machine translators 66a to 66b such that for each of participants 10 to 13, a machine translator that translates between a language associated with participants 10 to 13 and the first language used by the guide is selected from among the plurality of machine translators 66a to 66b and participant 10 to 13 and explainer 20 engage in an audio conversation via the machine translator selected from machine translators 66a to 66b. Accordingly, by accommodating a plurality of different kinds of machine translation, an extremely large number of languages can be accommodated.

Figure 6:
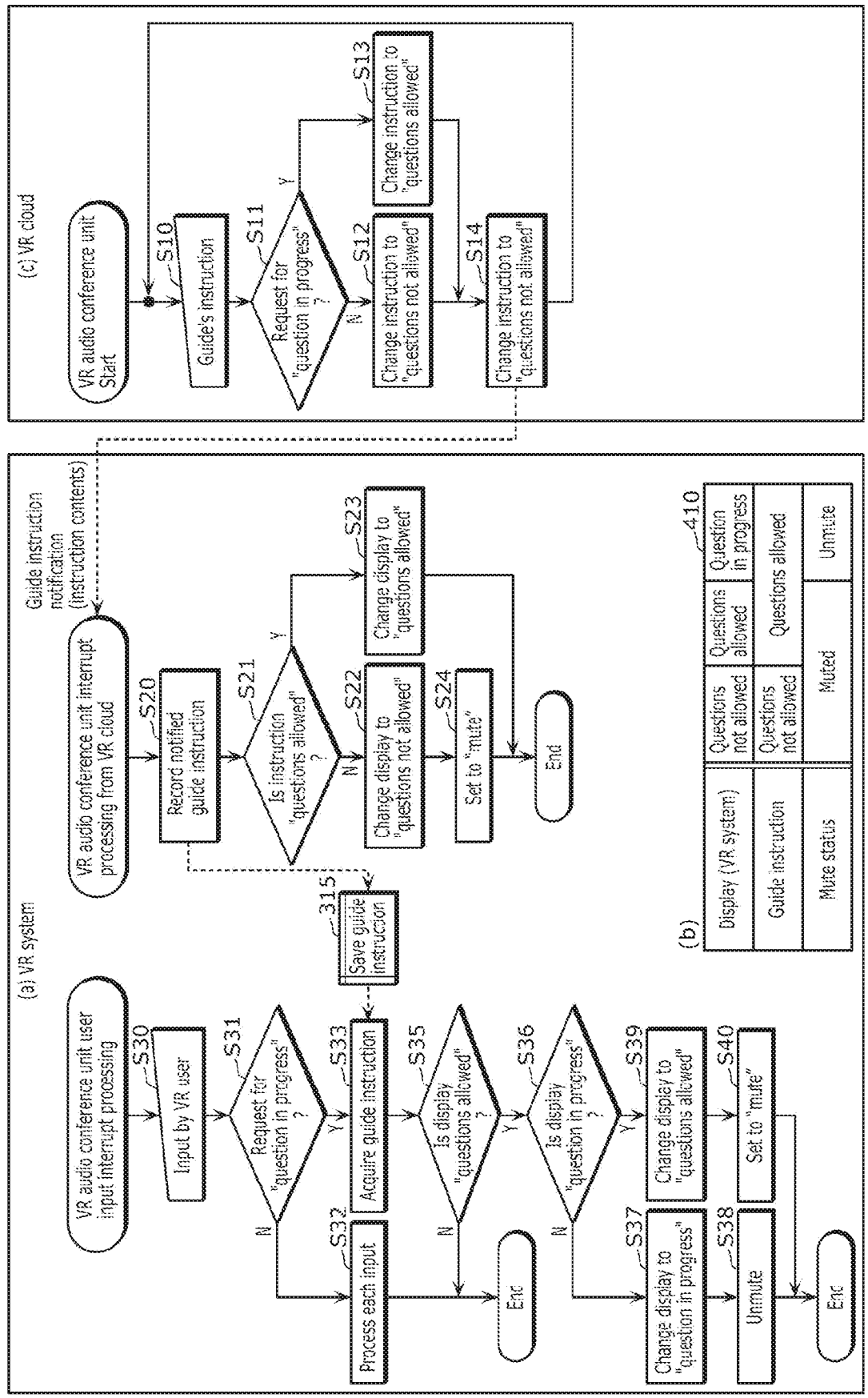
FIG. 6 is a diagram illustrating an operation flow example of the VR tourism system according to Example 1.

Moreover, as will be illustrated in operation flow examples of examples to be described later, a video display method according to the present disclosure is a video display method by video display system 1 that provides a service of experiencing VR (virtual reality), the video display method including: controlling VR systems 30a to 30b so as to manage an operation mode that selectively assumes a first state in which questions from participants 10 to 13 to explainer 20 are not allowed, a second state in which the questions are allowed, and a third state in which a question is in progress and cause display unit 31 to display information specifying the operation mode (FIG. 6). More specifically, in the controlling of VR systems 30a to 30b, the plurality of VR systems 30a to 30b are controlled so as to manage an operation mode corresponding to each of the plurality of VR systems 30a to 30b and to cause information specifying the operation mode to be displayed on display unit 31 of a corresponding VR system among VR systems 30a to 30b (FIG. 6, FIG. 2A).

Accordingly, each of participants 10 to 13 can immediately know whether his/her own state is the first state in which questions cannot be asked, the second state in which questions can be asked, or the third state in which a question is being asked based on information displayed on display unit 31 that specifies an operation mode, an operation for asking explainer 20 a question is simplified, and the problem (1) (a simple user interface that enables diverse participants to use the VR tourism service must be provided) described above is solved.

Figure 13:
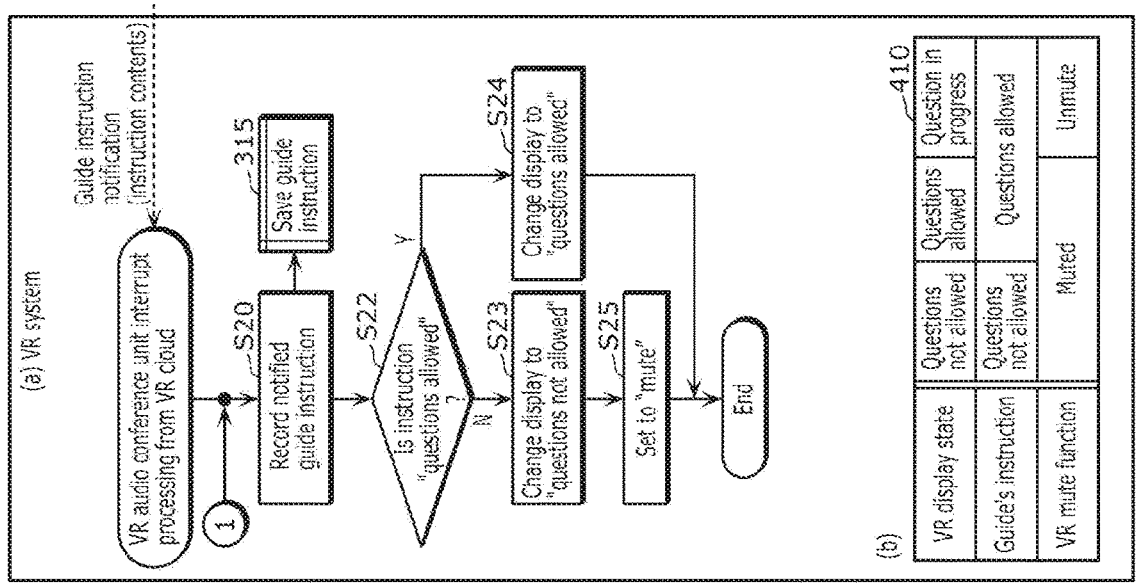
FIG. 13 is a diagram illustrating an operation flow example of the VR tourism system according to Example 2.

In addition, in the controlling of VR systems 30a to 30b, VR systems 30a to 30b are controlled so that, based on blocking information 70 including permission/refusal information indicating whether or not to block a question to explainer 20 from each of the plurality of participants 10 to 13, with respect to participants 10 to 13 indicated to be blocked in the permission/refusal information, an image indicating the first state is displayed on display unit 31 of VR systems 30a to 30b corresponding to participants 10 to 13 and the first state is created by muting audio input from participants 10 to 13 (FIG. 13, FIG. 2B). Accordingly, the problem (2) (bad-mannered users who obstruct provision of explanations by guide 20 by verbally abusive language, continuous questions, and the like must be eliminated) described above is solved.

In addition, the controlling of VR systems 30*a* to 30*b* includes group information 71 including affiliation information indicating whether or not each of the plurality of participants 10 to 13 belongs to a predetermined group and, based on group information 71, group audio conversation unit 64 is controlled so as to assist group audio conversation with respect to the plurality of participants 10 to 13 that belong to a same group (FIG. 13, FIG. 2C). Accordingly, the problem (3) (private conversations by participants with traveling companions must be supported) described above is solved.

Figure 25:
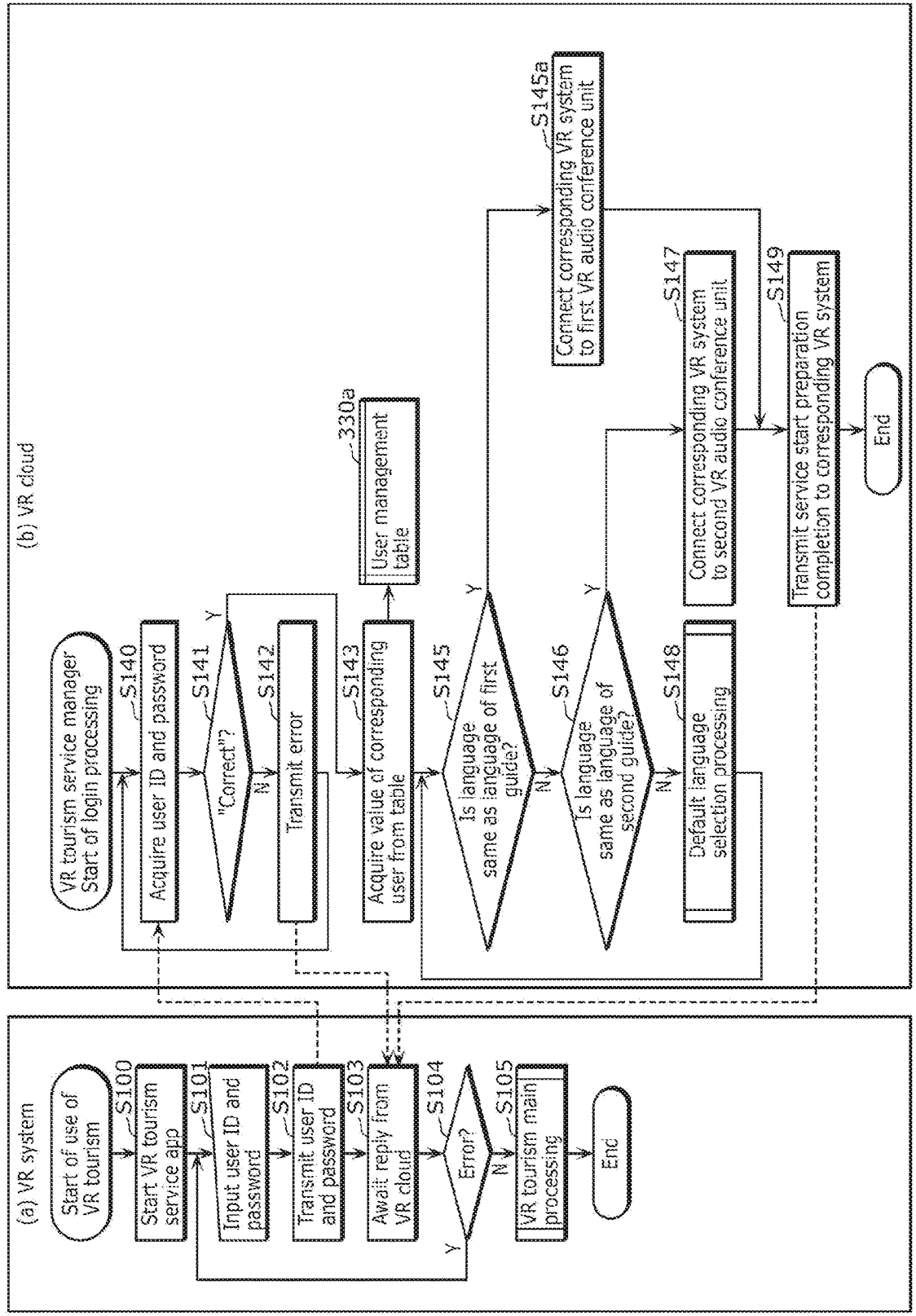
FIG. 25 is a diagram illustrating an operation flow example of the VR tourism system according to Example 4.

In addition, in the controlling of VR systems 30*a* to 30*b*, based on language information 72 that associates each of the plurality of participants 10 to 13 with a desired language of the provided explanation, first audio conversation unit 61*a* and second audio conversation unit 61*b* are controlled so that with respect to participants 10 to 13 associated with the first language, an audio conversation between participants 10 to 13 and first explainer 20*a* is assisted by first audio conversation unit 61*a* and, with respect to participants 10 to 13 associated with the second language, an audio conversation between participants 10 to 13 and second explainer 20*b* is assisted by second audio conversation unit 61*b* (FIG. 25, FIG. 2D). Accordingly, the problem (4) (a plurality of languages and a plurality of guides must be accommodated with respect to participants in VR tourism in order to accommodate foreign travel and foreigners) described above is solved.

Figure 35:
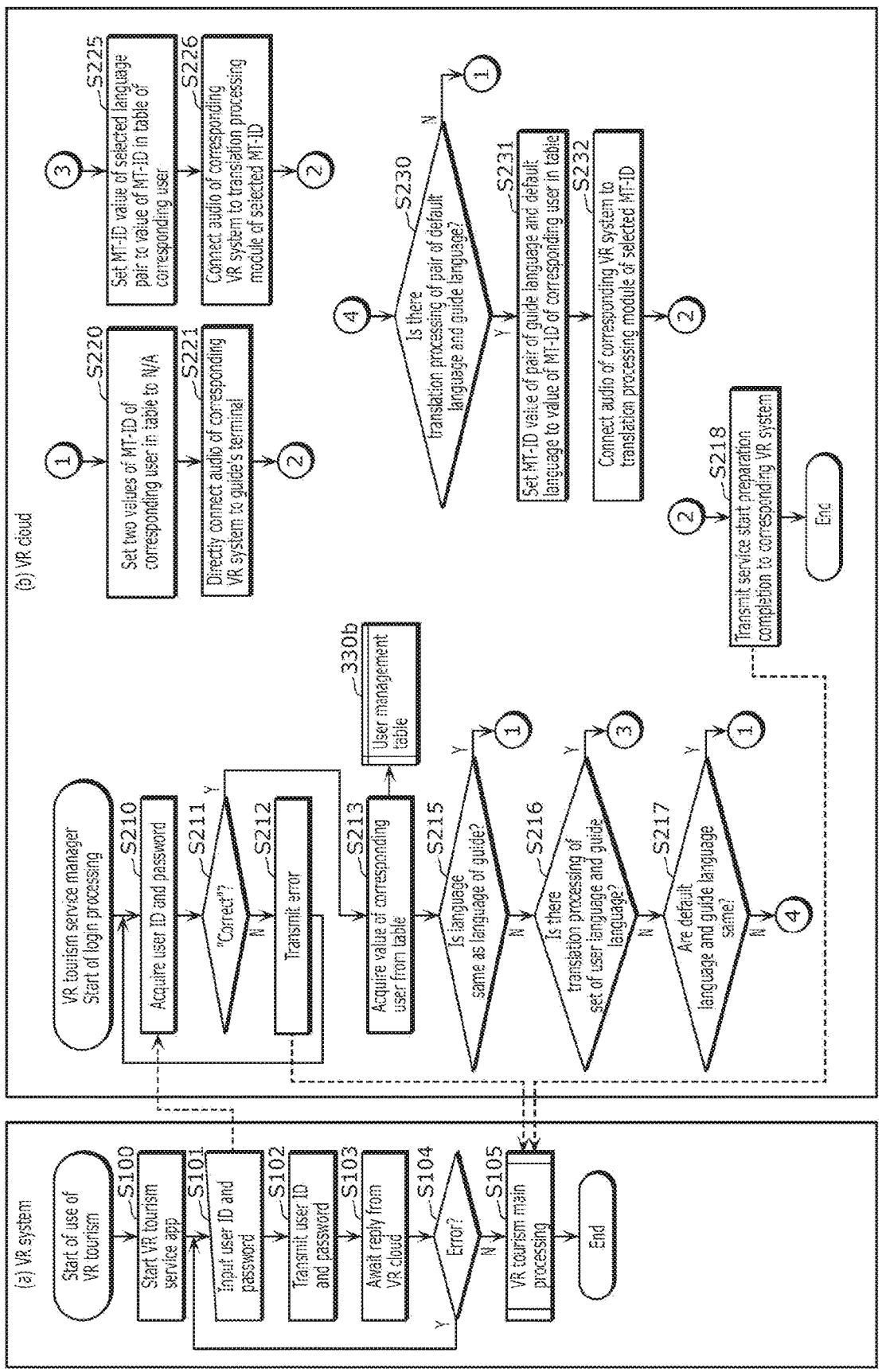
FIG. 35 is a diagram illustrating an operation flow example of the VR tourism system according to Variation 2 of Example 4.

In addition, in the controlling of VR systems 30*a* to 30*b*, based on language information 72 that associates each of the plurality of participants 10 to 13 with a desired language of the provided explanation, machine translators 66*a* to 66*b* are controlled so that, with respect to participants 10 to 13 associated with the first language, participants 10 to 13 and explainer 20 engage in an audio conversation without involving machine translators 66*a* to 66*b* and, with respect to participants 10 to 13 associated with the second language, participants 10 to 13 and explainer 20 engage in an audio conversation through machine translators 66*a* to 66*b* (FIG. 35, FIG. 2F). Accordingly, the problem (4) (a plurality of languages and a plurality of guides must be accommodated with respect to participants in VR tourism in order to accommodate foreign travel and foreigners) described above is solved.

Hereinafter, as specific examples of the embodiment, first to fourth examples that solve the problems (1) to (4) described above will be described. Every example will be described as an example of applying the video display system according to the embodiment to a VR tourism system.

Example 1

First, Example 1 will be described as a specific example of solving the problem (1) (a simple user interface that enables diverse participants to use the VR tourism service must be provided) described above.

Figure 3:
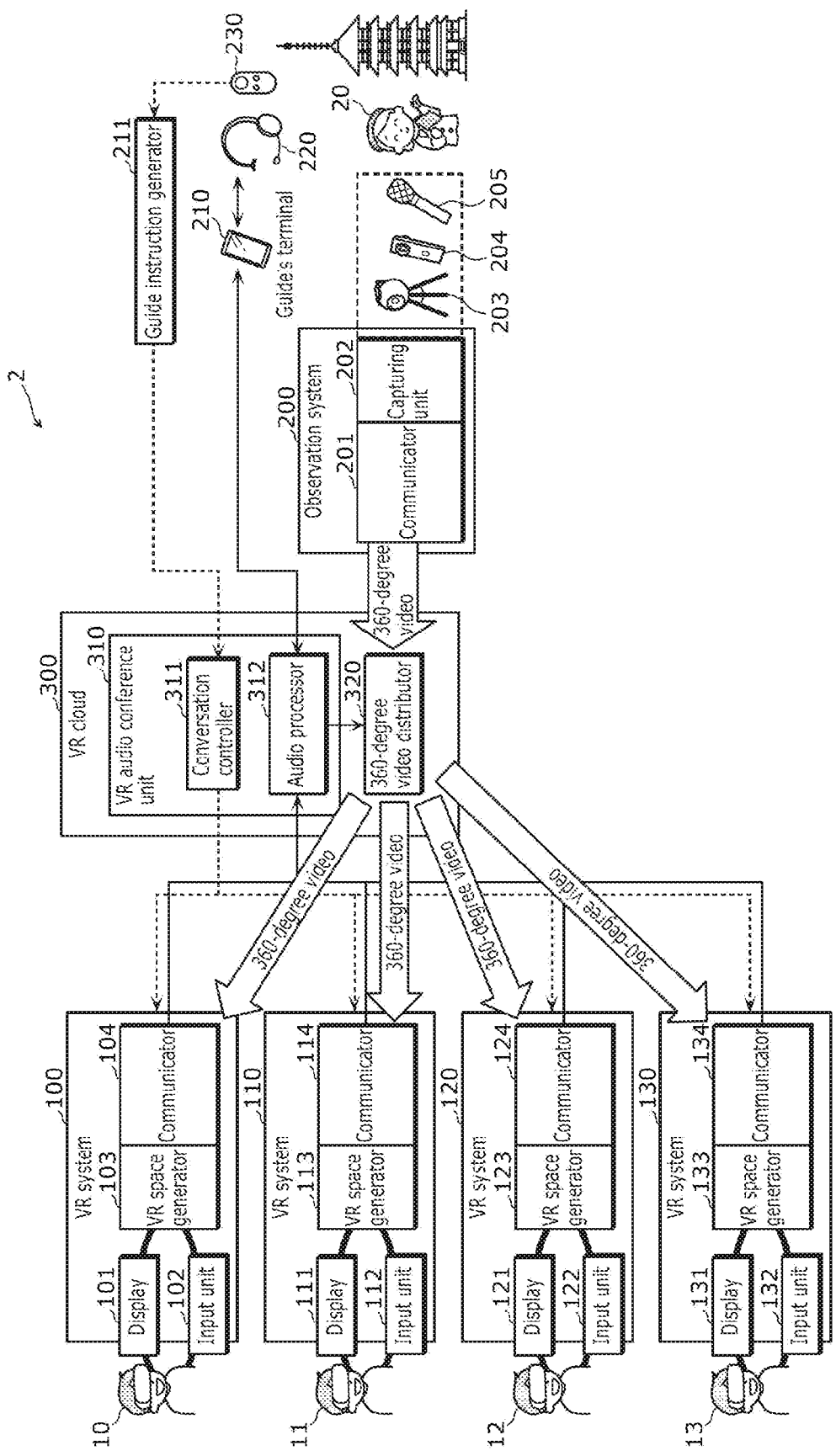
FIG. 3 is a schematic configuration diagram of a VR tourism system according to Example 1.

FIG. 3 is a schematic configuration diagram of VR tourism system 2 according to Example 1. VR tourism system 2 is constituted of: A) VR systems 100, 110, 120, and 130 for VR users 10 to 13 to experience a VR tourism service; B) 360-degree video distributor 320 which is provided in VR cloud 300 and which distributes a 360-degree video for generating a VR space inside VR systems 100, 110, 120, and 130; C) VR audio conference unit 310 which is provided in VR cloud 300 and which realizes an audio conversation between each of VR systems 100, 110, 120, and 130 and guide 20; and D) guide's terminal 210 or the like constituted of smartphone 210, headset 220, and guide's remote controller 230 for guide 20 to engage in audio conversation with VR users 10 to 13.

More specifically, VR system 100 (110, 120, and 130) includes display 101 (111, 121, and 131), input unit 102 (112, 122, and 132) that accepts operations, communicator 104 (114, 124, and 134) that communicates with the VR cloud, and VR space generator 103 (113, 123, and 133) that generates a VR space to be displayed on display 101 (111, 121, and 131). VR space generator 103 (113, 123, and 133) and display 101 (111, 121, and 131) are examples of display unit 31 according to the embodiment and input unit 102 (112, 122, and 132) is an example of participant's input unit 33 according to the embodiment. Note that illustration of audio processor 32 according to the embodiment is omitted in the present schematic configuration diagram.

VR cloud 300 includes VR audio conference unit 310 including conversation controller 311 and audio processor 312 and 360-degree video distributor 320. VR audio conference unit 310 is an example of audio conversation unit 61 according to the embodiment, 360-degree video distributor 320 is an example of video distributor 63 according to the embodiment, and conversation controller 311 is an example of controller 62 according to the embodiment.

Observation system 200 includes communicator 201, capturing unit 202, camera 203, remote controller 204, and microphone 205. Camera 203 is an example of camera 51 according to the embodiment, and microphone 205 is an example of microphone 52 according to the embodiment.

Guide's terminal 210 or the like is an example of explainer terminal 40 according to the embodiment and is constituted of smartphone 210, headset 220, and guide's remote controller 230 that is an example of explainer's input unit 41 according to the embodiment. Guide instruction generator 211 is a function of acquiring an instruction of guide 20 from guide's remote controller 230 and outputting the instruction to VR audio conference unit 310 and is an example of the function of acquiring an instruction of guide 20 from explainer's input unit 41 among functions of controller 62 according to the embodiment.

While participants can speak freely as a general rule in a general audio conference system, since VR tourism system 2 is for VR tourism, by having VR users 10 to 13 normally listen to explanations provided by guide 20 and enabling VR users 10 to 13 to speak (ask a question) only when permitted by guide 20 instead of allowing participants to speak freely, both VR users 10 to 13 and guide 20 can experience VR tourism with a simple user interface.

To this end, audio/display control (mute function, guidance display, and the like) of VR systems 100, 110, 120, and 130 of respective users 10 to 13 is realized by having guide 20 use guide instruction generator 211 in guide's terminal 210 or the like to operate conversation controller 311 in VR cloud 300.

Figure 4:
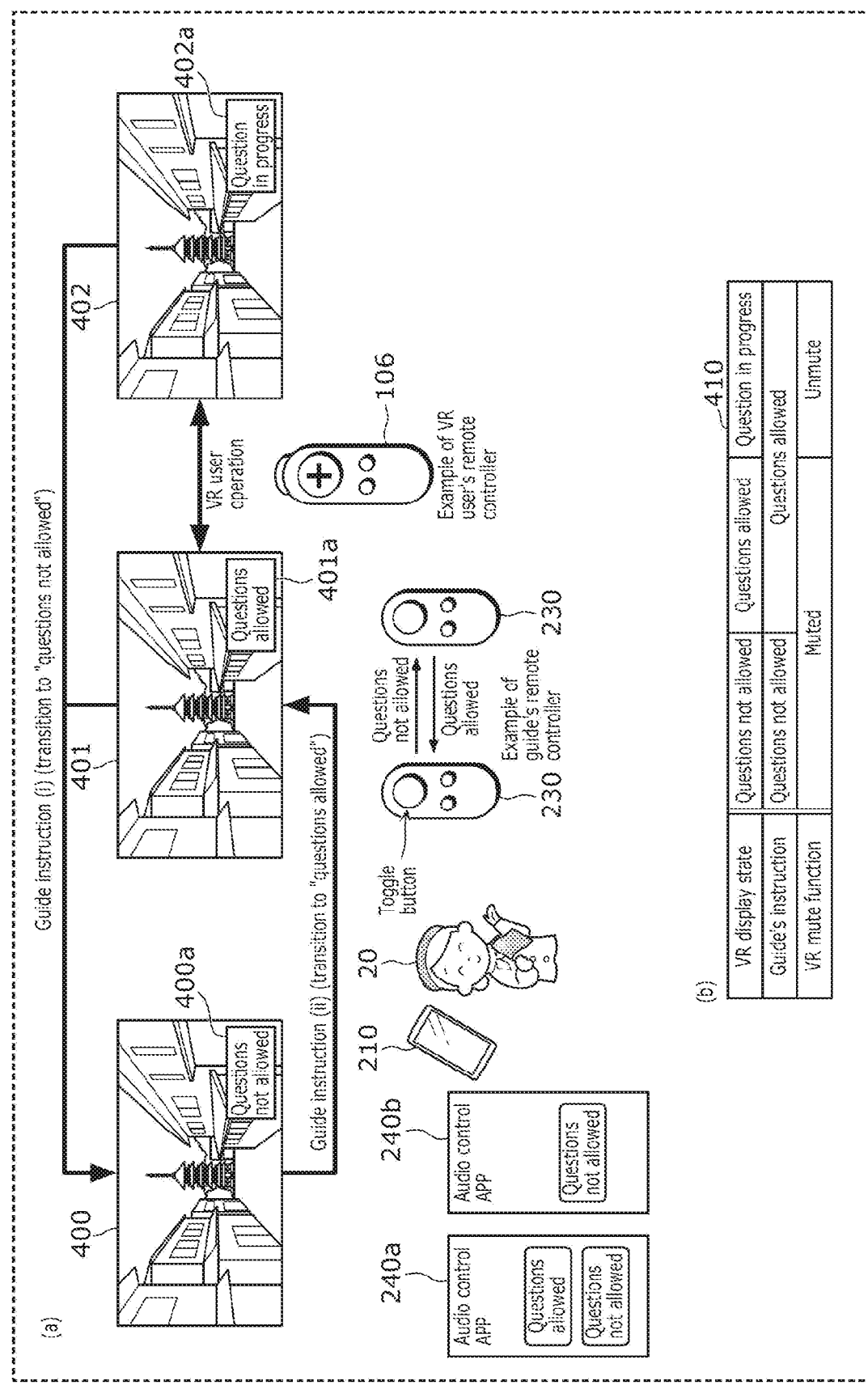
FIG. 4 is a diagram illustrating an operation example of the VR tourism system according to Example 1.

FIG. 4 is a diagram illustrating an operation example of VR tourism system 2 according to Example 1. More specifically, (a) in FIG. 4 illustrates a display example in VR systems 100, 110, 120, and 130, display examples 240*a* and 240*b* using an audio control application in smartphone 210 of guide 20, an operation example of guide's remote controller 230, and an operation example of VR remote controller 106 by VR user 10 or the like.

In FIG. 4, (b) illustrates operation mode explanation table 410 indicating a management example of operation modes by conversation controller 311. In other words, when "guide's instruction" is "questions not allowed", "questions not allowed" 400a is displayed at bottom right of screen display example 400 of the VR system ("display state of VR" is display mode of "questions not allowed") and the VR user becomes muted ("mute function of VR system" becomes "muted" or, in other words, the first state) while, on the other hand, when "guide's instruction" is "questions allowed", the VR user becomes muted ("mute function of VR system" becomes "muted") when "questions allowed" 401a is displayed at bottom right of screen display example 401 of the VR system ("display state of VR" is display mode of "questions allowed" or, in other words, the second state) but the VR user becomes unmuted ("mute function of VR system" becomes "unmuted") when "question in progress" 402a is displayed at bottom right of screen display example 402 of the VR system ("display state of VR" is display mode of "question in progress" or, in other words, the third state).

As illustrated in the present drawing, by realizing three guidance display modes in VR systems 100, 110, 120, and 130 and transitions of display modes with guide 20 and VR users 10 and the like using a simple UI constituted of a single button, the following four consequences are realized.

(1) Basically, since utterances of VR users 10 to 13 are to be constantly muted, there is no need for VR users 10 to 13 to learn a concept of muting or how to perform a muting operation.

(2) VR users 10 to 13 can readily understand when questions can be asked and when questions cannot be asked by a guidance display in VR space (transition of guidance display of "questions allowed" and "questions not allowed").

(3) When VR users 10 to 13 wish to ask a question (wish to speak to guide 20), pushing one button (question button) when guidance of "questions allowed" is being displayed will suffice. Therefore, since there is little to learn, there is little to forget. It is important to be aware that keeping operations simple is essential because a field of view is to be blocked when wearing the VR system.

(4) When guide 20 does not want to take questions (in other words, when guide 20 does not want to be disturbed when providing an explanation), guide 20 can set "questions not allowed" with respect to VR users 10 to 13 at any time only by an operation of a "questions not allowed" instruction (even when a question is in progress). In addition, when accepting questions, "questions allowed" can be set with respect to VR users 10 to 13 only by an operation of a "questions allowed" instruction. Since both operations can be performed by simple operations of a single button such as a toggle button, guide 20 can focus on providing explanations.

From the features described above, A) VR users 10 to 13 can readily enjoy conversation with guide 20 with one button operation. B) Guide 20 can readily control VR systems 100, 110, 120, and 130 with one button operation and smoothly provide explanations without being disturbed by VR users 10 to 13.

Figure 5:
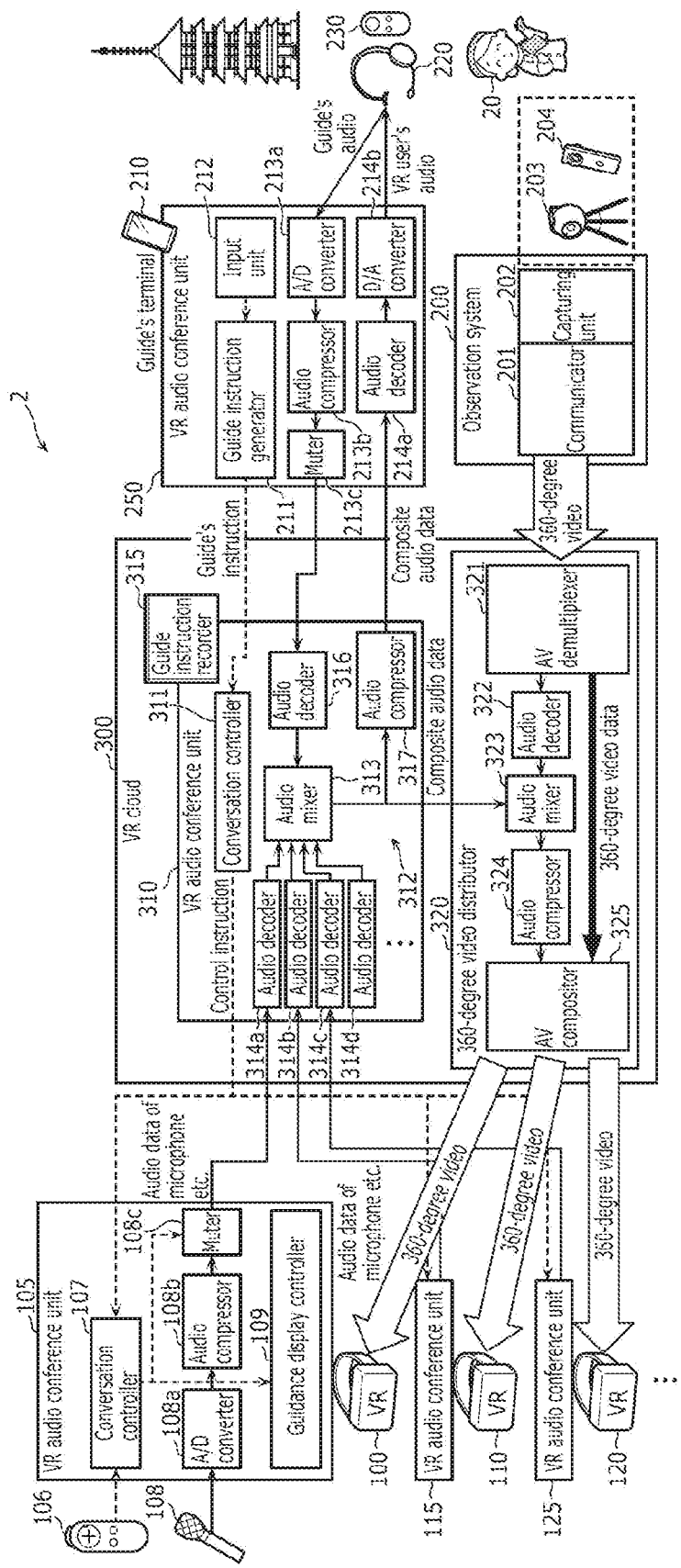
FIG. 5 is a block diagram illustrating a detailed configuration of the VR tourism system according to Example 1.

FIG. 5 is a block diagram illustrating a detailed configuration of VR tourism system 2 according to Example 1. As VR tourism system 2, in the configuration example of VR tourism system 650 according to the reference example illustrated in FIG. 1B, conversation controller 311 and guide instruction recorder 315 are added to VR audio conference unit 310 of VR cloud 300, conversation controller 107 and guidance display controller 109 are added to VR audio conference unit 105 of VR systems 100, 110, 120, and 130, and input unit 212 and guide instruction generator 211 are added to VR audio conference unit 250 of smartphone 210 that is a guide's terminal.

In other words, input unit 212 that accepts input by a user and guide instruction generator 211 that conveys, based on the input, instruction contents of guide 20 to VR audio conference unit 310 in VR cloud 300 are included in VR audio conference unit 250 in guide's terminal 210 or the like. In addition, VR cloud 300 includes conversation controller 107 which receives an instruction of guide 20 sent from guide's terminal 210 or the like, which records contents of the instruction in guide instruction recorder 315, which generates a control instruction for controlling VR audio conference unit 105 of VR systems 100, 110, 120, and 130, and which transmits the generated control instruction to VR systems 100, 110, 120, and 130.

Furthermore, VR audio conference unit 105 of VR systems 100, 110, 120, and 130 includes conversation controller 107 which is responsible for setting a mute state of muter 18c according to contents of a control instruction sent from VR cloud 300 and user input and changing a guidance display state such as "questions allowed" by issuing an instruction to guidance display controller 109.

Such a configuration realizes functions illustrated in FIG. 4 as an algorithm of the operation flow example of VR tourism system 2 according to Example 1 illustrated in FIG. 6 described below is executed.

FIG. 6 is a diagram illustrating an operation flow example of VR tourism system 2 (in other words, a specific example of a video display method) according to Example 1. More specifically, (a) in FIG. 6 illustrates an operation flow of VR systems 100, 110, 120, and 130, (b) in FIG. 6 illustrates same operation mode explanation table 410 as (b) in FIG. 4 for reference, and (c) in FIG. 6 illustrates an operation flow of VR cloud 300.

As illustrated in (c) in FIG. 6, VR cloud 300 is capable of accepting a "guide's instruction" (as transition of operation modes, a transition to "questions allowed" and a transition to "questions not allowed") from an APP of smartphone 210 or from guide's remote controller 230 or the like via input unit 212 and guide instruction generator 211 of guide's terminal 210 or the like (S10).

In addition, conversation controller 311 determines the accepted "guide's instruction" (S11) and sorts instructions into the following two types of processing. Specifically, when the "guide's instruction" is "questions allowed" (Y in S11), the instruction is set to "questions allowed" (S13), and when the "guide's instruction" is "questions not allowed" (N in S11), the instruction is set to "questions not allowed" (S12).

In addition, conversation controller 311 notifies all VR systems 100, 110, 120, and 130 that guide 20 has issued a new instruction together with instruction contents (S14) and returns to step S10.

On the other hand, while each VR system 100, 110, 120, or 130 performs main processing of a VR tourism distribution service, when there are the following two types of interrupt processing (S30 to S40 and S20 to S24) as illustrated in (a) in FIG. 6, the interrupt processing is performed before returning to the main processing. If there is no interrupt processing, reception processing in the VR tourism service is continued until the VR tourism distribution service ends.

Note that the main processing of VR systems 100, 110, 120, and 130 refers to processing in which VR systems 100, 110, 120, and 130 provide VR users 10 to 13 with a VR space for VR tourism and is processing involving receiving a 360-degree video sent from 360-degree video distributor 320, demultiplexing the received 360-degree video into video data and audio data, and after decoding the demultiplexed audio data, performing audio processing dependent on a position and an azimuth of VR observation system 200 and outputting to a loudspeaker as audio while, on the other hand, after decoding the demultiplexed video data, performing mapping on a 360-degree spherical video, further performing video segmentation dependent on a position and an azimuth of VR observation system 200, and outputting as a video to a display.

A first type of interrupt processing is user input interrupt processing of VR systems 100, 110, 120, and 130. Conversation controller 107 receives a VR user input from VR remote controller 106 or the like (S30), and when the received VR user input is a "question in progress" request (Y in S31), conversation controller 107 refers to information in guide instruction recorder 315 (S33).

As a result, when a value of the guide's instruction is "questions not allowed" or, in other words, the first state (N in S35), the processing is ended, but when the value of the guide's instruction is "questions allowed" (Y in S35) and the display mode is "questions allowed" or, in other words, the second state (N in S36), guidance display controller 109 changes the display mode to "question in progress" (S37), muter 108c sets unmute (S38) or, in other words, changes to the third state, and ends processing.

On the other hand, when the value of the guide's instruction is "questions allowed" (Y in S35) and the display mode is "question in progress" or, in other words, the third state (Y in S36), guidance display controller 109 changes the display mode to "questions allowed" (S39), muter 108c sets to "mute" or, in other words, the second state (S40), and ends processing.

Note that when the VR user input is other than a "question in progress" request (N in S31), conversation controller 107 processes the VR user input (S32) and ends processing.

A second type of interrupt processing is interrupt processing from VR cloud 300. Conversation controller 311 records the guide instruction received from VR cloud 300 in guide instruction recorder 315.

In addition, when the guide instruction is "questions allowed" (Y in S21), guidance display controller 109 is caused to change the display mode to "questions allowed" or, in other words, the second state (S23) and the processing is ended. On the other hand, when the guide instruction is "questions not allowed" (N in S21), guidance display controller 109 changes the display mode to "questions not allowed" (S22), muter 108c sets to "mute" (S24) or, in other words, the first state, and ends processing.

Figure 7:
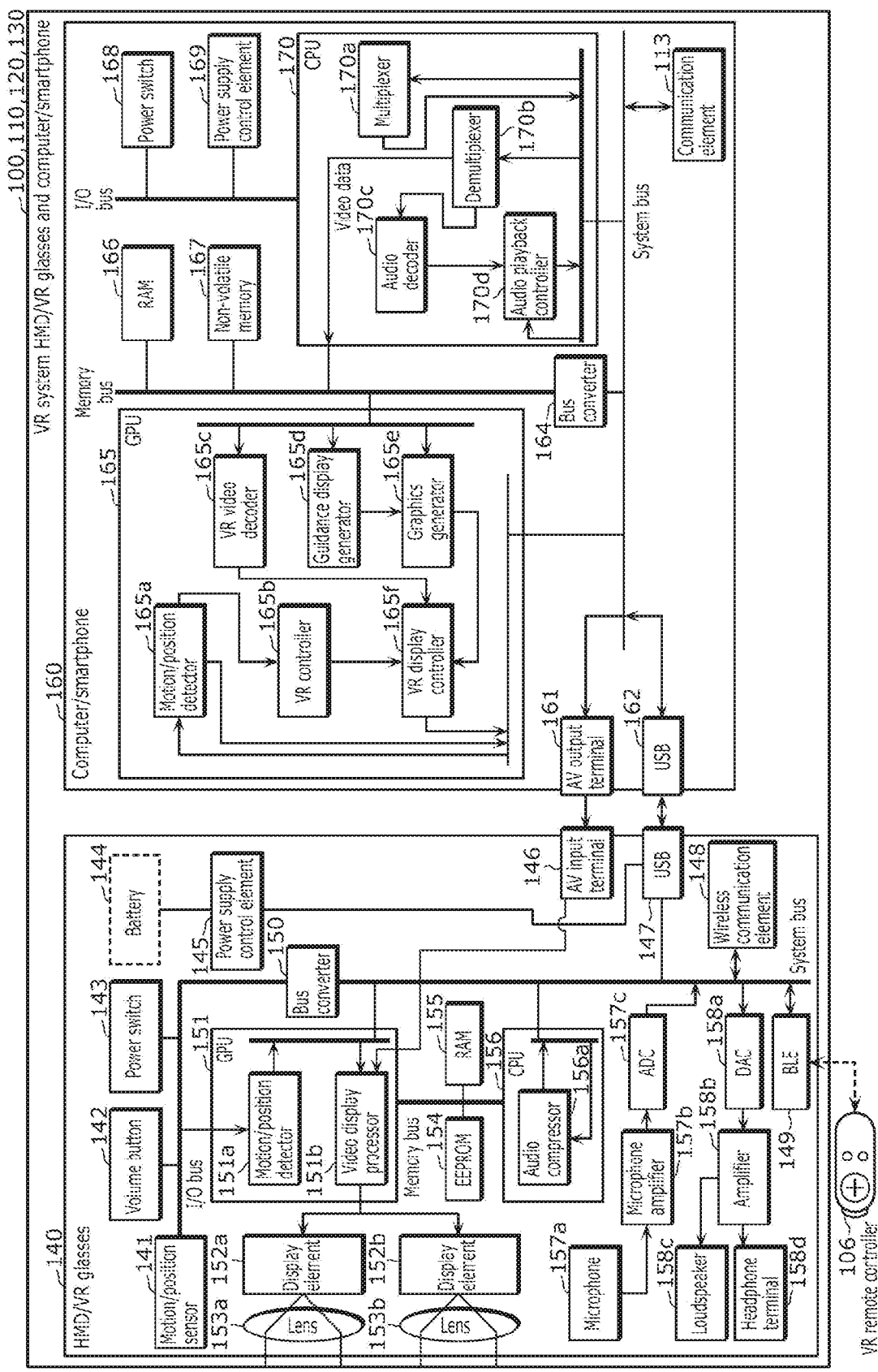
FIG. 7 is a diagram illustrating a specific configuration example of a VR system of the VR tourism system according to Example 1.

FIG. 7 is a diagram illustrating a specific configuration example of VR systems 100, 110, 120, and 130 of VR tourism system 2 according to Example 1. In the present configuration example, VR systems 100, 110, 120, and 130 are constituted of a computer or a smartphone (computer/smartphone 160) and an HMD (head-mounted display) or VR glasses (HMD/VR glasses 140) connected thereto. Instead of the present configuration example, VR systems 100, 110, 120, and 130 may be solely constituted of HMD/VR glasses 140. In such a case, functions of a CPU and a GPU of both components are integrated and peripheral functions are also consolidated.

As main components, computer/smartphone 160 is constituted of: high-speed communication element 163 that supports WiFi (registered trademark) or Ethernet (registered trademark) for connecting to VR systems 100, 110, 120, and 130; GPU (Graphics Processing Unit) 165 that mainly performs processing of video data and graphics; CPU (Central Processing Unit) 170 that performs general data processing and control of entire computer/smartphone 160; non-volatile memory 167 that is a hard disk, a flash memory, or the like for storing a program necessary for running CPU 170 and GPU 165; RAM 166 used to store data necessary for running CPU 170 and GPU 165; power supply control element 169 for supplying power to power switch 168 and the respective units; AV output terminal 161 for outputting video and audio signals to HMD/VR glasses 140; an I/F such as USB (Universal Serial Bus) for controlling HMD/VR glasses 140 and acquiring data therefrom; a memory bus that connects RAM 166 and non-volatile memory 167 and enables access by CPU 170 and GPU 165; a system bus that enables CPU 170 and GPU 165 to access AV output terminal 161, USB 162, and communication element 163; bus converter 164 that connects the system bus and the memory bus to each other; a display device that is not illustrated; an input device for performing operations; other general-purpose I/Fs (interfaces), and the like.

As functions exercised by executing the program, CPU 170 includes: multiplexer 170a that multiplexes video data and audio data; demultiplexer 170b that demultiplexes video data and audio data from a received 360-degree video; audio decoder 170c that decodes demultiplexed audio data; and audio playback controller 170d that controls playback of decoded audio data.

As functions exercised by executing the program, GPU 165 includes: motion/position detector 165a that receives motion/position data generated by motion/position detector 165a of HMD/VR glasses 140 and detects a motion and a position of a VR user; VR controller 165b that issues a generation instruction of a VR space based on the detected motion and position of the VR user; VR video decoder 165c that decodes video data demultiplexed by CPU 170; guidance display generator 165d that instructs display and generation of guidance such as "questions not allowed", "questions allowed", and "question in progress"; graphics generator 165e that generates graphics of a guidance based on the instruction; and VR display controller 165f that composites video data decoded by VR video decoder 165c and graphics generated by the graphics generator based on the generation instruction of a VR space from VR controller 165b and outputs the composite video data/graphics as a VR video to HMD/VR glasses 140.

While there are cases that differ from the present example in terms of some types of processing being performed by GPU 165 or CPU 170 and also in terms of bus configurations, there is no difference in functional configurations and operations. In addition, AV output terminal 161 and USB 162 may be replaced with I/Fs such as USB_Type C (registered trademark) as high-speed two-way I/Fs. In such a case, HMD/VR glasses 140 are to be connected by a same I/F or connected by a converter that converts the I/F. Generally, when sending a video by USB 162, since a data amount is compressed by suitable compression, suitable video compression is performed by CPU 170 or GPU 165 and a VR video is sent to HMD/VR glasses 140 via USB 162.

On the other hand, as main components, HMD/VR glasses 140 in VR systems 100, 110, 120, and 130 include: an audio input unit constituted of microphone 157a for inputting audio, microphone amplifier 157b, and ADC (A/D converter) 157c; an audio output unit constituted of loudspeaker 158c, headphone terminal 158d, amplifier 158b, and DAC (D/A converter) 158a; a VR display unit constituted of two sets of lenses 153a and 153b for a user to view VR video and display elements 152a and 152b; motion/position sensor 141 constituted of a motion/position detector and an azimuth detector constituted of a gyro sensor, a camera, an ultrasonic microphone, or the like; wireless communication element 148 such as Bluetooth (registered trademark) for communicating with a controller (not illustrated); volume button 142 for controlling output volume from the audio output unit; power switch 143 for turning on/off power of HMD/VR glasses 140; power supply control element 145 for power supply control; a memory bus that connects EEPROM 154, RAM 155, and an SD card (registered trademark) with GPU 151 and CPU 156 and performs exchange of data with the memories; AV input terminal 146 for receiving video signals and audio signals from CPU 156, GPU 151, wireless communication element 148, and computer/smartphone 160; an I/F such as USB 147 for receiving a control signal from computer/smartphone 160 and sending video, audio signals, and data of motion/positions; CPU 156 that mainly performs control of audio compression (audio compressor 156a), switches, and power and performs control of entire HMD/VR glasses 140; GPU 151 that includes video display processor 151b that mainly adjusts video to the VR display unit and motion/position detector 151a that corrects and shapes motion/position information to be sent to computer/smartphone 160 from information from motion/position sensor 141; EEPROM 154 for storing programs and data that enable CPU 156 and GPU 151 to run; RAM 155 for storing data while CPU 156 and GPU 151 are running; a memory bus for connecting CPU 156, GPU 151, RAM 155, and EEPROM 154; a system bus to which CPU 156, GPU 151, USB 147, the audio input unit, the audio output unit, and wireless communication element 148 are connected and which performs control and exchange of data; an I/O bus that performs control and low-speed exchange of data including the buttons described earlier, power supply control element 145, motion/position sensor 141 and, although not illustrated, the audio input unit, the audio output unit, a VR photography camera, and the like; and several bus converters 150 that connect the respective buses to each other.

Furthermore, HMD/VR glasses 140 are configured to be connectible to VR remote controller 106 via BLE (Bluetooth Low Energy; registered trademark) 149 and enable an operation to request a "question" when VR users 10 to 13 wish to engage in a conversation with guide 20.

While there are cases that differ from the present example in terms of some types of processing being performed by GPU 151 or CPU 156 and also in terms of bus configurations, there is no difference in functional configurations and operations.

In addition, since video data from AV input terminal 146 has a large data amount and is high-speed, the video data is illustrated as being directly loaded into GPU 151 when the system bus lacks sufficient speed.

Furthermore, video information photographed by the camera included in motion/position sensor 141 may be sent to display elements 152a and 152b as information used by a VR user to check a periphery of HMD/VR glasses 140 or sent to computer/smartphone 160 through USB 147 to monitor whether a user is not in a dangerous situation.

In addition, power supply control element 145 receives power supply from USB 147 or AV input terminal 146, performs stabilization of voltage, management of battery capacity, and the like and, although not illustrated, supplies power to all constituent elements. In some cases, battery 144 may be provided inside or outside and battery 144 may be connected to power supply control element 145.

A state of a button or a cursor of controllers (not illustrated) is acquired by CPU 156 through wireless communication element 148 and used to perform a button operation, a movement, or an application operation in VR space. A position and an orientation of the controllers are detected by a camera or an ultrasonic sensor included in motion/position sensor 141 and, after being subjected to suitable processing by motion/position sensor 141, used for control by CPU 156 and, at the same time, sent to computer/smartphone 160 via USB 147 to be used in a program executed by CPU 156 or used in rendering of graphics and image processing executed by GPU 151.

Figure 8:
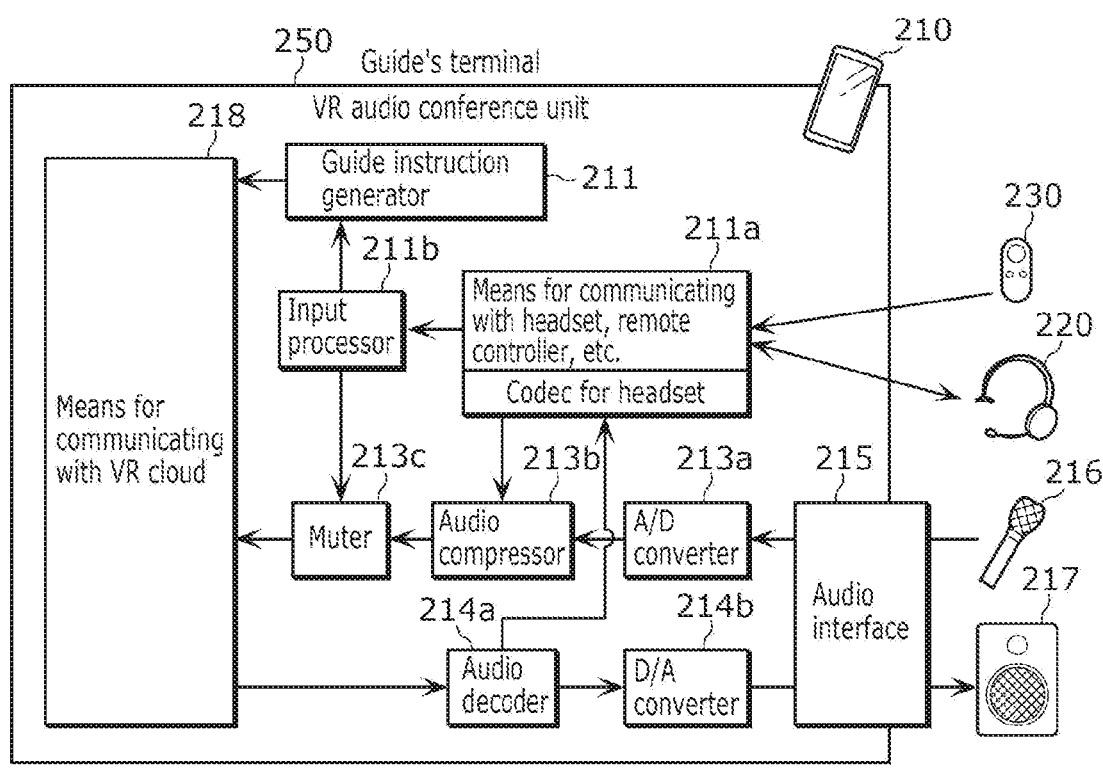
FIG. 8 is a diagram illustrating a specific configuration example of a VR audio conference unit included in a guide's terminal of the VR tourism system according to Example 1.

FIG. 8 is a diagram illustrating a specific configuration example of VR audio conference unit 250 included in guide's terminal 210 or the like of VR tourism system 2 according to Example 1. VR audio conference unit 250 includes: communicating means with VR cloud 300 (communicating means via a terminal having a communication function of using carrier communication such as 5G or Wi-Fi (registered trademark) to communicate with VR cloud 300 such as a PC or smartphone 210); audio interface 215 for connecting to external devices that perform audio input/output such as microphone 216 and loudspeaker 217; A/D converter 213a and D/A converter 214b which convert analog audio into digital data or reverse processing thereof; audio compressor 213b and audio decoder 214a for compressing and decoding digital audio data; muter 213c for temporarily preventing an audio signal from microphone 216 from being sent; and guide instruction generator 211 that converts an input into a guide instruction and sends the guide instruction to VR cloud 300.

Furthermore, guide's terminal 210 or the like includes communicator/CODEC for headset 211a which performs power-saving communication such as BLE (registered trademark) with external headset 220 and guide's remote controller 230 or the like and input processor 211b that issues an input instruction according to the communication and outputs the input instruction to guide instruction generator 211.

While a dedicated terminal may be used as guide's terminal 210 or the like, since guide's terminal 210 or the like can be readily implemented with smartphone 210 and an APP of smartphone 210, guide's terminal 210 or the like may be implemented as an APP on smartphone 210 (business or private use) in the possession of guide 20. However, using guide's remote controller 230 connected by low-power consumption communication such as BLE (registered trademark) of smartphone 210 instead of operating smartphone 210 is more preferable since operations are simple and the fact that an operation is being performed can be hidden from VR users 10 to 13.

Using guide's remote controller 230 enables operations to be performed by simply blind-pushing a button on guide's remote controller 230 being hand-held even when an explanation is being provided.

As described above, due to VR tourism system 2 according to Example 1, the simple user interface illustrated in FIG. 4 is realized and the problem (1) described earlier is solved.

Variation 1 of Example 1

Next, Variation 1 of Example 1 will be described.

Figure 9:
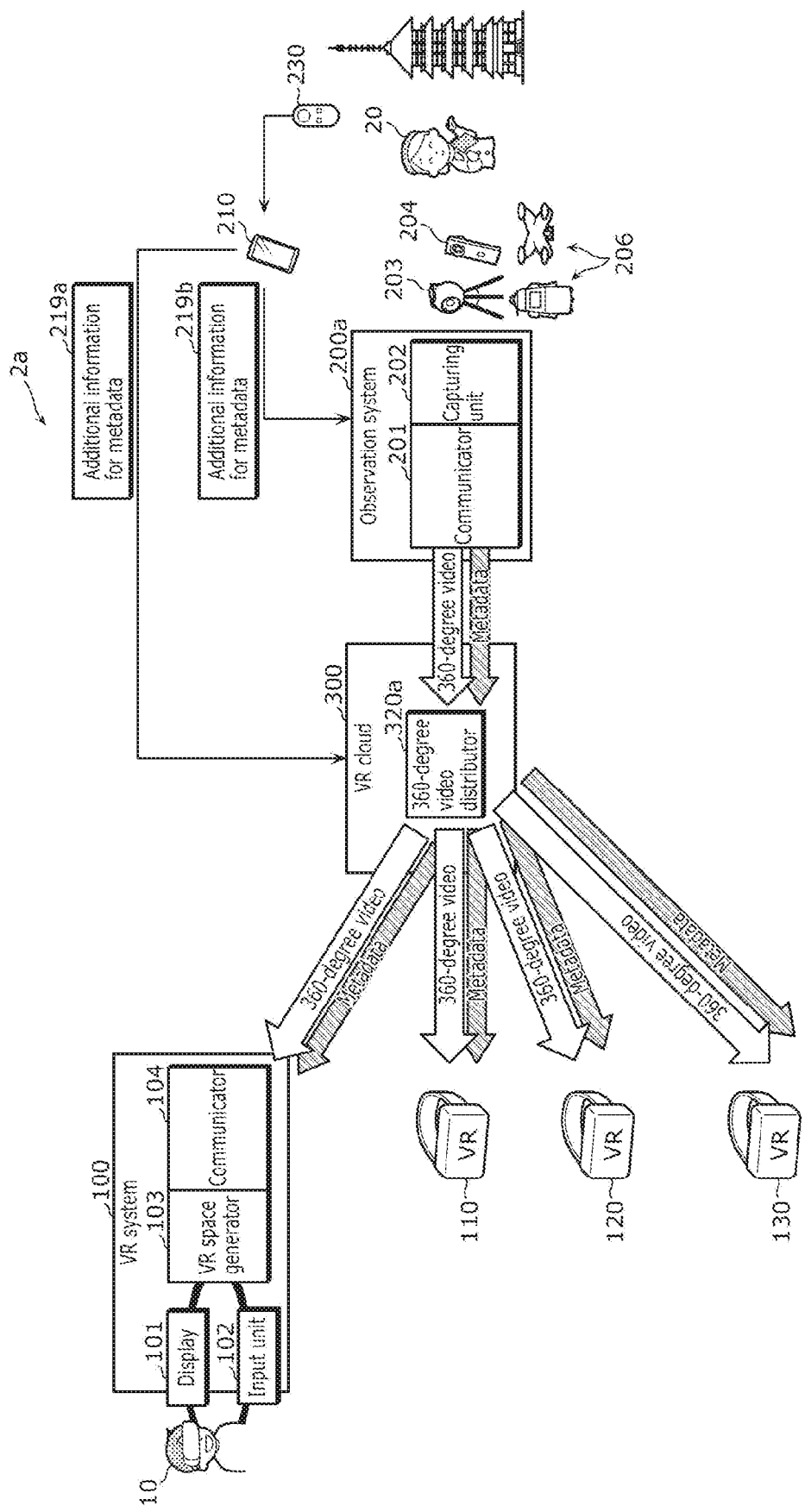
FIG. 9 is a schematic configuration diagram of a VR tourism system according to Variation 1 of Example 1.

FIG. 9 is a schematic configuration diagram of VR tourism system 2a according to Variation 1 of Example 1. VR tourism system 2a is a system that is VR tourism system 2 according to Example 1 being applied to a VR tourism system with a "VR sickness prevention function" and to a VR tourism system with a "lost person prevention function".

In this case, a VR tourism system with a "VR sickness prevention function" is a VR tourism system with the following functions. Specifically, in order to avoid VR sickness that accompanies a movement of a 360-degree camera used to take photos in VR tourism or the like, a VR tourism system with a "VR sickness prevention function" has a function of avoiding (reducing) VR sickness by sending metadata (a movement of a camera that photographs a 360-degree video, a time of day of start of panning, a movement direction, or the like) in addition to the 360-degree video from a VR observation system to a VR system, generating a visual effect (a display on a screen or the like) or a non-visual effect (a sound, vibration of a controller, or the like) which appropriately notifies a viewer of a movement immediately before a camera movement or during a movement period in the VR system, and displaying an unconventional visual effect video or the like to prompt the viewer to take a precaution or to prevent the viewer from becoming sick.

In addition, a VR tourism system with a "lost person prevention function" is a VR tourism system with the following functions. Specifically, a VR tourism system with a "lost person prevention function" has a function of preventing a user from getting lost by sending, with respect to a VR user, metadata including a trigger or the like that is generated by a tour guide (leader, explainer) to a VR system and presenting a visual guidance of a position of the guide or a visual guidance indicating a position in a 3D-space of an object designated (being explained) by the guide in the form of a video, audio, vibration, or the like.

VR tourism system 2a according to the present variation includes VR systems 100, 110, 120, and 130, VR cloud 300a, observation system 200a, and guide's terminals (smartphone 210, guide's remote controller 230).

Guide's terminal 210 and the like respectively send acquired pieces of metadata additional information 219a and 219b to VR cloud 300a and observation system 200a. Observation system 200a includes camera 203, remote controller 204, capturing unit 202, and communicator 201 mounted to vehicle 206 for acquiring a 360-degree video and transmits metadata additional information 219b received from guide's terminal 210 and the like and a 360-degree video to VR cloud 300a. VR cloud 300a includes 360-degree video distributor 320a that distributes metadata additional information 219a received from guide's terminal 210 and the like and the 360-degree video received from observation system 200a to VR systems 100, 110, 120, and 130. In VR systems 100, 110, 120, and 130, VR space generator 103 exercises the "VR sickness prevention function" and the "lost person prevention function" by changing displays according to the metadata received from VR cloud 300a.

In essence, VR tourism system 2a according to the present variation acquires additional information to form a basis of metadata by various methods (a movement of a camera that photographs a 360-degree video, a time of day of start of panning, a movement direction, or the like), generates metadata, and sends the metadata to respective VR systems 100, 110, 120, and 130 via VR cloud 300a. By generating additional information based on the metadata when reproducing a VR space using the 360-degree video, VR systems 100, 110, 120, and 130 can prevent VR sickness and present appropriate guidance information.

In this case, when assuming smartphone 210 having functions of a GPS, an IMU (inertial measurement unit), a camera, and the like as the guide's terminal, the following two scenarios are possible: (1) acquiring data effective for metadata generation using position information, acceleration information, and the like of smartphone 210, sending the acquired data to VR cloud 300a and observation system 200a, and having VR cloud 300a and observation system 200a generate metadata; and (2) acquiring data effective for metadata generation using position information, acceleration information, and the like of smartphone 210, sending the acquired data to VR cloud 300a, and having VR cloud 300a combine the data with metadata from observation system 200a to create metadata.

In addition, by adding a movement start/stop button or the like to guide's remote controller 230 that is capable of communicating with smartphone 210 by BLE (registered trademark) and by having guide 20 press the button before moving or before stopping a movement, accuracy of movement detection or the like can be improved and more appropriate metadata can be generated.

Variation 2 of Example 1

Next, Variation 2 of Example 1 will be described.

Figure 10:
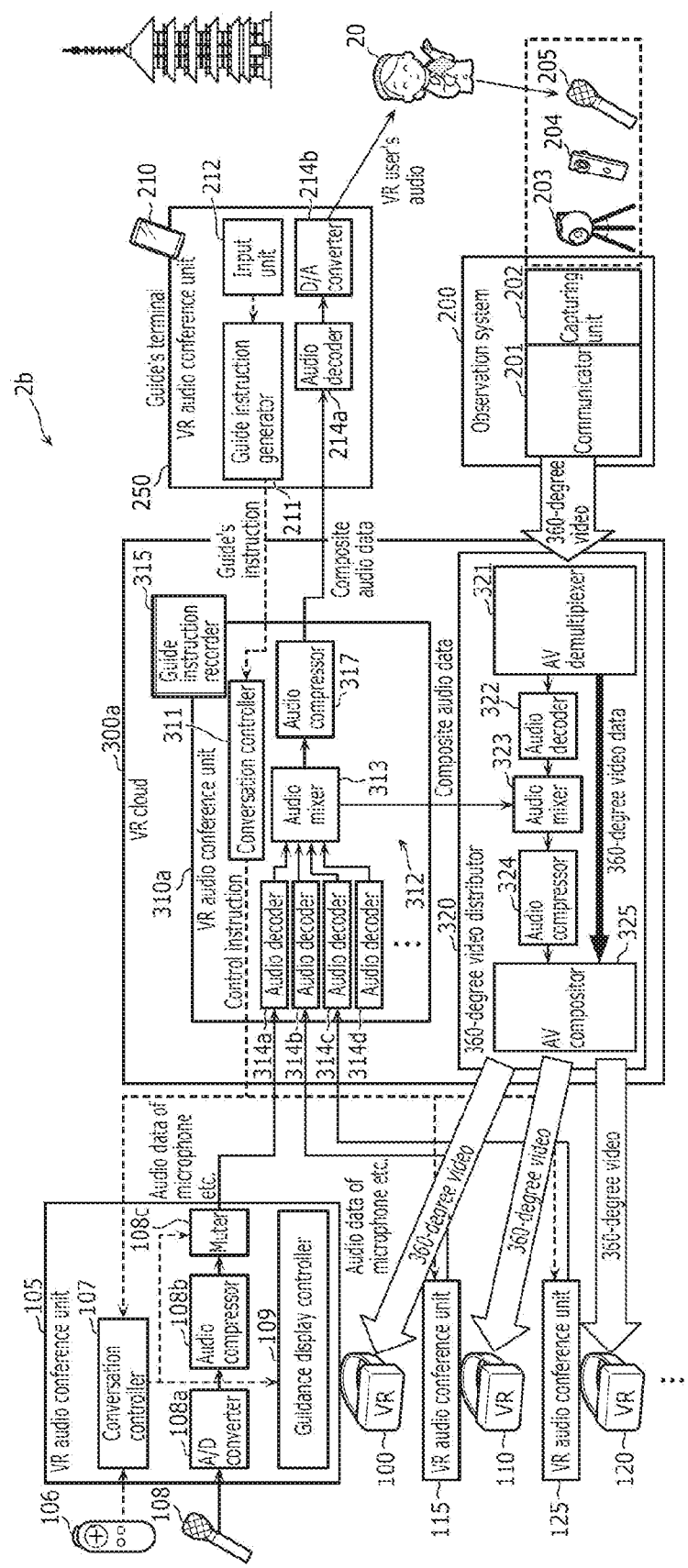
FIG. 10 is a schematic configuration diagram of a VR tourism system according to Variation 2 of Example 1.

FIG. 10 is a schematic configuration diagram of VR tourism system 2b according to Variation 2 of Example 1. VR tourism system 2b corresponds to a second specific example of solving the problem (1) (a simple user interface that enables diverse participants to use the VR tourism service must be provided) described above.

In VR tourism system 2 according to Example 1 illustrated in FIG. 5, guide's terminal 210 and the like have two functions, namely, a function of listening to voices of VR users 10 to 13 and a function of conveying audio of guide 20 to VR users 10 to 13 via VR cloud 300. In VR tourism system 2b according to the present variation, audio of guide 20 is acquired from microphone 205 of observation system 200. Therefore, in VR tourism system 2b according to the present variation, a portion of transferring audio of guide 20 to VR systems 100, 110, 120, and 130 from guide's terminals 210 and the like and VR audio conference unit 310a of VR cloud 300a has been deleted from VR tourism system 2 according to Example 1.

As described above, even in VR tourism system 2b according to the present variation, only a path of acquiring audio of guide 20 differs from Example 1 and the problem (1) described above is solved.

Example 2

Next, Example 2 will be described as a specific example of solving the problem (2) (bad-mannered users who obstruct provision of an explanation by guide 20 by verbally abusive language, continuous questions, and the like must be eliminated) described above.

(2) Even VR users who make inappropriate remarks and obstruct an explanation by guide 20 by verbally abusive language, continuous questions, and the like may possibly participate in VR tourism. Tourism experience by other good VR users is inhibited unless utterances by such participants are eliminated. When such a situation occurs, guide 20 must handle the situation with a simple operation. Specifically, a function of muting an utterance of the corresponding user with an instruction by guide 20 and enabling "utterances not allowed" to continue even in a state where "utterances are allowed" for other users in order to prevent the corresponding user from making subsequent utterances is required, and a VR tourism system having such a function will be described as a VR tourism system according to Example 2. The VR tourism system according to Example 2 is a system in which a function of solving the problem (2) has been added to VR tourism system 2 according to Example 1.

Figure 11:
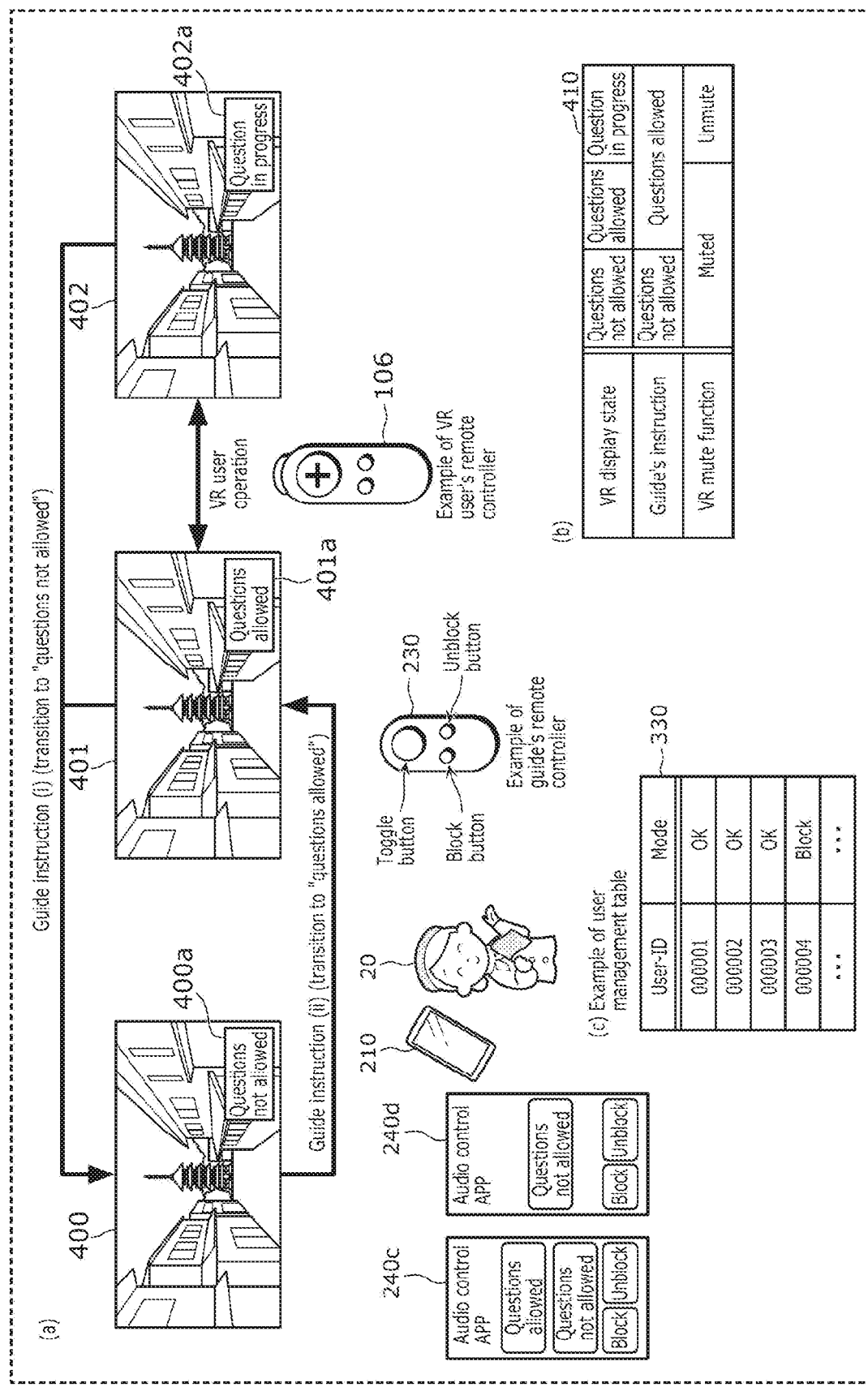
FIG. 11 is a diagram illustrating an operation example of a VR tourism system according to Example 2.

FIG. 11 is a diagram illustrating an operation example of a VR tourism system according to Example 2. More specifically, (a) in FIG. 11 illustrates a display example in VR systems 100, 110, 120, and 130, display examples 240c and 240d using an audio control application in smartphone 210 of guide 20, an operation example of guide's remote controller 230, and an operation example of VR remote controller 106 by VR user 10 or the like. In FIG. 11, (b) illustrates same operation mode explanation table 410 as in (b) in FIG. 4. In FIG. 11, (c) illustrates user management table 330 included in a VR audio conference unit according to the present example. User management table 330 is an example of blocking information 70 in an embodiment including permission/refusal information that indicates, with respect to each of a plurality of participants, whether or not to block questions to an explainer and, specifically, user management table 330 is an information table that records a "mode" indicating, for each VR user ("User-ID"), whether or not ("Block" or "OK") the VR user is a user who is an object of the block.

As illustrated in (a) in FIG. 11, VR systems 100, 110, 120, and 130 having three display modes, UIs of guide's remote controller 230 and VR remote controller 106, and internal operation processing are the same as in Example 1.

In addition, in the VR cloud, while basic functions (switching between "questions allowed" 401a and "questions not allowed" 400a) of guide instructions are the same as in Example 1, the following functions have been added.

Specifically, as illustrated in (c) in FIG. 11, user management table 330 that records, for each VR user, whether the VR user is a good user or a user who makes an inappropriate remark has been added in the VR cloud. User management table 330 is an example of blocking information 70 according to Variation 1 of the embodiment.

In addition, as illustrated in display examples 240c and 240d and an operation example of guide's remote controller 230 in (a) in FIG. 11, a function has been added which enables a "block" instruction for guide 20 to block (forced mute) utterances of a user having made an inappropriate remark and an "unblock" instruction that allows utterances of a blocked user.

Furthermore, a function has been added which, when a "block" instruction is issued, changes a value of "Mode" of a corresponding user in user management table 330 to "Block" and performs forced muting of the corresponding user.

In addition, a function has been added which, when guide 20 issues an "unblock" instruction, changes values of "Mode" of all users in user management table 330 to "OK". Note that when guide 20 issues an "utterance allowed" instruction, display in the VR system with respect to a user of which the value of "Mode" in user management table 330 is "Block" remains unchanged as "questions not allowed" 400a.

Figure 12:
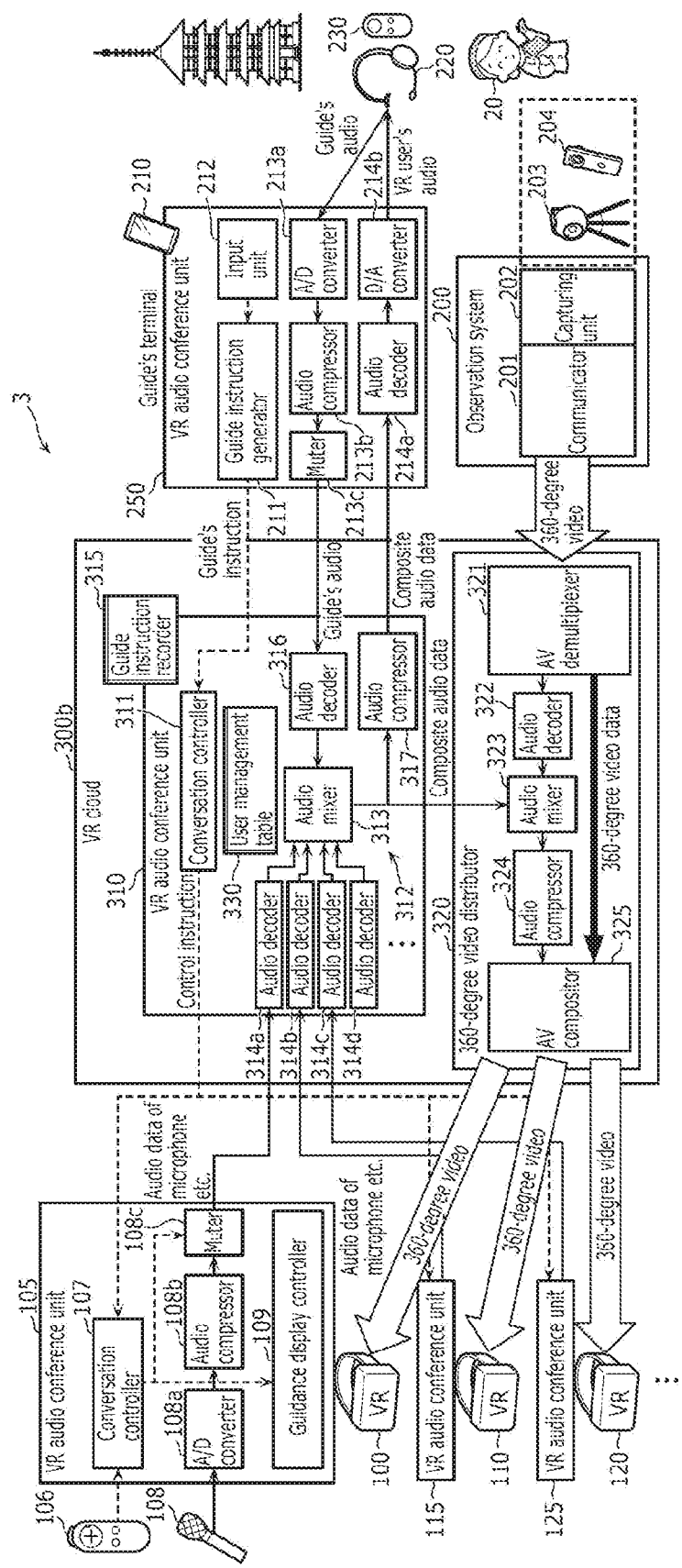
FIG. 12 is a schematic configuration diagram of the VR tourism system according to Example 2.

FIG. 12 is a schematic configuration diagram of VR tourism system 3 according to Example 2. VR tourism system 3 is a system in which a function of solving the problem (2) has been added to VR tourism system 2 according to Example 1 and includes VR systems 100, 110, 120, and 130, VR cloud 300b, guide's terminal 210 and the like, and observation system 200. VR audio conference unit 310 of VR cloud 300b includes user management table 330 in addition to components according to Example 1.

A configuration of VR systems 100, 110, 120, and 130 of VR users 10 to 13 is the same as the configuration example of VR tourism system 2 according to Example 1 illustrated in FIG. 5 and operation methods of VR users 10 to 13 are also the same. In other words, VR users 10 to 13 are prevented from becoming aware of the fact that a user who makes an inappropriate remark is being blocked.

A configuration in VR audio conference unit 250 of guide's terminal 210 and the like is also the same as in Example 1. As a change, since "block" and "unblock" have been added to "questions allowed" and "questions not allowed" in VR tourism system 2 according to Example 1 as input received by input unit 212, "guide's instruction" that is sent to VR cloud 300b has also been added.

VR audio conference unit 310 of VR cloud 300b is an example of controller 62a according to Variation 1 of the embodiment and receives the "guide's instruction" sent from guide's terminal 210 and the like in VR cloud 300b, and when instruction contents thereof are "questions allowed" or "questions not allowed", VR audio conference unit 310 records the "guide's instruction" in guide instruction recorder 315. When the instruction from guide 20 is "block" and "unblock", VR audio conference unit 310 updates, in accordance with the instruction, user management table 330 for recording a user who makes an inappropriate remark.

Furthermore, VR audio conference unit 310 generates a "control instruction" for controlling VR audio conference unit 105 of VR systems 100, 110, 120, and 130, transmits the "control instruction" to all VR systems 100, 110, 120, and 130 and, as a result, in VR systems 100, 110, 120, and 130, guidance display controller 109 constantly displays "questions not allowed" 400a with respect to a blocked user.

FIG. 13 is a diagram illustrating an operation flow example of VR tourism system 3 (in other words, a specific example of a video display method) according to Example 2. More specifically, (a) in FIG. 13 illustrates an operation flow of VR systems 100, 110, 120, and 130, (b) in FIG. 13 illustrates same operation mode explanation table 410 as (c) in FIG. 11 for reference, (c) in FIG. 13 illustrates an operation flow of VR cloud 300, and (d) in FIG. 13 illustrates same user management table 330 as (c) in FIG. 11 for reference.

As illustrated in (c) in FIG. 13, in VR cloud 300b, conversation controller 311 is capable of accepting a "guide's instruction" (a transition to "questions allowed" and a transition to "questions not allowed") from an APP of smartphone 210 or from guide's remote controller 230 or the like via input unit 212 and guide instruction generator 211 of guide's terminal 210 or the like (S50).

In addition, conversation controller 311 determines the accepted "guide's instruction" and sorts instructions into the following four types of processing (S51 to S54). Specifically, when "guide's instruction" is "questions allowed" (Y in S51), the instruction is set to "questions allowed" (S60), when "guide's instruction" is "questions not allowed" (Y in S52), the instruction is set to "questions not allowed" (S61), when "guide's instruction" is "block" (Y in S53), a value of the user presently engaged in conversation in user management table 330 is changed to "Block" (S62), and when "guide's instruction" is "unblock" (Y in S54), values of all users in user management table 330 are changed to "OK" (S63).

Furthermore, conversation controller 311 notifies all VR systems 100, 110, 120, and 130 that guide 20 has issued a new instruction (instruction change notification) together with instruction contents (however, a user of which the value in user management table 330 is "block" is notified "questions not allowed" as instruction contents) (steps S70 to S75) and returns to step S50.

More specifically, in processing of transmitting the instruction change notification to each VR system (S70 to S75), conversation controller 311 first sets variable N to 1 (S70) and next extracts an N-th value from user management table 330 and increments variable N (S71). In addition, conversation controller 311 determines whether or not the value extracted from user management table 330 is "block" (S72) and, in the case of "block" (Y in S72), sets the instruction to "questions not allowed" (S73) and transmits an instruction change notification to a corresponding VR system (S74). When the value extracted from user management table 330 is not "block" (N in S72), conversation controller 311 transmits an instruction change notification to the corresponding VR system (S74) without setting the instruction to "questions not allowed".

Conversation controller 311 determines whether or not confirmation has been finished with respect to all VR users (S75) and, if not finished (N in S75), repeats steps S71 to S75 until confirmation is finished with respect to all VR users.

On the other hand, as illustrated in (a) in FIG. 13, operations of respective VR systems 100, 110, 120, and 130 are the same as operations of respective VR systems 100, 110, 120, and 130 according to Example 1. Specifically, while main processing of a VR tourism distribution service is performed in each VR system 100, 110, 120, or 130, when there is interrupt processing by a guide instruction from VR cloud 300 as illustrated in (a) in FIG. 13, interrupt processing similar to that in Example 1 is performed (S20 to S25). In addition, although not illustrated in FIG. 13, when there is an interrupt by a VR user input from VR remote controller 106 and the like, VR systems 100, 110, 120, and 130 perform interrupt processing similar to that in Example 1 (S30 to S40 in FIG. 6).

As described above, due to VR tourism system 3 according to Example 2, an utterance by a user who makes an inappropriate remark is eliminated using a simple user interface and the problem (2) described earlier is solved as in the operation example illustrated in FIG. 11.

Example 3

Next, Example 3 will be described as a specific example that solves the problem (3) (private conversations by participants with traveling companions must be supported) described above.

Before describing a specific example that solves the problem (3), first, the problem (3) will be described in detail using drawings.

Figure 14:
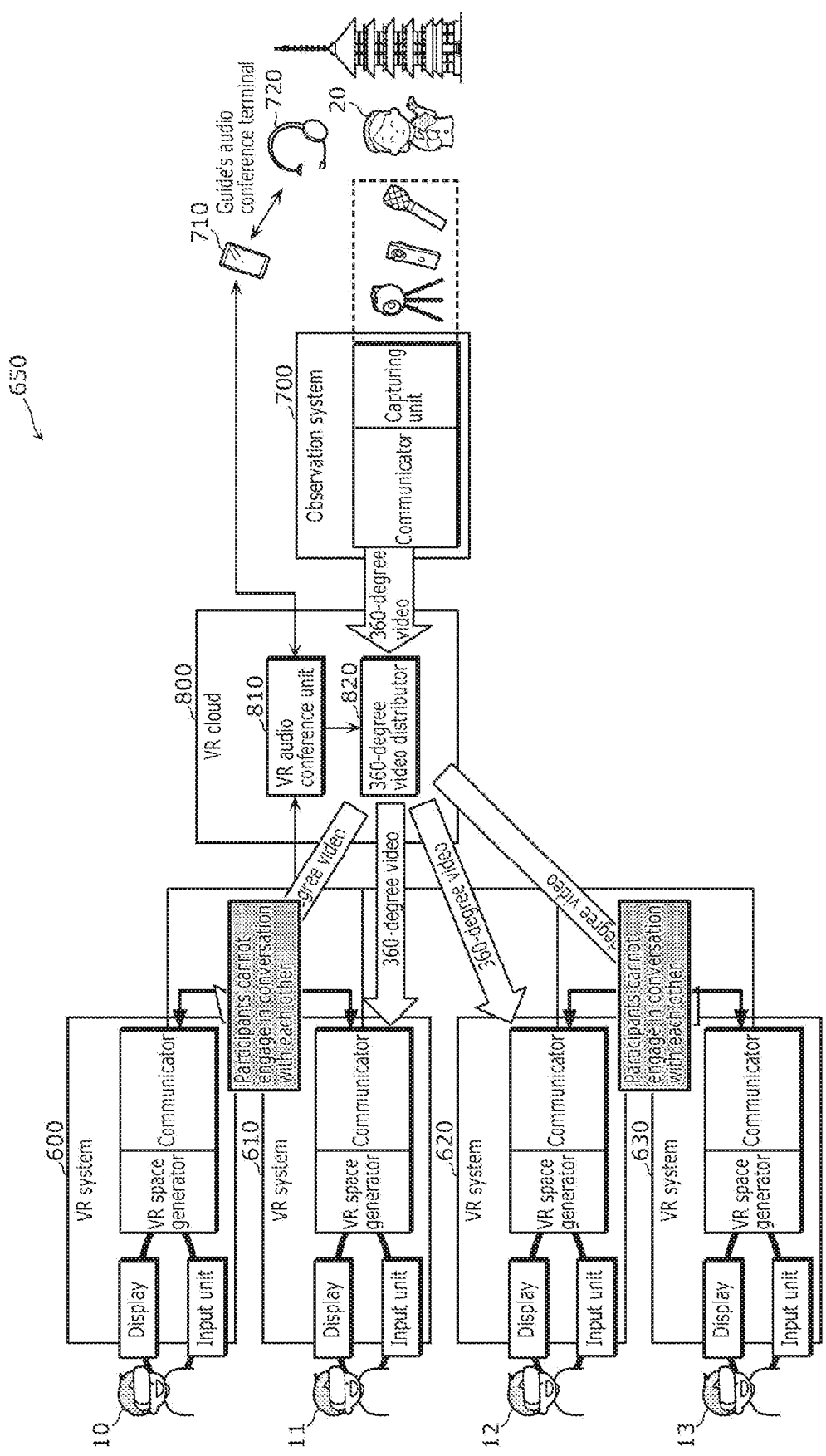
FIG. 14 is a diagram in which a description of a problem (3) has been added to the VR tourism system according to the reference example illustrated in FIG. 1A.

FIG. 14 is a diagram in which a description of the problem (3) has been added to VR tourism system 650 according to the reference example illustrated in FIG. 1A. As illustrated in FIG. 14, in VR tourism system 650 according to the reference example, since each of VR users 10 to 13 is participating in the VR tourism service using different VR systems 600, 610, 620, and 630, VR users 10 to 13 can only engage in conversation in a shared VR space during their participation. In other words, since utterances by VR users 10 to 13 in the VR space are shared among all participants, VR users 10 to 13 cannot engage in private conversations.

In the case of a videoconferencing system for business instead of a VR tourism system, since private conversations are usually not allowed during a conference, such an application is rare. Therefore, systems such as Teams (registered while videoconferencing trademark) and Zoom (registered trademark) provide a "Breakout Room" function of going into another conference room and having a conversation, there is no function for a specific group to engage in a private conversation in a same conference room. In addition, in an interaction/conference system in a VR space constituted by 3DCG such as VRChat, while there is a function for increasing a volume of a voice of a nearby person and reducing a volume of a voice of a faraway person, a private conversation function in a group is not implemented.

During a normal real group tour, a situation where a group member can no longer engage in private conversations with other group members does not occur. Therefore, in a VR tourism service, support is required for conversations in a same group. In such a case, the conversation must be prevented from being heard by guide 20 or tourists outside of the group.

In consideration thereof, a function capable of supporting a private conversation between friends who travel together is required and a VR tourism system having such a function will be described as a VR tourism system according to Example 3. The VR tourism system according to Example 3 is a system in which a function of solving the problem (3) has been added to VR tourism system 3 according to Example 2.

Figure 15:
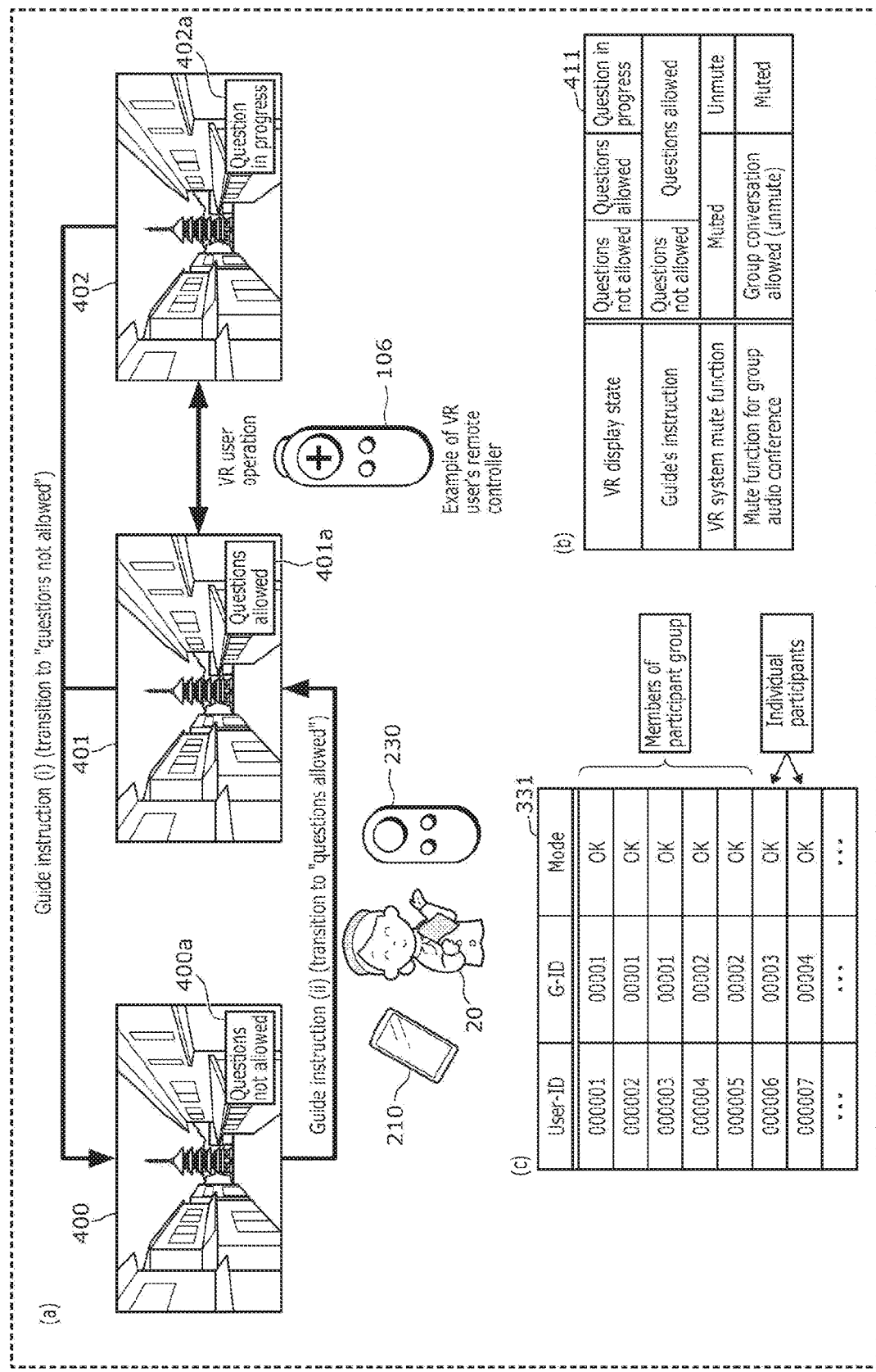
FIG. 15 is a diagram illustrating an operation example of a VR tourism system according to Example 3.

FIG. 15 is a diagram illustrating an operation example of the VR tourism system according to Example 3. More specifically, (a) in FIG. 15 illustrates a display example in VR systems 100, 110, 120, and 130, smartphone 210 and guide's remote controller 230 of guide 20, and VR remote controller 106 of VR user 10 or the like.

In FIG. 15, (b) illustrates operation mode explanation table 411 according to the present example. In operation mode explanation table 411, an item of "mute function for group audio conference" has been added to operation mode explanation table 411 according to Example 1. As indicated in the item of "mute function for group audio conference", when a "mute function of VR system" is "muted", the "mute function for group audio conference" becomes "group conversation allowed (unmuted)" and when the "mute function of VR system" is "unmuted", the "mute function for group audio conference" becomes "muted".

In FIG. 15, (c) illustrates user management table 331 included in a VR audio conference unit according to the present example. User management table 331 is an information table created by adding a group ID ("G-ID") for each VR user to user management table 330 according to Example 2. User management table 331 is an example of blocking information 71 according to Variation 2 of the embodiment.

When participating in a videoconference, although a conversation cannot be held with a part of the participants while preventing the conversation from being heard by other participants or a speaker, separately using a chat application such as Line (registered trademark) or WeChat (registered trademark) after muting oneself while participating in the videoconference to prevent his/her own conversation from becoming audible to the videoconference enables a group call with a part of the participants to be performed. However, participating in a videoconference using a PC and launching a chat application with smartphone 210 is a hassle and supporting both functions with a single VR tourism system is desired.

In the present example, based on the VR tourism system described in the operation example illustrated in FIG. 4, a private conversation in a group is realized by combining a function for setting a separate audio conference in a VR cloud for each group of which a VR user submits an application when signing up (upon participation, during participation) for VR tourism. Simply combining the two systems may make operations complicated and an inappropriate use of a muter or the like may cause a group conversation to leak out to a VR space and may annoy guide 20 or other VR users.

In consideration thereof, in the present example, as in the operation example illustrated in FIG. 15, voices of VR users 10 to 13 are not transmitted to the inside of the VR space unless VR users 10 to 13 explicitly present a question to guide 20. In other words, in states of "questions not allowed" and "questions allowed", a conversation within a group is not shared with the VR space (the "mute function for group audio conference" in (b) in FIG. 15 is "group conversation allowed (unmuted)"). In other words, operations by VR users are absolutely unnecessary in order to engage in a conversation within a group. On the other hand, only when guide 20 sets "question in progress" by an operation using guide's remote controller 230 in order for VR user 10 or the like in a group to ask guide 20 a question, a group audio conference of a corresponding user is muted in the VR tourism system (the "mute function for group audio conference" in (b) in FIG. 15 is "muted").

Since using the VR tourism system according to the present example completely prevents a conversation within a group from being heard by other participants, group tourism in which privacy is more protected than in the real world can be realized.

Figure 16:
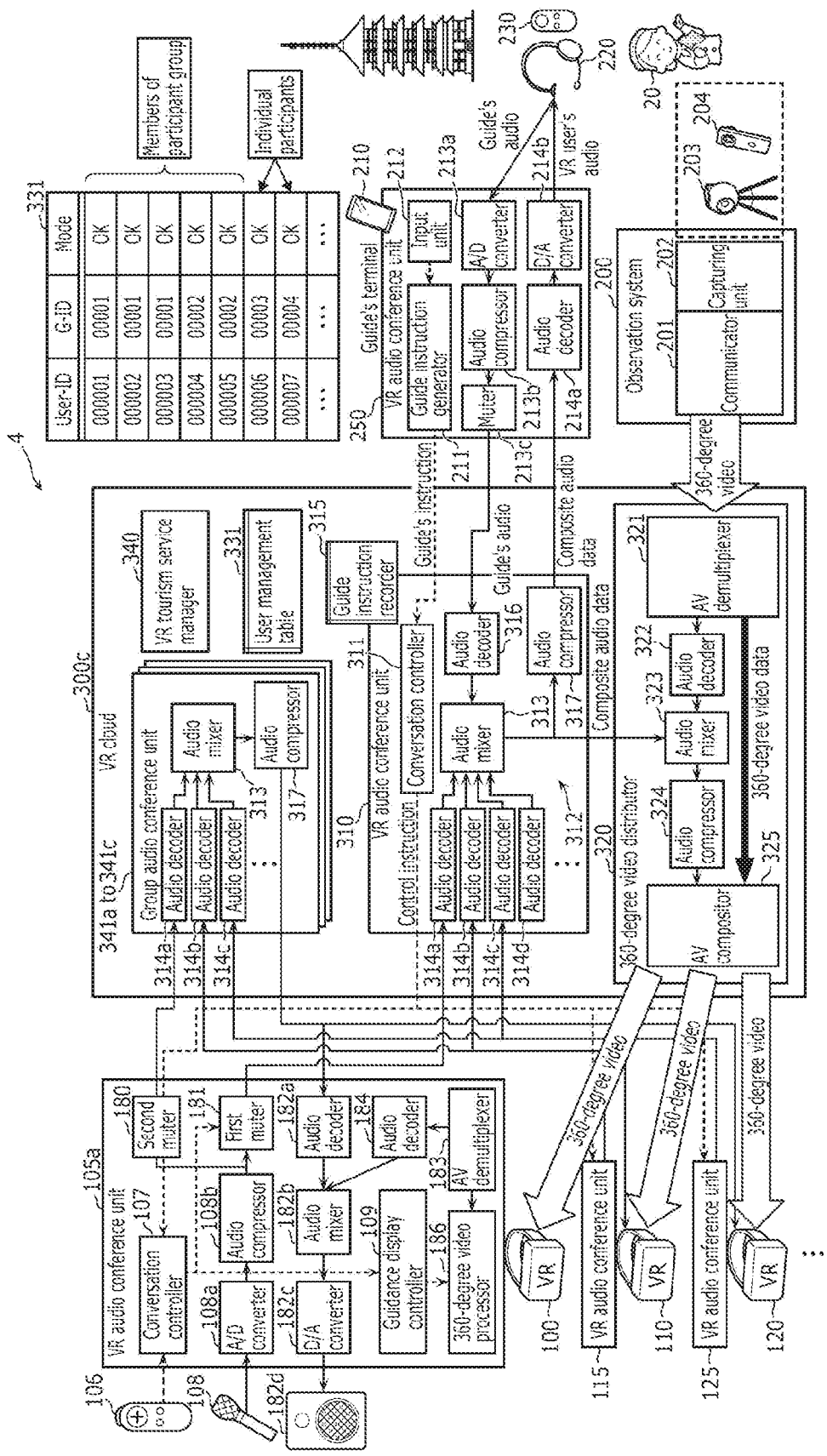
FIG. 16 is a block diagram illustrating a detailed configuration of the VR tourism system according to Example 3.

FIG. 16 is a block diagram illustrating a detailed configuration of VR tourism system 4 according to Example 3. VR tourism system 4 is a system in which a function of solving the problem (3) has been added to VR tourism system 3 according to Example 2 and includes VR systems 100, 110, 120, and 130, VR cloud 300c, guide's terminal 210 and the like, and observation system 200.

In VR cloud 300c, group audio conference units 341a to 341c that assist an audio conference for each group and VR tourism service manager 340 that manages VR tourism and group audio conferences are added to VR cloud 300b according to Example 2 and user management table 331 to which group IDs have been added is provided in place of user management table 330 according to Example 2. Group audio conference units 341a to 341c are examples of group audio conversation unit 64 according to Variation 2 of the embodiment and VR tourism service manager 340 is an example of controller 62b according to Variation 2 of the embodiment.

In addition, in VR audio conference unit 105a of VR systems 100, 110, 120, and 130, AV demultiplexer 183 that demultiplexes a 360-degree video and audio data from a 360-degree video sent from VR cloud 300c; audio decoder 184 that decodes the demultiplexed audio data; audio decoder 182a that decodes audio data sent from group audio conference units 341a to 341c of VR cloud 300c; audio mixer 182b that mixes the two pieces of audio data decoded by audio decoder 182a and audio decoder 184; and D/A converter 182c that converts the mixed audio data into an analog audio signal and outputs the analog audio signal to loudspeaker 182d have been added to the configuration of VR audio conference unit 105 according to Example 1 and Example 2, and first muter 181 that performs mute processing for VR tourism and second muter 180 that performs mute processing among group audio conference units 341a to 341c are provided in place of muter 108c according to Example 1 and Example 3. Note that 360-degree video processor 186 corresponds to VR space generator 103 according to Example 1.

In other words, VR tourism system 4 according to the present example is obtained by adding, inside VR cloud 300 of the configuration example of VR tourism system 2 according to Example 1 illustrated in FIG. 5, group audio conference units 341a to 341c for realizing a conversation for each user group, VR tourism service manager 340 that manages an entire system, and user management table 331 for managing which group each user belongs to.

VR audio conference unit 310 that realizes a conversation between VR users 10 to 13 and guide 20 and group audio conference units 341a to 341c that realizes a group conversation in VR cloud 300c are completely independent of each other and pieces of audio data managed by the two functions in VR cloud 300c never become mixed. Group audio conference units 341a to 341c are initialized in VR cloud 300c in a same number as the number of groups participating in same VR tourism when users participate in the VR tourism using VR systems 100, 110, 120, and 130.

Group audio conference units 341a to 341c have a simple configuration of only collecting pieces of audio data used by VR users 10 and the like belonging to a same group, mixing the pieces of audio data, and returning the audio data to respective VR systems 100, 110, 120, and 130. In addition, VR audio conference unit 310, 360-degree video distributor 320, and guide's terminal 210 and the like of VR cloud 300c have exactly the same configurations and functions as the configuration example of VR tourism system 2 according to Example 1 illustrated in FIG. 5.

In addition to the constituent elements of Example 1 illustrated in FIG. 5, a function of sending audio data inputted from microphone 108 of VR systems 100, 110, 120, and 130 to group audio conference units 341a to 341c and second muter 180 that performs mute control with respect to the audio data to be sent are added to VR systems 100, 110, 120, and 130. Furthermore, a function of receiving 360-degree video data sent from VR cloud 300c, performing AV demultiplexing, and mixing segmented audio data with audio conversation data within groups sent from group audio conference units 341a to 341c (AV demultiplexer 183, audio decoder 184, audio decoder 182a, audio mixer 182b, and D/A converter 182c) have been added.

While the functions described above are added to VR systems 100, 110, 120, and 130, since there are no operations by VR users 10 to 13 with respect to group audio conference units 341a to 341c, operations by VR users 10 to 13 are similar to Example 1 illustrated in FIG. 5. However, when guide 20 operates guide's remote controller 230 in order for a VR user to set "question in progress", the mute function of first muter 181 is unmuted, the mute function of second muter 180 is set, and audio data of a corresponding user does not flow to group audio conference units 341a to 341c. In other words, since audio data of the corresponding user is included in the 360-degree video data, the other VR users in the group can listen to the conversation with guide 20.

Figure 17:
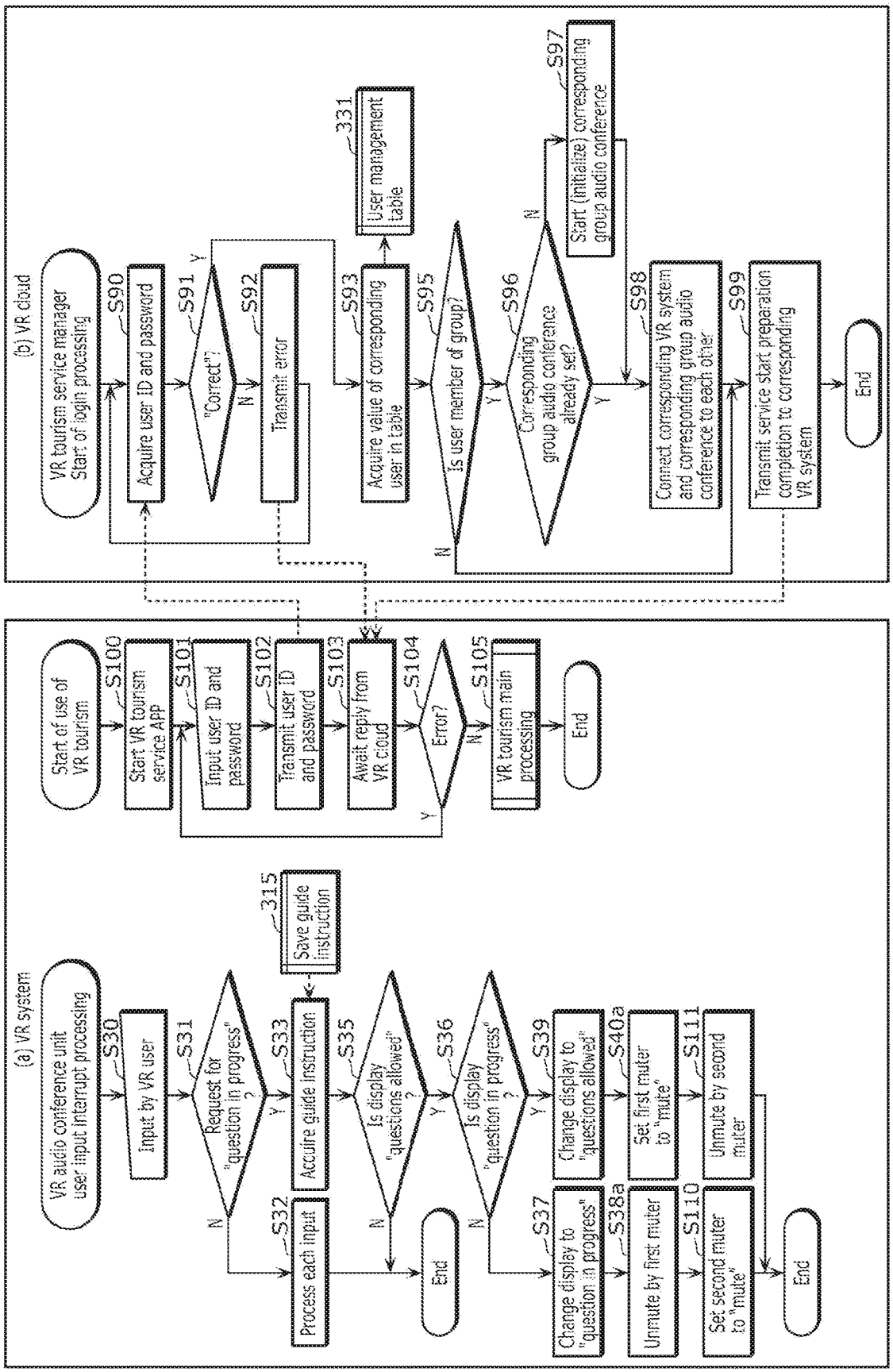
FIG. 17 is a diagram illustrating an operation flow example of the VR tourism system according to Example 3.

FIG. 17 is a diagram illustrating an operation flow example of VR tourism system 4 (in other words, a specific example of a video display method) according to Example 3. More specifically, (a) in FIG. 17 illustrates an operation flow of VR systems 100, 110, 120, and 130 and (b) in FIG. 17 illustrates an operation flow of VR cloud 300c.

Main processing of VR systems 100, 110, 120, and 130 is the same as in Example 1 and Example 2 (not illustrated).

Interrupt processing of input from a VR user in VR systems 100, 110, 120, and 130 becomes a flow in which, in steps S30 to S40 according to Example 1 illustrated in FIG. 6, steps S38a and S40a are respectively performed in place of steps S38 and S40 and steps S110 and S111 are newly added. In other words, guidance display controller 109 changes the display mode to "question in progress" (S37), and when first muter 181 sets unmute (S38a), second muter 180 sets mute (S110). In addition, guidance display controller 109 changes the display mode to "questions allowed" (S39), and when first muter 181 sets to "mute" (S40a), second muter 180 unmutes (S111).

Furthermore, interrupt processing from VR cloud 300c in VR systems 100, 110, 120, and 130 is the same as in Example 1 and Example 2 (not illustrated).

As illustrated in (a) in FIG. 17, in initialization in VR systems 100, 110, 120, and 130, first, since a VR tourism service application to which VR systems 100, 110, 120, and 130 are mounted is launched (S100), a VR user inputs a user ID and a password (S101), transmits the user ID and the password to VR cloud 300 (S102), and awaits a reply from VR cloud 300 (S103).

As a result, when the received reply is an error (Y in S104), a return is made to step S101, but when the received reply is normal (N in S104), a transition is made to main processing of VR systems 100, 110, 120, and 130 (S105).

On the other hand, in VR cloud 300c, main processing is the same as in Example 1 and Example 2 (not illustrated).

In addition, in login processing of VR cloud 300c, as illustrated in (b) in FIG. 17, VR tourism service manager 340 first acquires a user ID and a password from VR systems 100, 110, 120, and 130 (S90) and checks whether a user is a legitimate user of the present tourism service (S91).

As a result, when the user is not a legitimate user (N in S91), VR tourism service manager 340 transmits an error to corresponding VR system 100 or the like (S92) and returns to step S90. When the corresponding user is a legitimate user (Y in S91), VR tourism service manager 340 acquires a value of the user from user management table 331 (S93).

When the acquired corresponding user is a solo traveler (N in S95), a jump is made to step S99. In a case of a group traveler having made a first login (N in S96), VR tourism service manager 340 starts (initializes) a group audio conference in which the corresponding user participates (S97).

In a case of a group traveler not having made a first login (Y in S96) and when step S97 has been completed, VR tourism service manager 340 connects VR systems 100, 110, 120, and 130 of the corresponding user to the group audio conference of the corresponding user (S98), transmits the fact that preparation for use of the tourism service has been normally completed to corresponding VR systems 100, 110, 120, and 130 (S99), and ends processing.

As described above, VR tourism system 4 according to the present example supports a private conversation between friends who travel together among participants and solves the problem (3) described above.

Variation 1 of Example 3

Next, Variation 1 of Example 3 will be described.

Figure 18:
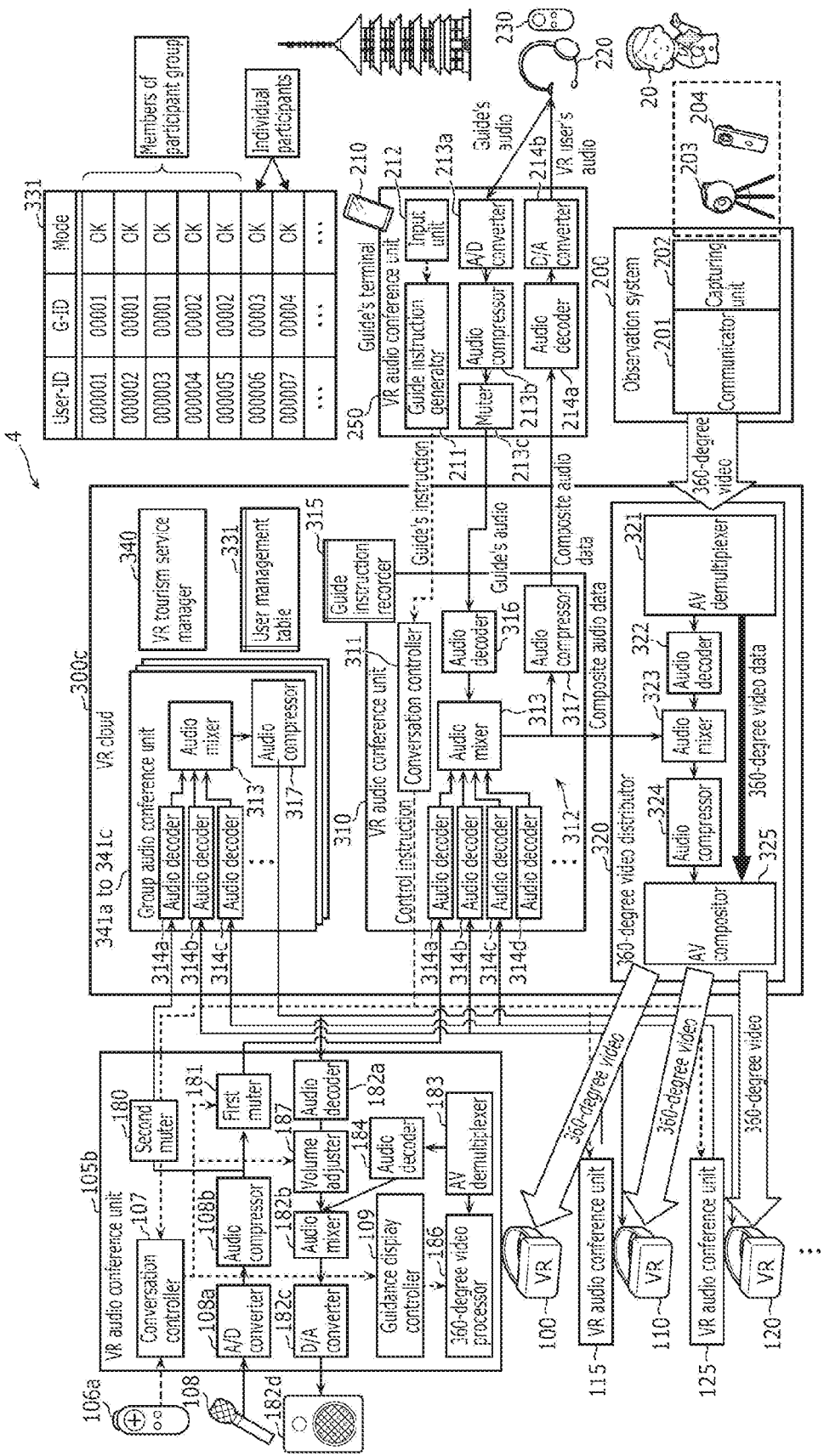
FIG. 18 is a block diagram illustrating a detailed configuration of a VR tourism system according to Variation 1 of Example 3.

FIG. 18 is a block diagram illustrating a detailed configuration of VR tourism system 4a according to Variation 1 of Example 3. VR tourism system 4a corresponds to a second specific example that solves the problem (3) (private conversations by participants with traveling companions must be supported) described above.

VR tourism system 4a according to the present variation has a configuration (in other words, VR audio conference unit 105b) in which volume adjuster 187 is added to VR audio conference unit 105 of VR systems 100, 110, 120, and 130 in VR tourism system 4 according to Example 3 illustrated in FIG. 16.

Volume adjuster 187 is an example of a function of controller 62b according to Variation 2 of the embodiment among functions of a controller according to the embodiment for controlling, when assisting a group audio conversation, a plurality of VR systems that correspond to a plurality of participants who belong to a same group so as to adjust a volume of at least one of audio from an explainer to a plurality of participants belonging to the same group and audio of the group audio conversation.

Specifically, in order to accommodate a case where audio of guide 20 and audio of a conversation in a group are mixed and are indiscernible, VR tourism system 4a according to the present variation has a configuration in which volume adjuster 187 that adjusts a volume with respect to audio from group audio conference units 341a to 341c has been added to VR tourism system 4 according to Example 3 illustrated in FIG. 16.

VR users 10 to 13 have VR remote controller with volume adjustment function 106a, and volume of audio from group audio conference units 341a to 341c can be adjusted by performing an operation of changing a volume of VR remote controller with volume adjustment function 106a or the like.

Note that a configuration of VR systems 100, 110, 120, and 130 and an operation flow of processing in VR systems 100, 110, 120, and 130 and VR cloud 300c are the same as in Example 1.

As described above, even with VR tourism system 4a according to the present variation, volume adjuster 187 supports a private conversation between friends who travel together among participants and the problem (3) described above is solved.

Example 4

Next, Example 4 will be described as a specific example that solves the problem (4) (a plurality of languages and a plurality of guides must be accommodated with respect to participants in VR tourism in order to accommodate foreign travel and foreigners) described above.

Before describing a specific example that solves the problem (4), first, the problem (4) will be described in detail using drawings.

Figure 19:
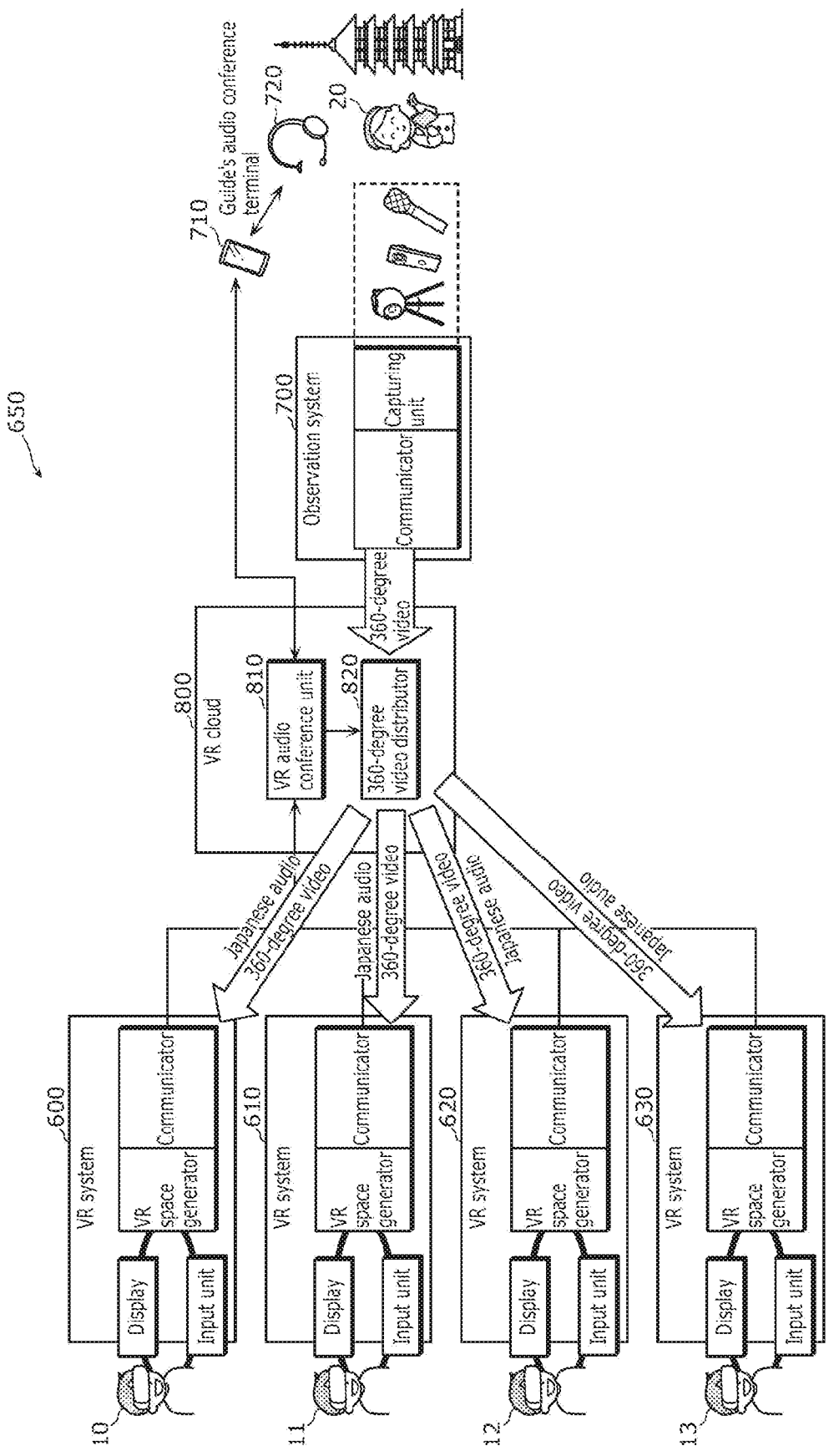
FIG. 19 is a diagram in which a description of a problem (4) has been added to the VR tourism system according to the reference example illustrated in FIG. 1A.

FIG. 19 is a diagram in which a description of the problem (4) has been added to VR tourism system 650 according to the reference example illustrated in FIG. 1A. In the VR tourism system, providing a VR tourism experience with high resolution and a strong realistic sensation requires photography with a resolution of at least 8K video and preferably 11K video. However, photography of 8K video and 11K video involves large equipment, a high video transmission rate, and a large capacity. Therefore, both photography and distribution end up being costly. Therefore, a VR tourism service does not make sense as a business unless the VR tourism service is used by many VR users.

In order to increase the number of participants in one VR sightseeing tour, even when VR users 10 to 13 who use different languages participate, the number of object persons can be increased if explanations provided by guide 20 can be received in their own languages. However, as illustrated in FIG. 19, since the inside of a shared VR space is used when participating in VR tourism in VR tourism system 650 according to the reference example, conversations with guide 20 or other users can only be held in one language. In other words, since a language of use of VR users in the VR space is to be shared and used among all participants, the language becomes a language of use of guide 20 and a plurality of languages cannot be supported at the same time.

While a multilingual service is desirably provided in order to increase the number of users by preparing a plurality of guides 20 for each language or even using simultaneous interpreters from the perspective of a provider of a VR tourism service, since VR tourism service 650 according to the reference example illustrated in FIG. 19 is incapable of supporting guides 20 of a plurality of languages, a separate tour must be organized for each language.

In consideration thereof, in order to accommodate foreign travel and foreigners, a plurality of languages and a plurality of guides must be accommodated with respect to participants in VR tourism and a VR tourism system having such a function will be described as a VR tourism system according to Example 4. The VR tourism system according to Example 4 is a system in which a function of solving the problem (4) has been added to VR tourism system 2 according to Example 1.

Figure 20:
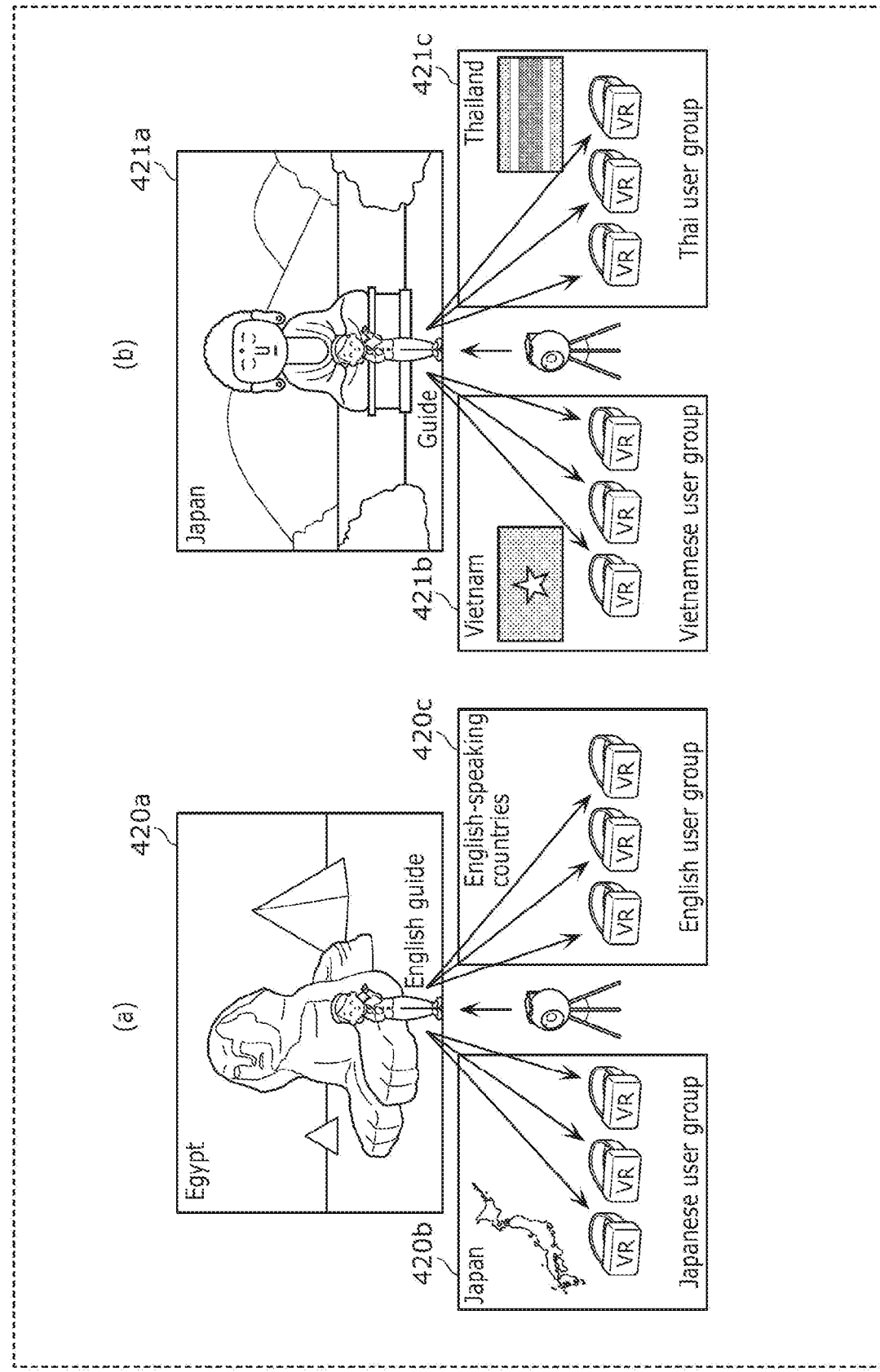
FIG. 20 is a diagram illustrating required specifications of a VR tourism system according to Example 4.

FIG. 20 is a diagram illustrating a use case that is desirably realized by the VR tourism system according to Example 4 or, in other words, a diagram illustrating required specifications of a VR tourism service. More specifically, (a) in FIG. 20 illustrates an example of a case in which Japanese users are provided with VR tourism at a foreign tourist destination. Due to a Japanese VR tourism service provider dispatching its own guide 20 or photography crew to Egypt 420a and providing a VR tourism service, if the Japanese VR tourism service provider can set up an appliance with a business operator who performs an on-site English VR tourism service for English-speaking countries 420c and subsequently change a language of use of guide 20 to Japanese, types of VR tourism services for Japanese (Japan 420b) can be increased in an inexpensive and efficient manner.

In FIG. 20, (b) illustrates an example of providing foreign users with VR tourism of tourist destinations in Japan 421a. In a case of English, Chinese, and Spanish which have a large number of speakers, each language independently enables VR tourism users in various countries to be reached. However, in a case of Vietnamese (Vietnam 421b) or Thai (Thailand 421c), even when independently hosting VR tourism is difficult although a certain number of users can be expected, VR tourism can be hosted if a plurality of languages can be supported.

Figure 21:
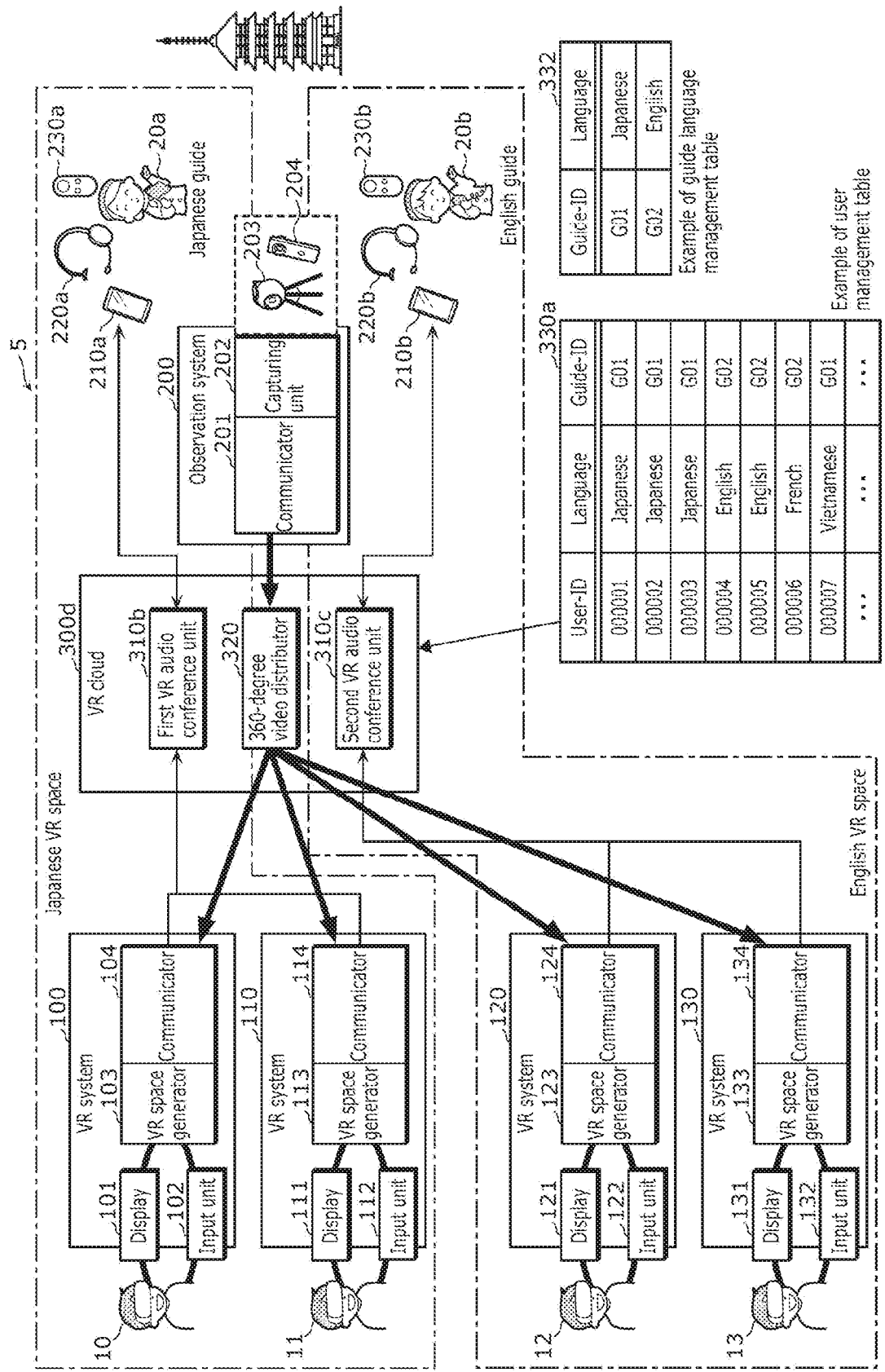
FIG. 21 is a schematic configuration diagram of the VR tourism system according to Example 4.

FIG. 21 is a schematic configuration diagram of VR tourism system 5 according to Example 4. VR tourism system 5 is a system in which a function of solving the problem (4) has been added to VR tourism system 2 according to Example 1 and includes VR systems 100, 110, 120, and 130, VR cloud 300d, first guide's terminal 210a and the like, second guide's terminal 210b and the like, and observation system 200.

First guide's terminal 210a and the like are examples of first explainer terminal 40a in Variation 3 of the embodiment which performs input and output of audio with Japanese guide 20a being a first explainer who provides explanations in a first language and first guide's terminal 210a and the like are constituted of smartphone 210a which accommodates the first language, headset 220a, and guide's remote controller 230a.

Second guide's terminal 210b and the like are examples of second explainer terminal 40b in Variation 3 of the embodiment which performs input and output of audio with English guide 20b being a second explainer who provides explanations in a second language and second guide's terminal 210b and the like are constituted of smartphone 210b which accommodates the second language, headset 220b, and guide's remote controller 230b.

VR cloud 300d includes first VR audio conference unit 310b, second VR audio conference unit 310c, user management table 330a, guide language management table 332, and 360-degree video distributor 320c.

First VR audio conference unit 310b is an example of the first audio conversation unit according to Variation 3 of the embodiment which assists an audio conversation between participants and the first explainer via the plurality of VR systems and the first explainer terminal. Second VR audio conference unit 310c is an example of the second audio conversation unit according to Variation 3 of the embodiment which assists an audio conversation between participants and the second explainer via the plurality of VR systems and the second explainer terminal.

As illustrated in FIG. 21, user management table 330a is an information table that records, for each VR user ("User-ID"), a language ("Language") used by the VR user and a guide ID ("Guide-ID") of a corresponding guide. Guide language management table 332 is an information table that records, for each guide ID ("Guide-ID"), a language ("Language") used by the guide.

More specifically, a configuration example of VR tourism system according to Example 4 illustrated in FIG. 21 is approximately the same as the configuration example of VR tourism system 2 according to Example 1 illustrated in FIG. 3. Main differences are that A) a VR audio conference unit (first VR audio conference unit 310b and second VR audio conference unit 310c) is provided for each of Japanese guide 20a and English guide 20b in VR cloud 300d and all audio data is sent using the VR audio conference unit (first VR audio conference unit 310b and second VR audio conference unit 310c) instead of sending the audio data to 360-degree video distributor 320, and B) VR cloud 300d has user management table 330a and has means for connecting each VR user to suitable first VR audio conference unit 310b or second VR audio conference unit 310c so that when the VR user starts using the VR tourism service, the VR user can receive service by Japanese guide 20a or English guide 20b matching the VR user's own language.

In the present example, while a 360-degree video that captures Japanese guide 20a and English guide 20b is shared, audio control is independent and each of Japanese guide 20a and English guide 20b performs operation of VR system 100 or the like of his/her own VR user 10 and the like. From VR users 10 to 13, each VR space appears to be independent and, for example, a Japanese user remains completely unaware of the presence of English guide 20b or English users.

Figure 22:
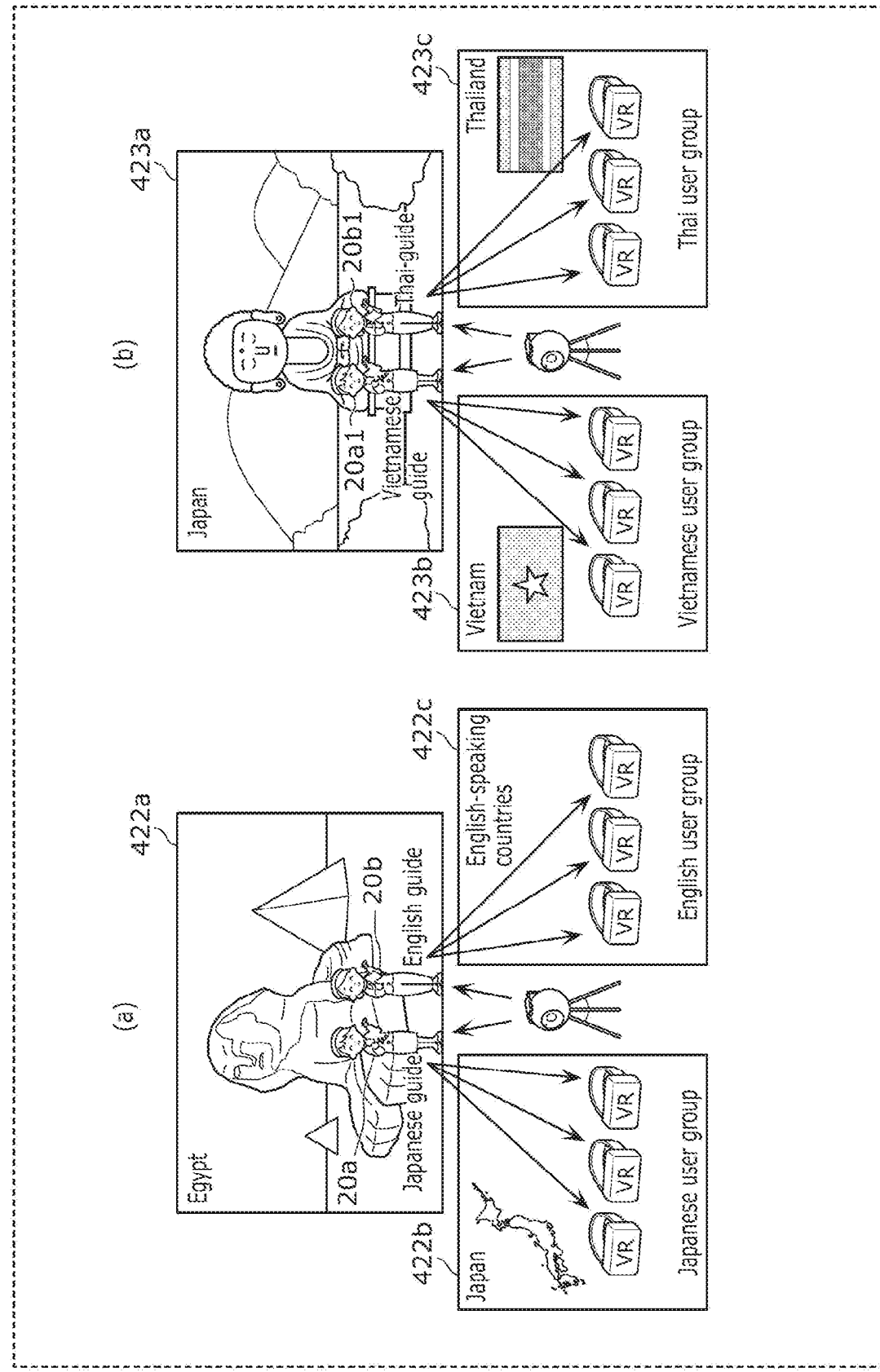
FIG. 22 is a diagram illustrating an example of a use case that is realized by the VR tourism system according to Example 4.

FIG. 22 is a diagram illustrating an example of a use case that is realized by VR tourism system 5 according to Example 4. More specifically, (a) in FIG. 22 illustrates a case where VR tourism by an English guide of a foreign (Egypt 422a) tourist destination is provided to not only VR users in English-speaking countries 422c but also to VR users in Japan 422b, and (b) in FIG. 22 illustrates a case where VR tourism by a Vietnamese guide and a Thai guide at a tourist destination in Japan 423a is provided to foreign (Vietnam 423b and Thailand 423c) VR users.

As illustrated in (a) and (b) in FIG. 22, in each case, if the two guides (Japanese guide 20a and English guide 20b, Vietnamese guide 20a1 and Thai guide 20b1) can provide explanations in their own languages, the use cases to be realized described in (a) and (b) in FIG. 20 become realizable.

Figure 23:
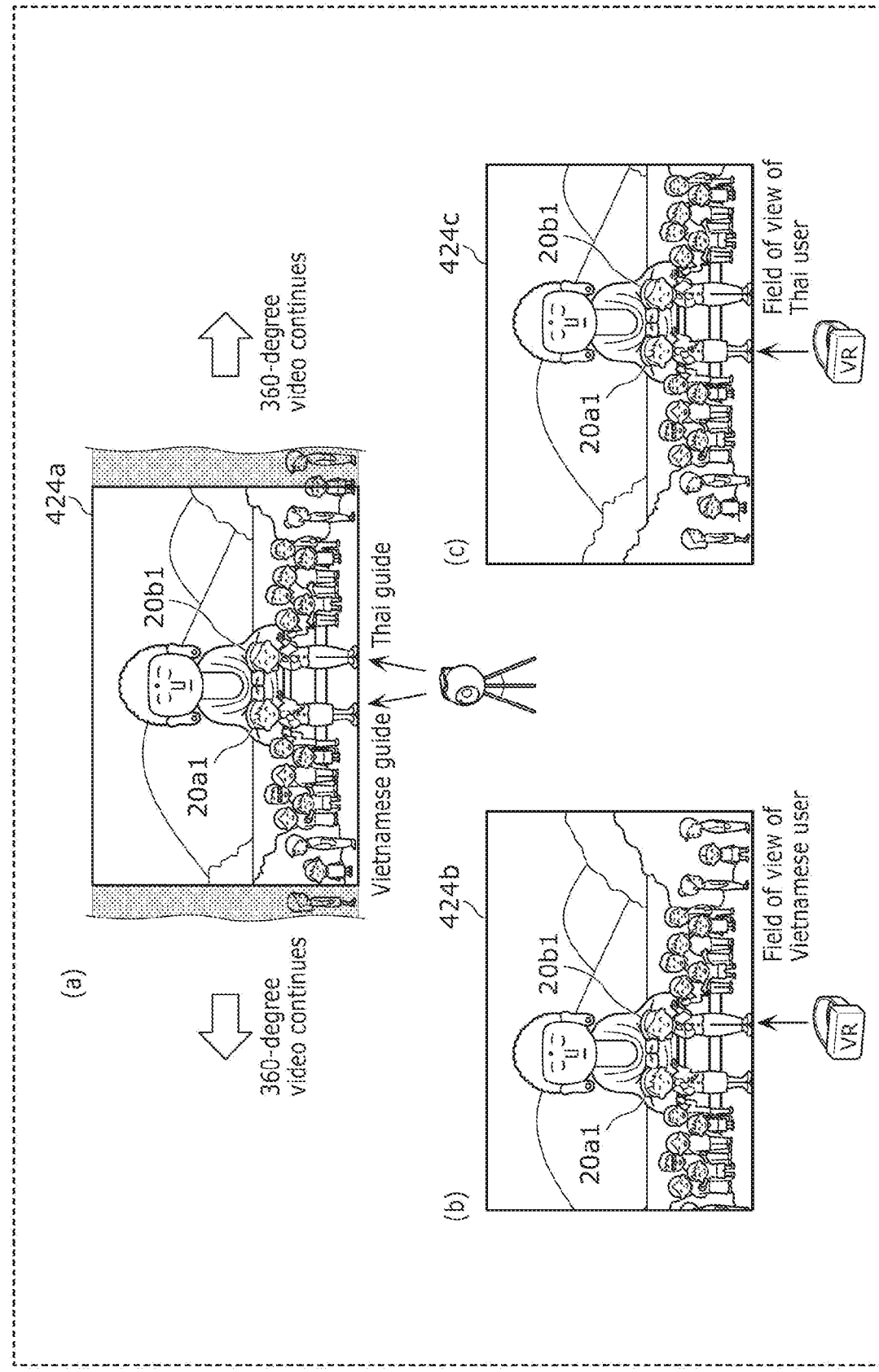
FIG. 23 is a diagram illustrating an example of a field of view provided by a VR system in the VR tourism system according to Example 4.

FIG. 23 is a diagram illustrating an example of a field of view provided by VR systems 100, 110, 120, and 130 in VR tourism system 5 according to Example 4. Here, an example of a field of view of a user of each guide (field of view 424b of a Vietnamese user ((b) in FIG. 23), field of view 424c of a Thai user ((c) in FIG. 23)) in a case (VR tourism in Japan 424a) where there are two guides (Vietnamese guide 20a1 and Thai guide 20b1) in a 360-degree video is illustrated.

In the case of a 360-degree video, since there is no frame that serves as a boundary of the video, a photographer can perform photography without worrying about positions of the guides (Vietnamese guide 20a1 and Thai guide 20b1). In addition, VR users 10 to 13 can view any range within 360 degrees. Therefore, as illustrated in (a) in FIG. 23, when a frame is set as in ordinary camera photography, both guides are positioned off-center and a sense of discomfort is created, but since VR users of each language are only conscious of the guide of his/her own language (Vietnamese guide 20a1 or Thai guide 20b1), as illustrated in (b) and (c) in FIG. 23, Vietnamese guide 20a1 and Thai guide 20b1 can be respectively placed at a center of a field of view and a sense of discomfort is not created. Therefore, by having the two guides provide explanations in their own languages and by sharing video, VR users 10 to 13 can engage in conversation with guide 20 or obtain an explanation from guide 20 who matches his/her own language and a value of VR tourism experience is enhanced.

Figure 24:
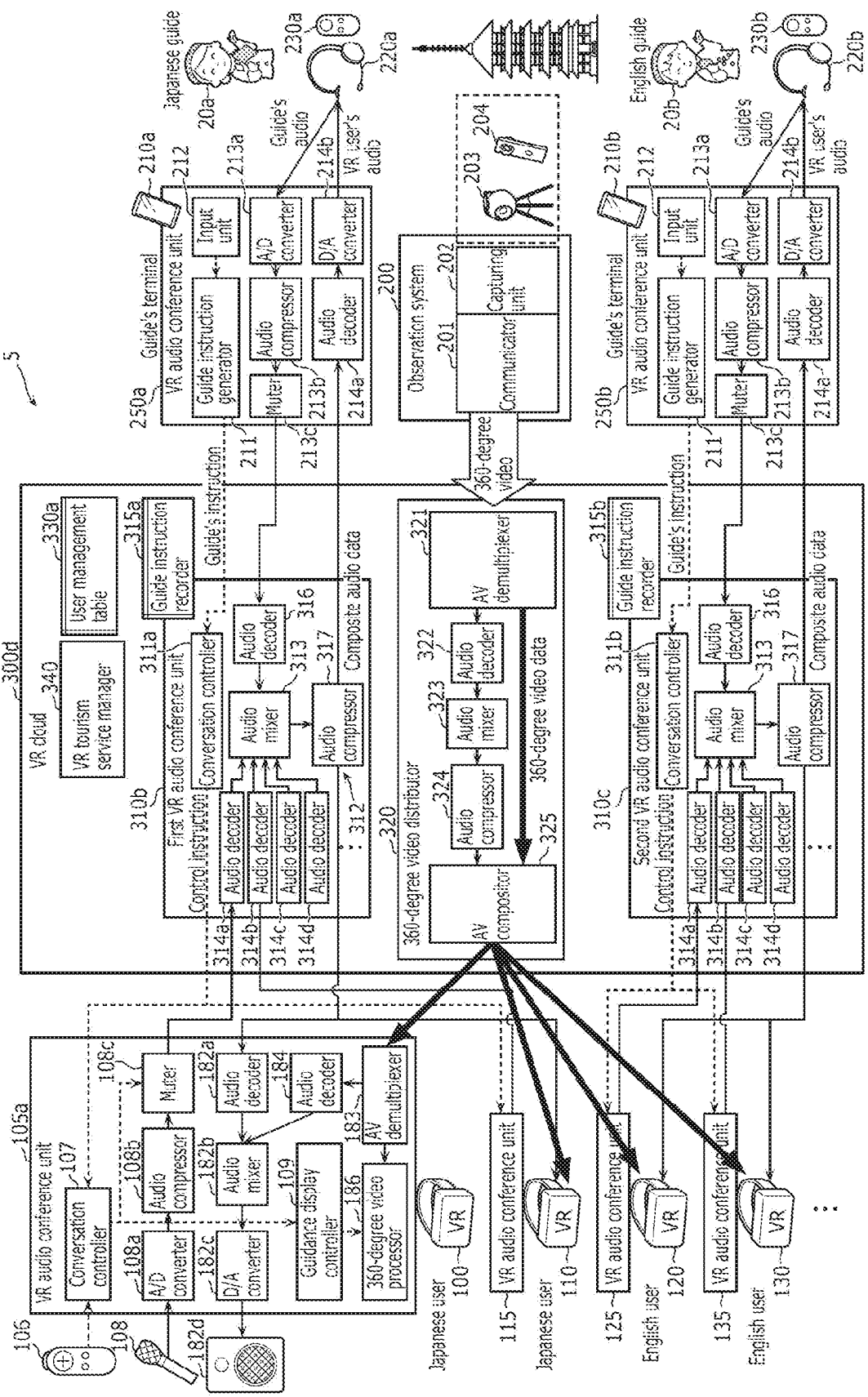
FIG. 24 is a block diagram illustrating a detailed configuration of the VR tourism system according to Example 4.

FIG. 24 is a block diagram illustrating a detailed configuration of VR tourism system 5 according to Example 4. VR audio conference unit 105a of VR systems 100, 110, 120, and 130 is the same as that in Example 3. First VR audio conference unit 310b and second VR audio conference unit 310c both have the same configuration as VR audio conference unit 310 according to Example 1. VR audio conference units 250 included in first guide's terminal 201a and the like used by Japanese guide 20a and second guide's terminal 210b and the like used by English guide 20b both have the same configuration as VR audio conference unit 250 according to Example 1.

In other words, while VR tourism system 5 according to fourth example has approximately the same configuration as the configuration of VR tourism system 2 illustrated in FIG. 5 or VR tourism system 3 illustrated in FIG. 12, a difference in VR cloud 300d is that two independent VR tourism services are realized by two VR audio conference units (first VR audio conference unit 310b and second VR audio conference unit 310c) which share 360-degree video distributor 320.

Both guide's terminals (first guide's terminal 210a and the like and second guide's terminal 210b and the like) are similar to guide's terminal 210 and the like according to Example 1 illustrated in FIG. 5 in terms of a configuration, functions, and operations by a guide.

Both VR audio conference units (first VR audio conference unit 310b and second VR audio conference unit 310c) of VR cloud 300d are similar to VR audio conference unit 310 according to Example 1 illustrated in FIG. 5 in terms of a configuration and functions.

Besides the addition of means for compositing audio from VR audio conference unit (first VR audio conference unit 310b and second VR audio conference unit 310c) of VR cloud 300d with audio of a 360-degree video, VR audio conference unit 105a of VR systems 100, 110, 120, and 130 is similar to VR audio conference unit 105 according to Example 1 illustrated in FIG. 5 in terms of functions and operations by VR users 10 to 13.

A difference from Example 1 is that VR tourism service manager 340 and user management table 331 are newly provided in VR cloud 300d, and when VR users 10 to 13 start use of the VR tourism service, VR tourism service manager 340 connects each VR user to an appropriate VR audio conference unit (first VR audio conference unit 310b and second VR audio conference unit 310c) so that the VR user can receive service of a guide matching his/her own language. VR tourism service manager 340 is an example of controller 62c according to Variation 3 of the embodiment and user management table 331 is an example of language information 72 according to Variation 3 of the embodiment.

FIG. 25 is a diagram illustrating an operation flow example of VR tourism system 5 (in other words, a specific example of a video display method) according to Example 4. More specifically, (a) in FIG. 25 illustrates an operation flow of VR systems 100, 110, 120, and 130 and (b) in FIG. 25 illustrates an operation flow of VR cloud 300d.

In each of VR systems 100, 110, 120, and 130, main processing, interrupt processing of input from VR users, and interrupt processing from VR cloud 300d are the same as in Example 1 and Example 2 (not illustrated).

In addition, in VR systems 100, 110, 120, and 130, initialization processing ((a) in FIG. 25) by which a VR user starts using VR tourism is the same as the operation flow (S100 to S105) according to Example 3 illustrated in (b) in FIG. 17 and a description thereof will be omitted.

Furthermore, in VR cloud 300d, main processing is the same as in Example 1 and Example 2 (not illustrated).

As login processing in VR cloud 300d, as illustrated in (b) in FIG. 25, VR tourism service manager 340 first acquires a user ID and a password from VR systems 100 and the like (S140) and checks whether a user is a legitimate user of the present tourism service (S141).

When the user is not a legitimate user (N in S141), an error is transmitted to corresponding VR system 100 or the like (S142) and a return is made to step S140. When the user is a legitimate user (Y in S141), VR tourism service manager 340 acquires a value of the corresponding user from user management table 330 (S143).

When language selection by the corresponding user is the same as the language of the first guide (for example, the language (Japanese) of Japanese guide 20a) (Y in S145), VR tourism service manager 340 connects VR system 100 or the like of the corresponding user to first VR audio conference unit 310b (S145a) and jumps to step S149.

On the other hand, when language selection by the corresponding user is the same as the language of the second guide (for example, the language (English) of English guide 20b) (Y in S146), VR tourism service manager 340 connects VR system 110 or the like of the corresponding user to second VR audio conference unit 310c (S147), transmits the fact that preparation for use of the tourism service has been normally completed to corresponding VR system 110 or the like (S149), and ends processing.

When language selection by the corresponding user is neither the language of the first guide (N in S145) nor the language of the second guide (N in S146), VR tourism service manager 340 executes default language selection processing (S148) and returns to step S145.

In default language selection processing (S148), for example, VR tourism service manager 340: A) causes the corresponding user to select the language of the first guide (for example, the language (Japanese) of Japanese guide 20a) or the language of the second guide (for example, the language (English) of English guide 20b); B) selects English when the language of the first guide or the second guide is English; or C) selects the language of the first guide (for example, the language (Japanese) of Japanese guide 20a).

As described above, VR tourism system 5 according to the present example realizes accommodation by a plurality of languages and accommodation by a plurality of guides with respect to participants and solves the problem (4) described above.

Variation 1 of Example 4

Next, Variation 1 of Example 4 will be described.

Figure 26:
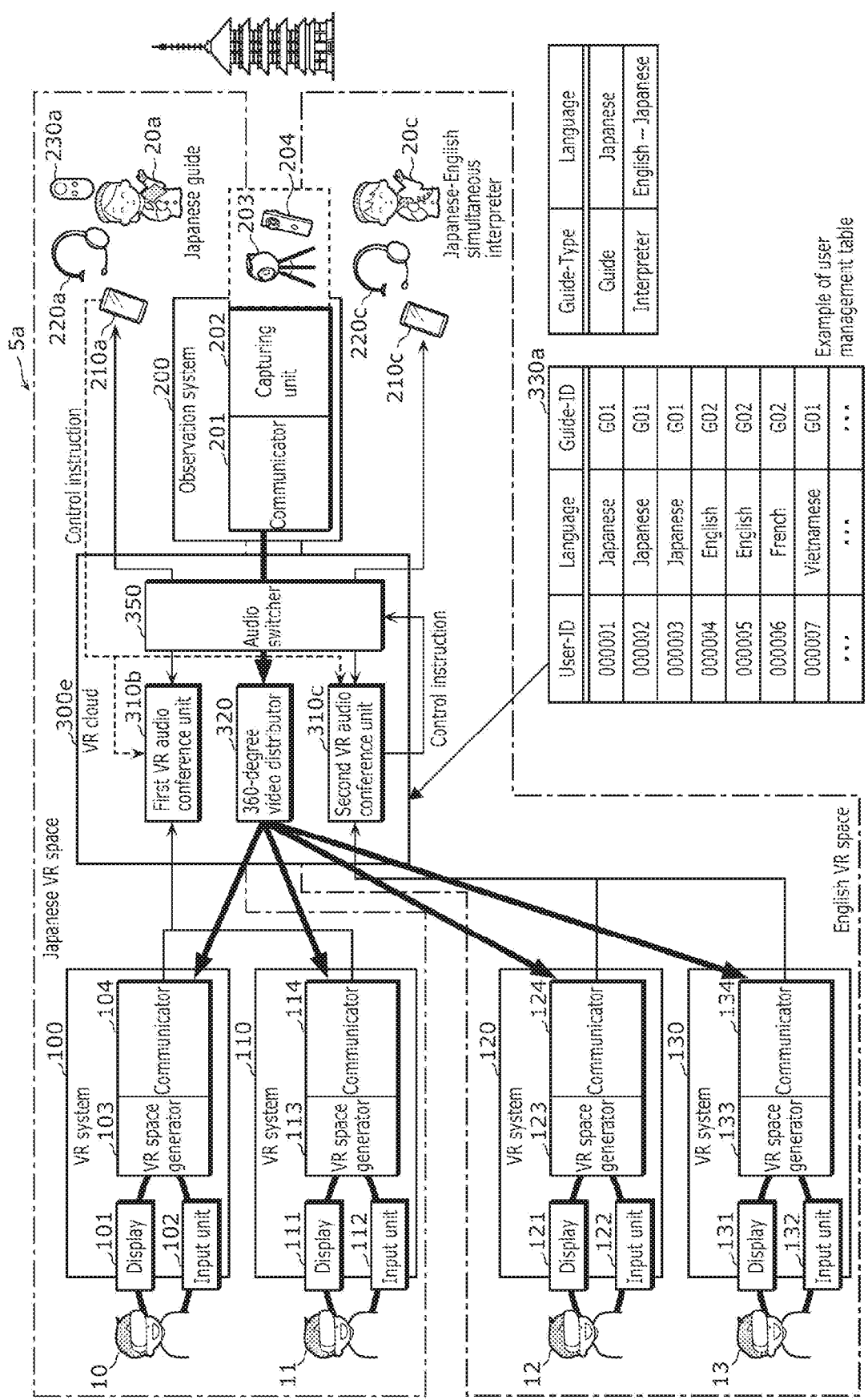
FIG. 26 is a schematic configuration diagram of a VR tourism system according to Variation 1 of Example 4.

FIG. 26 is a schematic configuration diagram of VR tourism system 5a according to Variation 1 of Example 4. VR tourism system 5a corresponds to a second specific example that solves the problem (4) (a plurality of languages and a plurality of guides must be accommodated with respect to participants in VR tourism in order to accommodate foreign travel and foreigners) described above.

VR tourism system 5a is a system accommodating VR tourism including a Japanese-English simultaneous interpreter who accompanies a guide and has a configuration created by including third guide's terminal 210c for Japanese-English simultaneous interpreter 20c in place of second guide's terminal 210b and newly adding audio switcher 350 to VR cloud 300e in the configuration of VR tourism system 5 according to Example 4 illustrated in FIG. 21. Third guide's terminal 210c is constituted of smartphone 210c for Japanese-English simultaneous interpreter 20c and headset 220c. Audio switcher 350 is an example of audio switcher 65 according to the embodiment that switches between outputting audio from the second explainer to a participant associated with the second language and outputting audio to the first explainer and a participant associated with the first language.

In VR tourism system 5 according to Example 4 illustrated in FIG. 21, a Japanese VR space and an English VR space exist completely independently of one another and each guide 20 supports VR users 10 to 13 whom guide 20 is in charge of. The present variation is configured such that, although the two language spaces are independent of each other, Japanese guide 20a issues instructions to all VR users 10 to 13 while Japanese-English simultaneous interpreter 20c only provides a simultaneous interpreting service and is unable to issue instructions to VR users 10 to 13.

Being aware that VR users include a Japanese user group and an English user group, Japanese guide 20a requires a distinction between the two user groups in the display modes of "questions not allowed" and "questions allowed" of VR tourism system 650 according to the reference example and also requires the three instructions of "questions not allowed", "questions by Japanese user group allowed", and "questions by English user group allowed".

Both Japanese users and English users are only conscious of Japanese guide 20a and the presence of Japanese-English simultaneous interpreter 20c is not explicitly visible. However, audio control is independent for each language group and although the Japanese users and the English users are aware of each others' presence, the Japanese users and the English users need not be conscious of the fact that different languages are being spoken.

Figure 27:
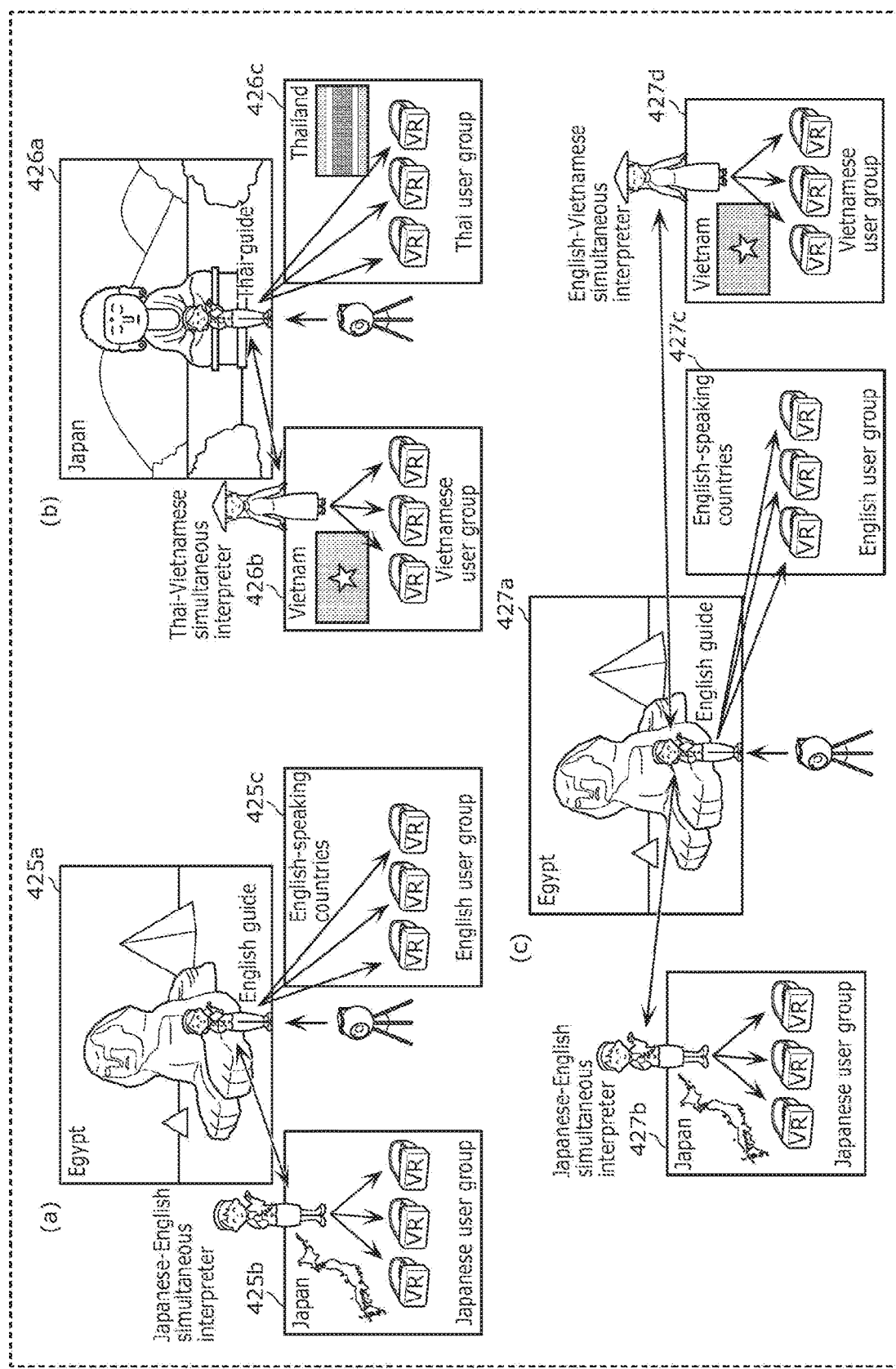
FIG. 27 is a diagram illustrating an example of a use case that is realized by the VR tourism system according to Variation 1 of Example 4.

FIG. 27 is a diagram illustrating an example of a use case that is realized by VR tourism system 5a according to Variation 1 of Example 4. More specifically, (a) in FIG. 27 illustrates a case where VR tourism by an English guide at a foreign (Egypt 425a) tourist destination is provided to not only VR users in English-speaking countries 425c but also to VR users in Japan 425b via a Japanese-English simultaneous interpreter, (b) in FIG. 27 illustrates a case where VR tourism by a Thai guide at a tourist destination in Japan 426a is provided to foreign VR users (not only VR users in Thailand 426c but also VR users in Vietnam 426b via a Thai-Vietnamese simultaneous interpreter), and (c) in FIG. 27 illustrates a case where VR tourism by an English guide at a foreign (Egypt 427a) tourist destination is provided to not only VR users in English-speaking countries 427c but also to VR users in Japan 427b via a Japanese-English simultaneous interpreter and to VR users in Vietnam 427d via an English-Vietnamese simultaneous interpreter.

If a guide and a simultaneous interpreter can cooperate with each other to provide explanations in their respective languages as in the example of the use case illustrated in FIG. 27, the use case to be realized described with reference to FIG. 20 becomes realizable.

Figure 28:
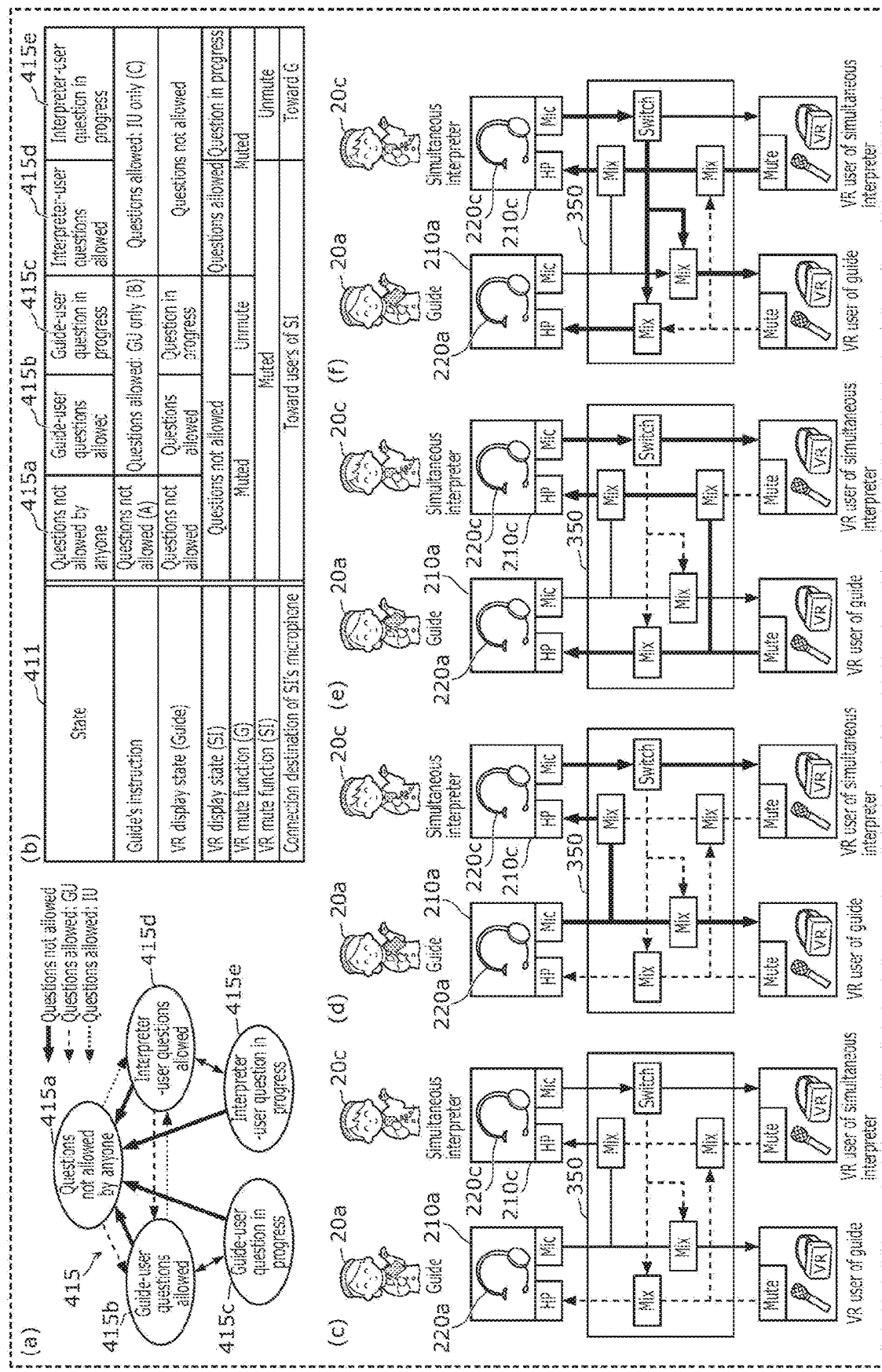
FIG. 28 is a diagram describing functions of an audio switcher included in the VR tourism system according to Variation 1 of Example 4.

FIG. 28 is a diagram describing functions of audio switcher 350 included in VR tourism system 5a according to Variation 1 of Example 4. More specifically, (a) in FIG. 28 illustrates state transition diagram 415 indicating a transition of a state of each VR user managed by VR tourism service manager 340, (b) in FIG. 28 illustrates operation mode explanation table 411 describing each state illustrated in (a) in FIG. 28, (c) in FIG. 28 illustrates a configuration example of audio switcher 350, (d) in FIG. 28 illustrates operating states of audio switcher 350 in state "questions not allowed by anyone" 415a, state "guide-user questions allowed" 415b, and state "interpreter-user questions allowed" 415d, (e) in FIG. 28 illustrates an operating state of audio switcher 350 in state "guide-user question in progress" 415c, and (f) in FIG. 28 illustrates an operating state of audio switcher 350 in state "interpreter-user question in progress" 415e.

In state transition diagram 415 illustrated in (a) in FIG. 28, a solid arrow indicates a transition when Japanese guide 20a issues an instruction of "questions not allowed", a dashed arrow indicates a transition when Japanese guide 20a issues an instruction of "questions allowed" to Japanese guide 20a, and dotted arrow indicates a transition when Japanese guide 20a issues an instruction of "questions allowed" to Japanese-English simultaneous interpreter 20c.

In operation mode explanation table 411 illustrated in (b) in FIG. 28, "state" indicates states 415a to 415e illustrated in (a) in FIG. 28, "guide's instruction" indicates an instruction by Japanese guide 20a, "VR display state (Guide)" indicates a display mode in a VR system of a VR user having selected Japanese guide 20a, "VR display state (SI)" indicates a display mode in a VR system of a VR user having selected Japanese-English simultaneous interpreter 20c, "VR mute function (G)" indicates a mute state of a VR user having selected Japanese guide 20a, "VR mute function (SI)" indicates a mute state of a VR user having selected Japanese-English simultaneous interpreter 20c, and "connection destination of microphone of SI" indicates a VR user to be a connection destination of a microphone of Japanese-English simultaneous interpreter 20c. Note that "GU" stands for Japanese guide 20a and "SI" stands for Japanese-English simultaneous interpreter 20c.

As indicated in operation mode explanation table 411, state "questions not allowed by anyone" 415a corresponds to when the "guide's instruction" is "questions not allowed", in which case "VR display state (Guide)" is "questions not allowed", "VR display state (SI)" is "questions not allowed", "VR mute function (G)" is "muted", "VR mute function (SI)" is "muted", and "connection destination of microphone of SI" is toward a VR user having selected Japanese-English simultaneous interpreter 20c ((d) in FIG. 28).

State "guide-user questions allowed" 415*b* corresponds to when the "guide's instruction" is "questions allowed" with respect to Japanese guide 20*a* and "VR display state (Guide)" is "questions allowed", in which case "VR display state (SI)" is "questions not allowed", "VR mute function (G)" is "muted", "VR mute function (SI)" is "muted", and "connection destination of microphone of SI" is toward a VR user having selected Japanese-English simultaneous interpreter 20*c* ((d) in FIG. 28).

State "guide-user question in progress" 415*c* corresponds to when the "guide's instruction" is "questions allowed" with respect to Japanese guide 20*a* and "VR display state (Guide)" is "question in progress", in which case "VR display state (SI)" is "questions not allowed", "VR mute function (G)" is "unmuted", "VR mute function (SI)" is "muted", and "connection destination of microphone of SI" is toward a VR user having selected Japanese-English simultaneous interpreter 20*c* ((e) in FIG. 28).

State "interpreter-user questions allowed" 415*d* corresponds to when the "guide's instruction" is "questions allowed" with respect to Japanese-English simultaneous interpreter 20*c*, "VR display state (Guide)" is "questions not allowed", and "VR display state (SI)" is "questions allowed", in which case "VR mute function (G)" is "muted", "VR mute function (SI)" is "muted", and "connection destination of microphone of SI" is toward a VR user having selected Japanese-English simultaneous interpreter 20*c* ((d) in FIG. 28).

State "interpreter-user question in progress" 415*e* corresponds to when the "guide's instruction" is "questions allowed" with respect to Japanese-English simultaneous interpreter 20*c*, "VR display state (Guide)" is "questions not allowed", and "VR display state (SI)" is "question in progress, in which case "VR mute function (G)" is "muted", "VR mute function (SI)" is "unmuted", and "connection destination of microphone of SI" is toward a VR user having selected Japanese guide 20*a* ((f) in FIG. 28).

Figure 29:
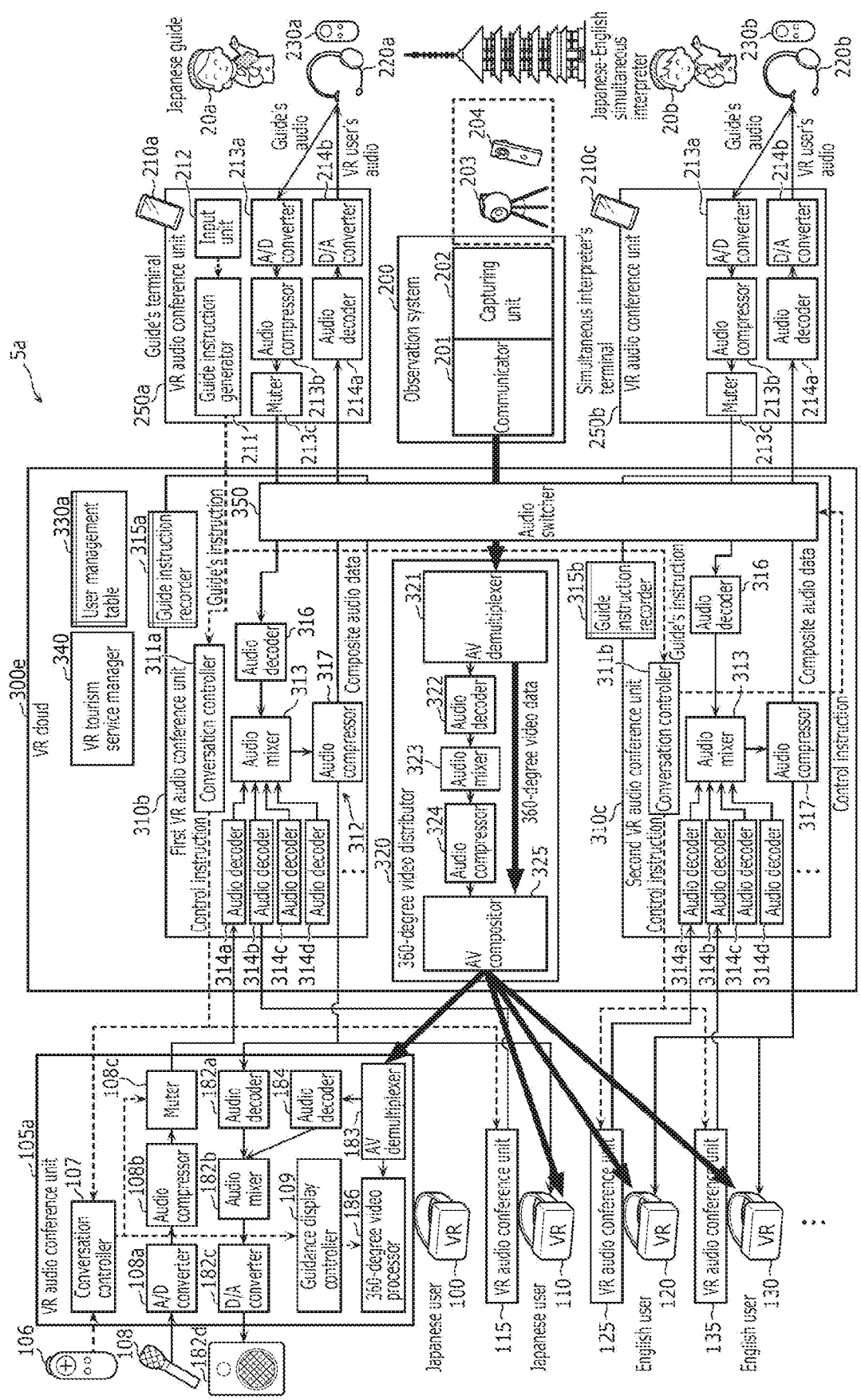
FIG. 29 is a block diagram illustrating a detailed configuration of the VR tourism system according to Variation 1 of Example 4.

FIG. 29 is a block diagram illustrating a detailed configuration of VR tourism system 5*a* according to Variation 1 of Example 4. VR tourism system 5*a* has a configuration created by including third guide's terminal 210*c* for Japanese-English simultaneous interpreter 20*c* in place of second guide's terminal 210*b* and newly adding audio switcher 350 to VR cloud 300*e* in the configuration of VR tourism system 5 according to Example 4 illustrated in FIG. 24.

In other words, VR tourism system 5*a* according to the present variation has a similar configuration to Example 1 illustrated in FIG. 24. As illustrated in FIG. 28, a main difference is that the number of types of guide instructions increases from two to three, Japanese-English simultaneous interpreter 20*c* is unable to issue instructions, there are five states due to combination of three guide instructions and operations of VR users 10 to 13 and, in accordance with the states, an operation of audio switcher 350 of VR cloud 300*e* is changed by VR tourism service manager 340.

Figure 30:
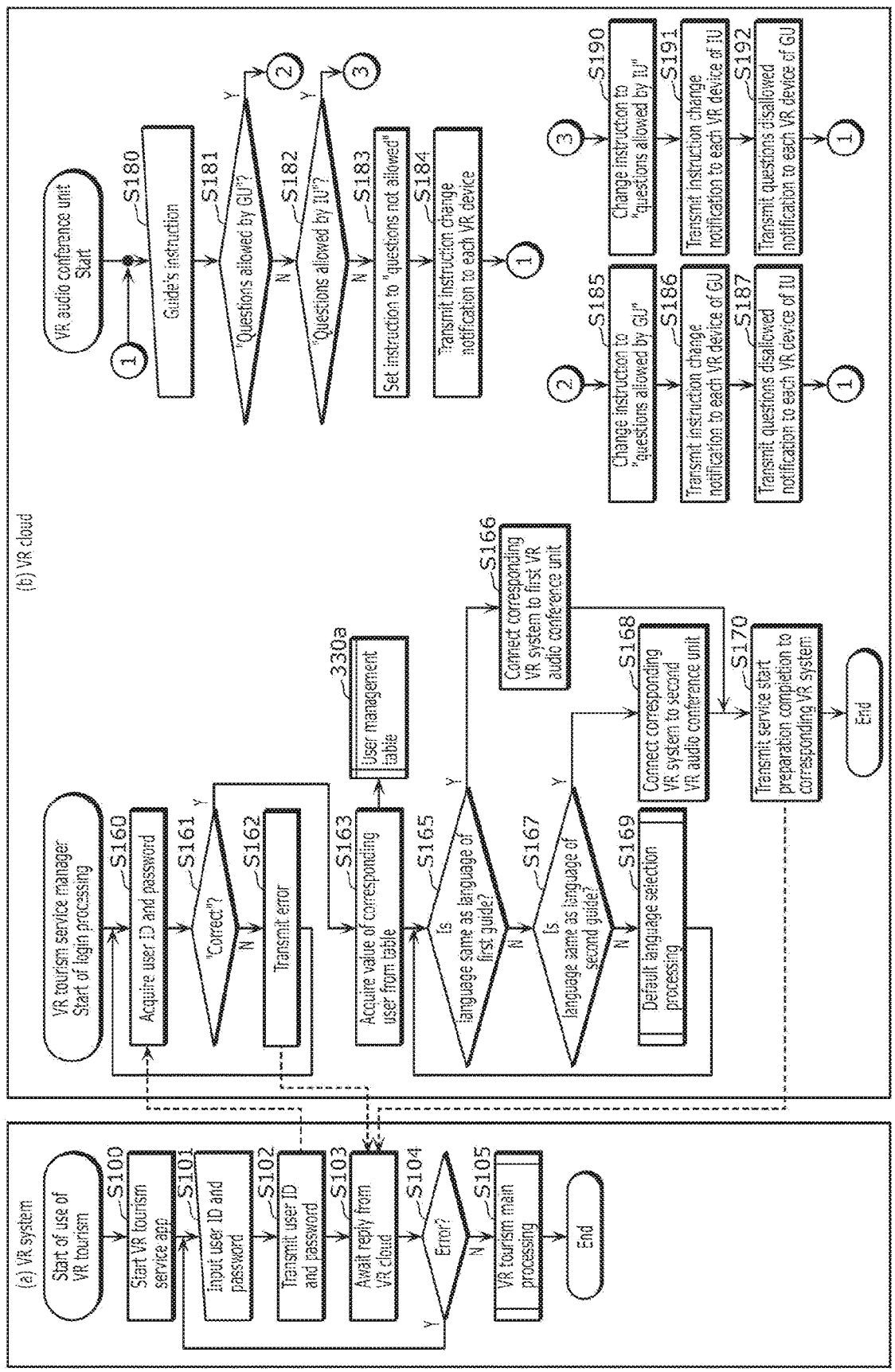
FIG. 30 is a diagram illustrating an operation flow example of the VR tourism system according to Variation 1 of Example 4.

FIG. 30 is a diagram illustrating an operation flow example of VR tourism system 5*a* (in other words, a specific example of a video display method) according to Variation 1 of Example 4. More specifically, (a) in FIG. 30 illustrates an operation flow of VR systems 100, 110, 120, and 130 and (b) in FIG. 30 illustrates an operation flow of VR cloud 300*e*.

In each of VR systems 100, 110, 120, and 130, main processing, interrupt processing of input from VR users, and interrupt processing from VR cloud 300*e* are the same as in Example 4 (not illustrated).

In addition, in VR systems 100, 110, 120, and 130, initialization processing ((a) in FIG. 30) by which a VR user starts using VR tourism is the same as the operation flow (S100 to S105) according to Example 3 illustrated in (b) in FIG. 17 and a description thereof will be omitted.

In VR cloud 300*e*, as main processing, as illustrated in (b) in FIG. 30, VR tourism service manager 340 accepts a "guide's instruction" (a transition to "questions not allowed" and a transition to "questions allowed GU", "questions allowed IU") from an APP of smartphone 210 or from guide's remote controller 230 or the like (S180).

In addition, VR tourism service manager 340 determines the accepted "guide's instruction" and sorts instructions into the following three types of processing.

Specifically, when the "guide's instruction" is "questions allowed GU" (Y in S181), VR tourism service manager 340 sets the "guide's instruction" to "questions allowed GU" (S185), notifies all VR systems 100 and the like of the GU (S186), notifies "questions not allowed" to all VR systems 110 and the like of the IU (S187), and returns to step S180.

In addition, when the "guide's instruction" is "questions allowed IU" (Y in S182), VR tourism service manager 340 sets the "guide's instruction" to "questions allowed IU" (S190), notifies all VR systems 110 and the like of the IU (S191), notifies "questions not allowed" to all VR systems 100 and the like of the GU (S192), and returns to step S180.

When the "guide's instruction" is neither "questions allowed GU" (N in S181) nor "questions allowed IU" (N in S182), VR tourism service manager 340 sets the "guide's instruction" to "questions not allowed" (S183), notifies all VR systems 100 and the like (S184), and returns to step S180.

In addition, as login processing of VR cloud 300*e*, as illustrated in (b) in FIG. 30, VR tourism service manager 340 acquires a user ID and a password from VR systems 100, 110, 120, and 130 and checks whether a user is a legitimate user of the present tourism service (S160).

When the user is not a legitimate user (N in S161), VR tourism service manager 340 transmits an error to corresponding VR system 100 or the like (S162) and returns to step S160. When the user is a legitimate user (Y in S161), VR tourism service manager 340 acquires a value of the corresponding user from user management table 330*a* (S163).

When the acquired language selection of the user is the same as the language of the first guide (the language (Japanese) of Japanese guide 20*a*) (Y in S165), VR tourism service manager 340 connects VR system 100 or the like of the corresponding user to first VR audio conference unit 310*b* (S166) and jumps to step S170.

On the other hand, when the acquired language selection of the user is the same as the language of Japanese-English simultaneous interpreter 20*c* (Y in S167), VR tourism service manager 340 connects VR system 100 or the like of the corresponding user to second VR audio conference unit 310*c* (S168) and jumps to step S170.

When the acquired language selection of the user is neither the language of the first guide (language (Japanese) of Japanese guide 20*a*) (N in S165) nor the language of Japanese-English simultaneous interpreter 20*c* (N in S167), VR tourism service manager 340 executes default language selection processing (S169) and returns to step S165.

After connecting VR system 100 or the like of the corresponding user to first VR audio conference unit 310*b* or second VR audio conference unit 310*c* (S166, S168), VR tourism service manager 340 transmits the fact that preparation for use of the tourism service has been normally completed to corresponding VR system 100 or the like (S170) and ends processing.

In default language selection processing (S169), for example, VR tourism service manager 340: A) causes the corresponding user to select the language of the first guide (for example, the language (Japanese) of Japanese guide 20*a*) or the language of the simultaneous interpreter (for example, the language (English) of Japanese-English simultaneous interpreter 20*c*); B) selects English when the language of the first guide or the second guide is English; or C) selects the language of the first guide (for example, the language (Japanese) of Japanese guide 20*a*).

As described above, even with VR tourism system 5*a* according to the present variation, explanations and conversations accommodating a plurality of languages by a simultaneous interpreter are supported and the problem (4) described above is solved.

Variation 2 of Example 4

Next, Variation 2 of Example 4 will be described.

Figure 31:
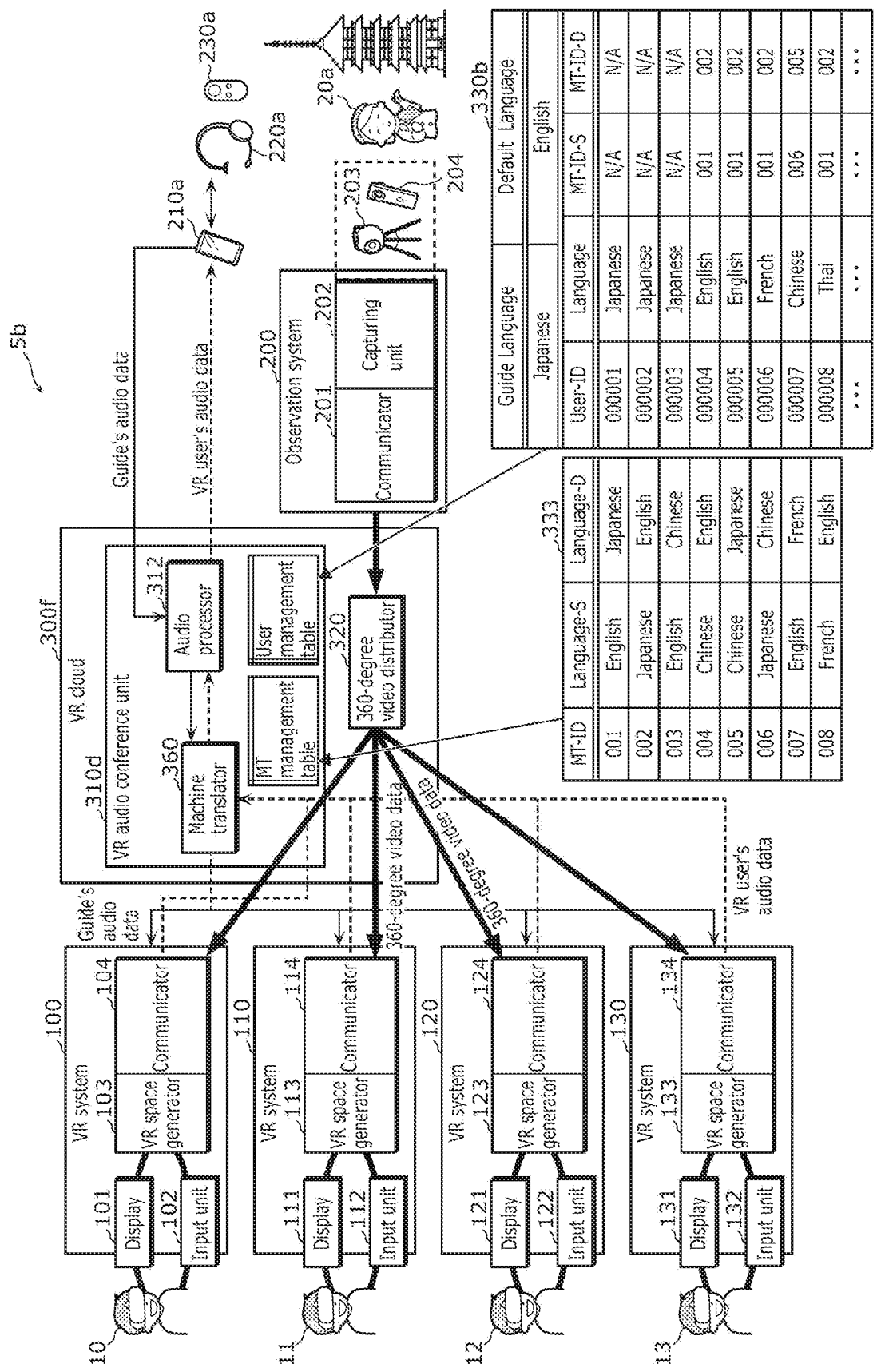
FIG. 31 is a schematic configuration diagram of a VR tourism system according to Variation 2 of Example 4.

FIG. 31 is a schematic configuration diagram of VR tourism system 5*b* according to Variation 2 of Example 4. VR tourism system 5*b* corresponds to a third specific example that solves the problem (4) (a plurality of languages and a plurality of guides must be accommodated with respect to participants in VR tourism in order to accommodate foreign travel and foreigners) described above.

VR tourism system 5*b* is a system that accommodates VR tourism with a function of machine translation and has a configuration in which, in the configuration of VR tourism system 2 according to Example 1 illustrated in FIG. 3, machine translator 360, machine translation management table 333, and user management table 330*b* are added to VR audio conference unit 310*d* of VR cloud 300*f*.

Machine translator 360 is an example of machine translators 66*a* to 66*b* according to the embodiment which perform machine translation between the first language and the second language. Machine translation management table 333 is an example of machine translation management information 73 according to the embodiment and is an information table that records, for an ID (translation processing module ID "MT-ID") of each of a plurality of translation processing modules included in machine translator 360, a correspondence between the first language being a translation source ("Language-S") and the second language being a translation destination ("Language-D"). User management table 330*b* is an example of language information 72 according to the embodiment and is an information table that records a language used by a guide ("Guide Language"), a default language ("Default Language"), a language of use ("Language") for each VR user ("User-ID"), a translation processing module ID for the guide ("MT-ID-S"), and a translation processing module ID for the VR user ("MT-ID-D").

As illustrated in FIG. 31, while VR tourism system 5*b* according to the present variation has approximately the same configuration as the schematic configuration diagram of VR tourism system 2 according to Example 1 illustrated in FIG. 3, VR audio conference unit 310*d* of VR cloud 300*f* includes machine translator 360, machine translation management table 333 for selecting machine translation means to be used for each VR user 10 to 13, and user management table 330*b*.

In the present variation, since the guide is Japanese guide 20*a*, VR users 000001 to 000003 are Japanese users and therefore do not use machine translation as indicated in user management table 330*b*. VR user 000004 and VR user 000005 are English users and therefore use translation processing modules (of which MT-IDs are 01 and 02) for Japanese-English translation. Although VR user 000006 is a French user, since machine translator 360 does not have a French-Japanese translation function, English that is the default language is selected and the same setting as VR user 000004 and VR user 000005 is applied. Similarly, with respect to VR user 000008, since machine translator 360 does not support Thai, same Japanese-English translation as VR user 000006 is selected. VR user 000007 is a Chinese user and therefore translation processing modules (of which MT-IDs are 05 and 06) for Japanese-Chinese translation are selected.

Using VR tourism system 5*b* described above, although there is a possibility that a problem of accuracy of machine translation may exist, both Japanese users and non-Japanese users can experience guided VR tourism in his/her own language or in a default language.

Figure 32:
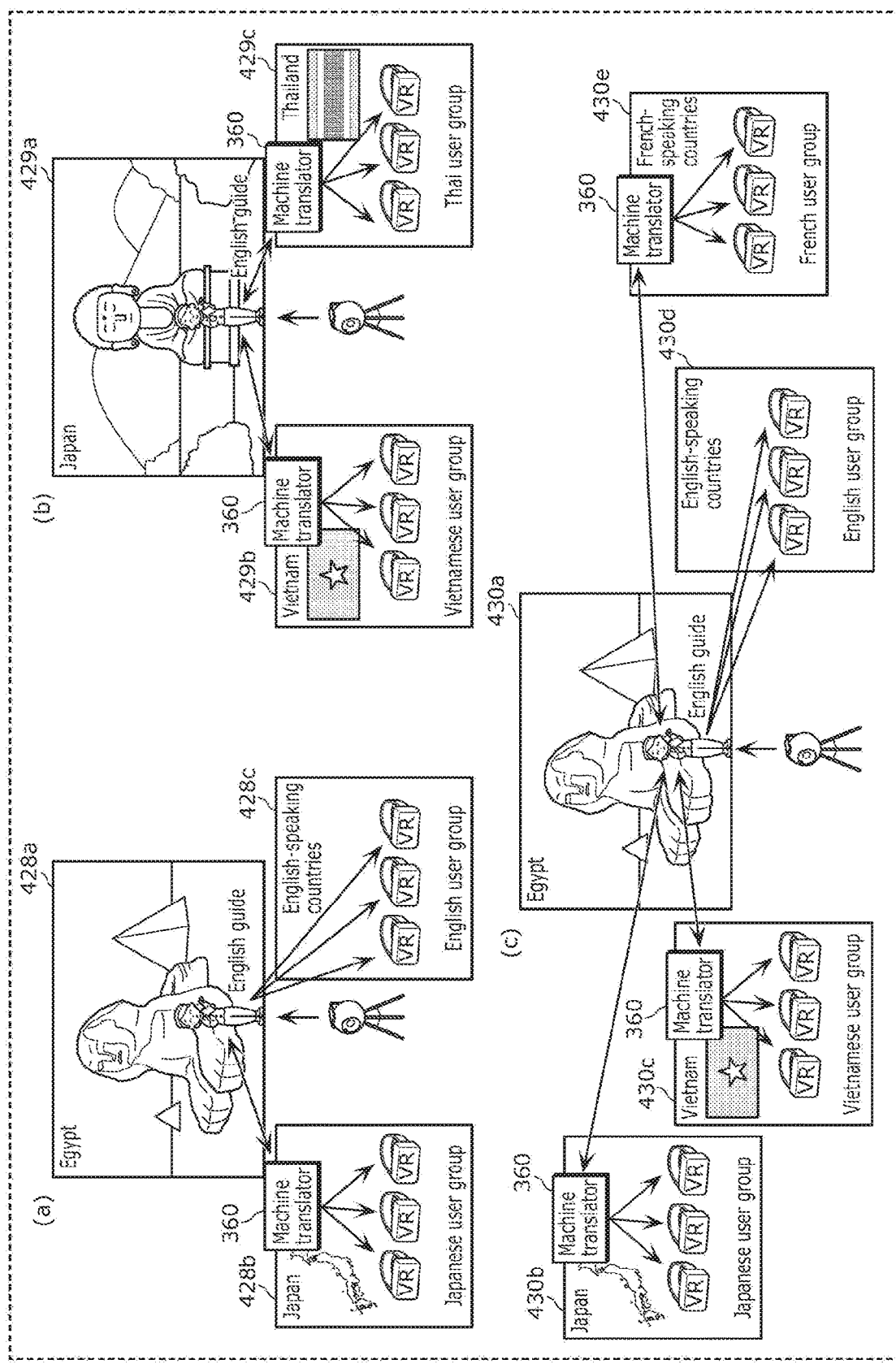
FIG. 32 is a diagram illustrating an example of a use case that is realized by the VR tourism system according to Variation 2 of Example 4.

FIG. 32 is a diagram illustrating an example of a use case that is realized by VR tourism system 5*b* according to Variation 2 of Example 4. More specifically, (a) in FIG. 32 illustrates a case where VR tourism by an English guide at a foreign (Egypt 428*a*) tourist destination is provided to not only VR users in English-speaking countries 428*c* but also to VR users in Japan 428*b* via machine translator 360, (b) in FIG. 32 illustrates a case where VR tourism by a Thai guide at a tourist destination in Japan 429*a* is provided to foreign VR users (not only VR users in Thailand 429*c* but also VR users in Vietnam 429*b* via machine translator 360), and (c) in FIG. 32 illustrates a case where VR tourism by an English guide at a foreign (Egypt 430*a*) tourist destination is provided to not only VR users in English-speaking countries 430*d* but also to VR users in Japan 430*b* via machine translator 360, to VR users in Vietnam 430*c* via machine translator 360, and to VR users in French-speaking countries 430*e* via machine translator 360.

As illustrated in FIG. 32, with VR tourism system 5*b* according to the present variation, if Japanese guide 20*a* and Japanese-English simultaneous interpreter 20*c* can cooperate with each other to provide explanations in their respective languages, the use case to be realized described with reference to FIG. 20 becomes realizable.

Figure 33:
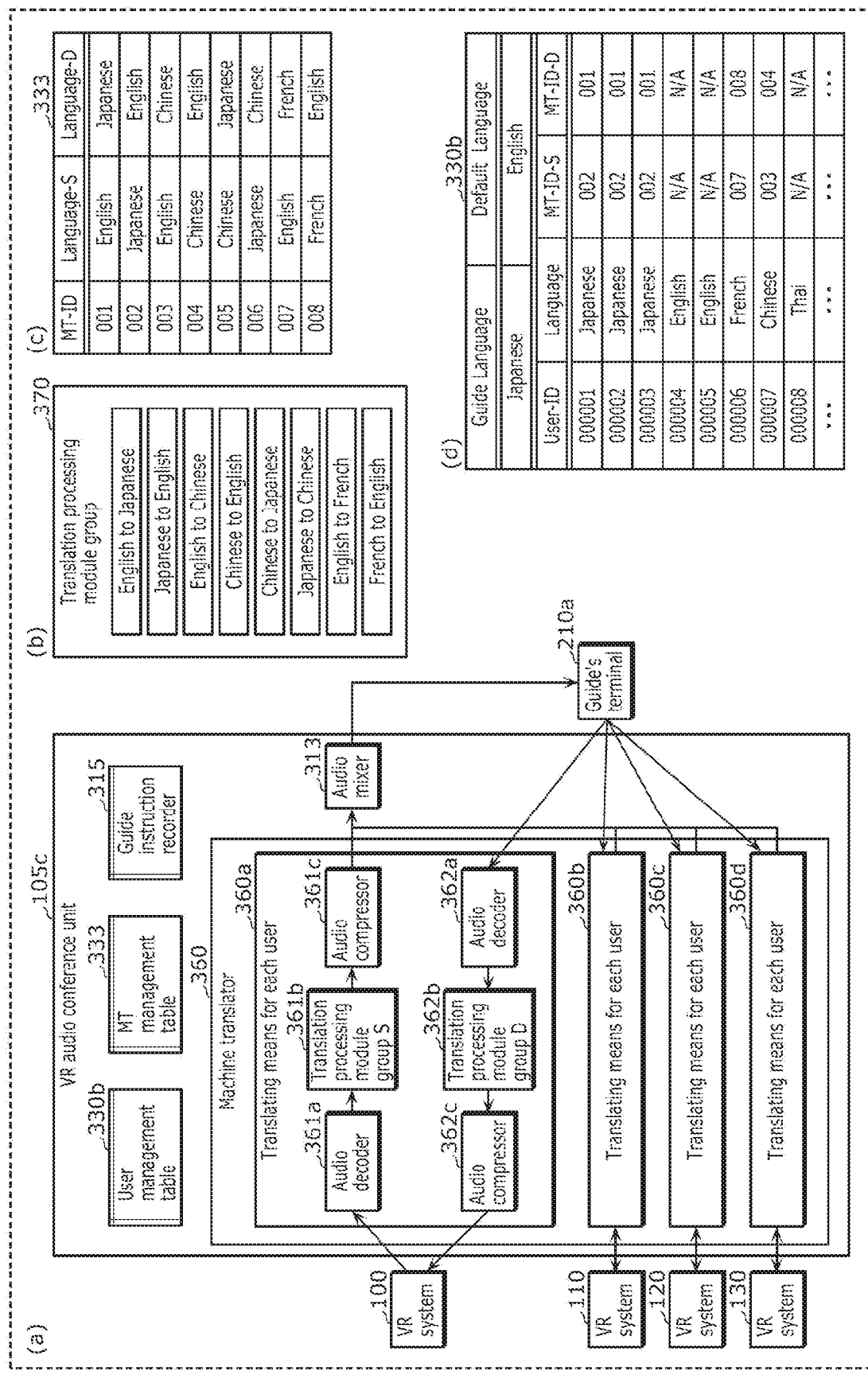
FIG. 33 is a diagram for describing detailed functions of a machine translator included in the VR tourism system according to Variation 2 of Example 4.

FIG. 33 is a diagram for describing detailed functions of machine translator 360 included in VR tourism system 5*b* according to Variation 2 of Example 4. More specifically, (a) in FIG. 33 is a block diagram illustrating a detailed configuration of VR audio conference unit 310*d*, (b) in FIG. 33 illustrates a configuration (machine translators 360*a* to 360*d*) of translation processing module group 370 included in machine translator 360 illustrated in (a) in FIG. 33, (c) in FIG. 33 illustrates machine translation management table 333 illustrated in (a) in FIG. 33, and (d) in FIG. 33 illustrates user management table 333*b* illustrated in (a) in FIG. 33.

As illustrated in (a) in FIG. 33, VR audio conference unit 310*d* includes user management table 330*b*, machine translation management table 333, a guide instruction recorder, machine translator 360, and audio mixer 313. Machine translator 360 is a group of machine translators 360*a* to 360*d* that performs machine translation from a first language to a second language for each VR user 10 to 13.

Each of machine translators 360*a* to 360*d* includes: audio decoder 361*a* that decodes audio data sent from corresponding VR system 100 or the like; translation processing module group S (361*b*) that translates the decoded audio data into a language corresponding to a guide (in the present variation, Japanese guide 20a); audio compressor 361c that compresses the obtained audio data and outputs the compressed audio data to audio mixer 313; audio decoder 362a that decodes audio data sent from guide's terminal 210a and the like; translation processing module group D (362b) that translates the decoded audio data into a language corresponding to a VR user; and audio compressor 362c that compresses the translated audio data and sends the compressed audio data to corresponding VR system 100 or the like. Audio mixer 313 mixes pieces of audio data in translated languages outputted from machine translators 360a to 360d and sends the mixed audio data to guide's terminal 210a and the like.

As illustrated in (b) in FIG. 33, translation processing module group 370 is a group of translation processing modules to be used as translation processing module group S (361b) and translation processing module group D (362b) illustrated in (a) in FIG. 33 and, as illustrated, translation processing module group 370 is constituted of modules that perform translation from various first languages to second languages such as English to Japanese ("English to Japanese") and Japanese to French ("Japanese to French").

In this example, translation processing module group 370 has eight translation functions which are digitized in machine translation management table 333 in (c) in FIG. 33. As illustrated in (a) in FIG. 33, since VR systems 100, 110, 120, and 130 of respective VR users 10 to 13 are connected to machine translators 360a to 360d, a translation processing module used for each VR user is selected based on information in user management table 330b, and a result thereof is transmitted to a guide via guide's terminal 210a and the like, the guide can listen to questions by each VR user in his/her own language.

An explanation provided by the guide is sent to machine translators 360a to 360d for each VR user via guide's terminal 210a and the like, translated by the translation processing module selected by user management table 330b, and subsequently sent to each VR user, thereby enabling each VR user to listen to tourism guidance in his/her own language regardless of the language of the guide.

In the example of user management table 330b illustrated in (d) in FIG. 33, since the language used by the guide is English and the default language is set to English, translation processing modules 01 and 02 that perform Japanese-English translation are selected for users 000001 to 000003, translation is not required for users 000004 and 000005 being English users, translation processing modules 07 and 08 that perform English-French translation are selected for user 000006 being a French user, translation processing modules 03 and 04 that perform Chinese-English translation are selected for user 000007 being a Chinese user, and while user 000008 is a Thai user, since a translation processing module for Thai is unavailable, the default language of English is selected and machine translation is not set.

Figure 34:
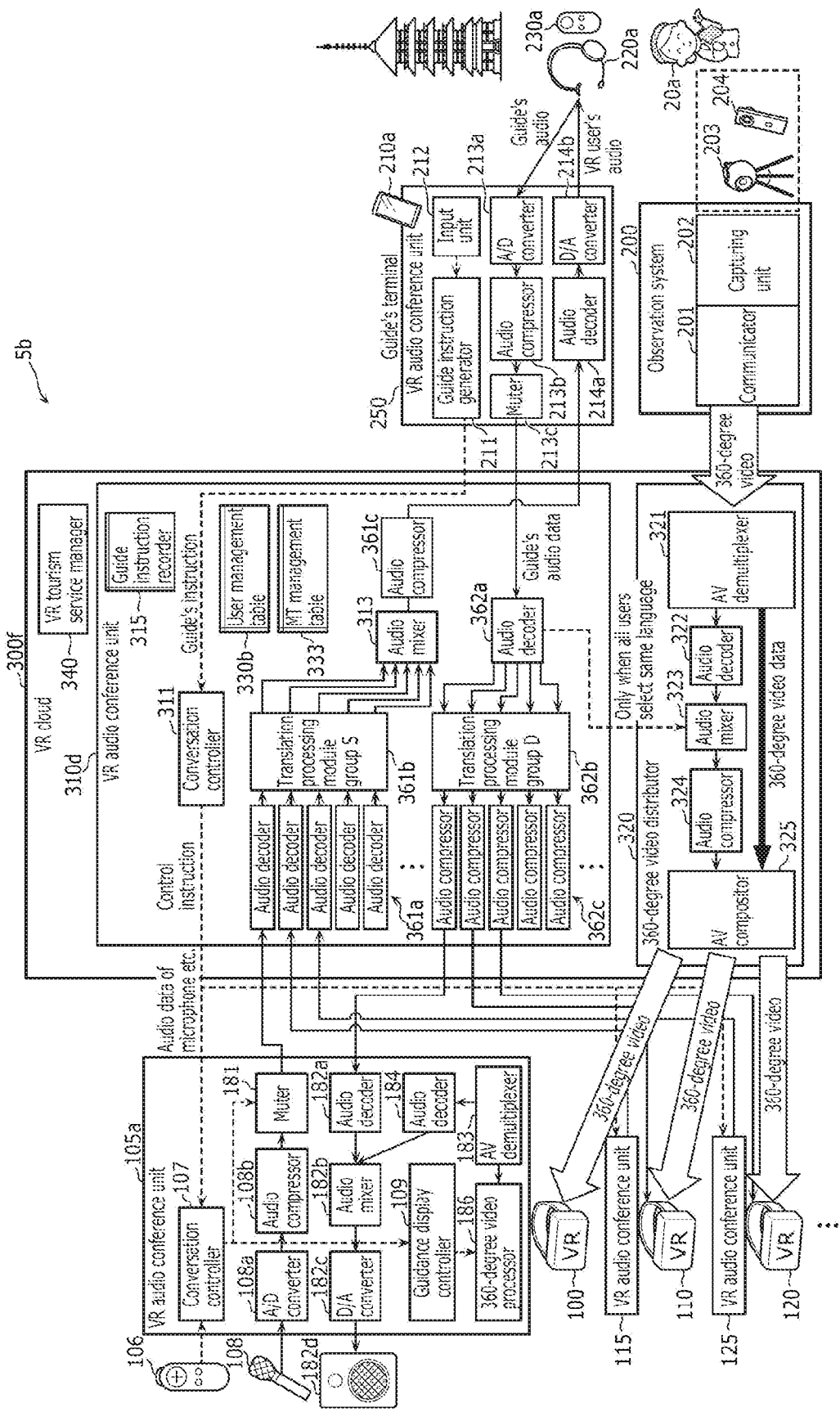
FIG. 34 is a block diagram illustrating a detailed configuration of the VR tourism system according to Variation 2 of Example 4.

FIG. 34 is a block diagram illustrating a detailed configuration of VR tourism system 5b according to Variation 2 of Example 4. VR tourism system 5b has a configuration comparable to, in the configuration of VR tourism system 2 according to Example 1 illustrated in FIG. 5, VR audio conference unit 105a according to Example 4 that performs two-way audio processing being included in place of VR audio conference unit 105 included in VR systems 100, 110, 120, and 130 and VR audio conference unit 310d with a function of performing machine translation being included in place of VR audio conference unit 310 of VR cloud 300.

In other words, VR tourism system 5b according to the present variation includes VR cloud 300f including VR audio conference unit 310d with a function of performing machine translation. VR audio conference unit 310d includes: conversation controller 311; audio decoder 361a that decodes audio data sent from VR system 100 or the like of each VR user; translation processing module group S (361b) that translates the decoded audio data into a language corresponding to a guide (in the present variation, Japanese guide 20a); audio mixer 313 that mixes a plurality of pieces of translated audio data corresponding to the respective VR users; audio compressor 361c that compresses the mixed audio data and transmits the compressed audio data to guide's terminal 210a; audio decoder 362a that decodes audio data sent from guide's terminal 210a; translation processing module group D (362b) that translates the decoded audio data into a language corresponding to each VR user; audio compressor 362c that compresses the translated audio data and transmits the compressed audio data to corresponding VR system 100 or the like; machine translation management table 333; user management table 330d; and guide instruction recorder 315.

In VR tourism system 5b according to the present variation, VR systems 100, 110, 120, and 130 of each user and translation processing module group 370 (translation processing module group S (361b) and translation processing module group D (362D)) are correctly connected based on machine translation management table 333 and user management table 330b. In addition, with respect to a VR user of a same language as the language of use of the guide (in the present variation, Japanese guide 20a), the VR user engages in conversation with the guide as-is.

In VR tourism system 5b according to the present variation, audio translation is performed by VR cloud 300f and two-way communication is performed when only a guide who speaks a language that differs from one's own language is present. However, with the exception of this point, VR tourism system 5b according to the present variation has the same functions as VR tourism system 2 according to Example 1 illustrated in FIG. 5.

Based on machine translation management table 333 and user management table 330b, VR tourism service manager 340 of VR cloud 300f selects a correct translation processing module from translation processing module group 370 using language selection of a VR user, a language of a guide, and a setting of a default language and sets values of each VR user of a translation processing module ID ("MT-ID-S") for a guide and a translation processing module ID ("MT-ID-D") for a VR user in user management table 330.

FIG. 35 is a diagram illustrating an operation flow example of VR tourism system 5b (in other words, a specific example of a video display method) according to Variation 2 of Example 4. More specifically, (a) in FIG. 35 illustrates an operation flow of VR systems 100, 110, 120, and 130 and (b) in FIG. 35 illustrates an operation flow of VR cloud 300f.

In each of VR systems 100, 110, 120, and 130, main processing, interrupt processing of input from VR users, and interrupt processing from VR cloud 300f are the same as in Example 4 (not illustrated).

In addition, in VR systems 100, 110, 120, and 130, initialization processing ((a) in FIG. 35) by which a VR user starts using VR tourism is the same as the operation flow (S100 to S105) according to Example 3 illustrated in (b) in FIG. 17 and a description thereof will be omitted.

Furthermore, in VR cloud 300f, main processing is the same as in Example 1 and Example 2 (not illustrated).

As login processing in VR cloud 300f, as illustrated in (b) in FIG. 35, VR tourism service manager 340 first acquires a user ID and a password (S210) from VR systems 100, 110, 120, and 130 and checks whether a user is a legitimate user of the present tourism service (S210).

When the user is not a legitimate user (N in S211), VR tourism service manager 340 transmits an error to corresponding VR system 100 or the like (S212) and returns to step S210.

When the user is a legitimate user (Y in S211), VR tourism service manager 340 acquires a value of language selection of the corresponding user from user management table 330b (S213).

As a result, when language selection by the corresponding user is the same as the language of guide 20 (Y in S215), VR tourism service manager 340 jumps to step S220.

When a pair of the language selection by the corresponding user and the language of the guide is in the translation processing modules (Y in S216), VR tourism service manager 340 sets a value of the selected pair as translation processing module IDs ("MT-ID-S" and "MT-ID-D") in user management table 330b of the corresponding user (S225), connects audio of corresponding VR system 100 or the like to a translation processing module corresponding to the selected translation processing module ID (S226), and jumps to step S218.

When the default language selection and the language of the guide are the same (Y in S217), VR tourism service manager 340 jumps to step S220.

When the default language selection and the language of the guide are different (N in S217) and a pair of the language of the guide and the default language is in translation processing (Y in S230), VR tourism service manager 340 sets the translation processing module ID in user management table 330b of corresponding user as the pair of the language of the guide and the default language (S231), connects audio of corresponding VR system 100 or the like to a translation processing module of the selected translation processing module ID (S232), and jumps to step S218.

When the pair of the language of the guide and the default language is not in translation processing (N in S230), VR tourism service manager 340 jumps to step S220.

In step S220, VR tourism service manager 340 sets two values of translation processing module IDs in user management table 330b of the corresponding user to "N/A" (S220), connects audio of corresponding VR system 100 or the like to guide's terminal 210a and the like (S221), and jumps to step S218.

In S218, VR tourism service manager 340 transmits the fact that preparation for use of the tourism service has been normally completed to corresponding VR system 100 or the like (S218) and ends processing.

As described above, even with VR tourism system 5b according to the present variation, explanations and conversations accommodating a plurality of languages by machine translator 360 are supported and the problem (4) described above is solved.

Although the video display system and the video display method according to the present disclosure have been described based on the foregoing embodiment and examples, the present disclosure is not limited to the embodiment and examples. Other modes constructed by applying various variations conceivable by a person skilled in the art to the present embodiment and examples or by combining a part of constituent elements of the embodiment and the examples with each other are also included in the scope of the present disclosure unless there is a deviation from the gist of the present disclosure.

For example, while an example in which the video display system according to the present disclosure is applied to a VR tourism system has been described as examples, the video display system according to the present disclosure is not limited to VR tourism systems and can also be applied to a VR experience system that provides virtual experiences such as attending a trade show, making an inspection tour, going on a factory tour, and visiting an art museum, a museum, a zoo, an aquarium, or the like.

In addition, while conversations by audio between participant 10 and the like and guide 20 and the like are assisted by audio conversation units in the embodiment and the like described above, in addition thereto or in place thereof, the conversations may be displayed as subtitles on a display unit of a VR system. To this end, for example, the VR system may be provided with an audio recognizer that recognizes audio of a conversation in real time, a video compositor that causes the display unit of the VR system to display text obtained by the audio recognizer, and the like.

In this case, questions may be accepted by guide 20 from participant 10 and the like in the form of a chat. In a similar manner to the case of audio, guide 20 may control whether to accept or reject chat input using a guide's remote controller.

Furthermore, in Example 4 that accommodates a plurality of languages, machine translators may output text to VR systems instead of outputting audio. Conceivable specific configuration examples include:

1) instead of converting a guide's audio in a single language into another language, converting the guide's audio into text in the same language and displaying on the VR system;
2) translating the audio into a language that differs from the language of use of the guide, converting the translated audio into text, and displaying on the VR system;
3) when there are a plurality of guides using different languages, converting audio of each guide into text without translating the audio and displaying the translated text on the VR system; and
4) when there are a plurality of guides using different languages, selecting a guide who uses a language that is close to the language to be converted into text, translating audio of the selected guide, converting the translated audio into text, and displaying the text on the VR system. To this end, for example, a VR cloud may be provided with an audio recognizer, a compositor that composites text obtained by the audio recognizer with a 360-degree video, and the like in addition to machine translators.

Propriety of displaying subtitles can be determined by describing and managing information on whether or not subtitles are to be used in user management table 330a in FIG. 26, user management table 330b or machine translation management table 333 in FIG. 31, or user management table 330b in FIG. 33 or by having participant 10 or the like select upon use.

INDUSTRIAL APPLICABILITY

The video display system and the video display method according to the present disclosure can be used as a video display system for providing a service for experiencing VR (virtual reality) such as a VR experience system that provides virtual experiences including going on a sightseeing tour, attending a trade show, making an inspection tour, going on a factory tour, and visiting an art museum, a museum, a zoo, an aquarium, or the like.

REFERENCE SIGNS LIST 1, 1a video display system
2, 2a, 2b, 3, 4, 4a, 5, 5a, 5b VR tourism system 10-13 participant (VR user)
20 guide (explainer)
20a Japanese guide (first explainer)
20b English guide (second explainer)
20a1 Vietnamese guide (first explainer)
20b1 Thai guide (second explainer)
20c Japanese-English simultaneous interpreter
30a-30b VR system
31 display unit
32 audio processor
33 participant's input unit
40 explainer terminal
40a first explainer terminal
40b second explainer terminal
41 explainer's input unit
50 observation system
51 camera
52 microphone
60, 60a-60d cloud
61 audio conversation unit
61a first audio conversation unit
61b second audio conversation unit
62, 62a-62d controller
63 video distributor
64 group audio conversation unit
65 audio switcher
66a-66b machine translator
70 blocking information
71 group information
72 language information
73 machine translation management information
100, 110, 120, 130 VR system
101, 111, 121, 131 display
102, 112, 122, 132 input unit
103, 113, 123, 133 VR space generator
104, 114, 124, 134 communicator
105, 105a, 105b VR audio conference unit
106 VR remote controller
106a VR remote controller with volume adjustment function
107 conversation controller
108 microphone
108a A/D converter
108b audio compressor
108c muter
109 guidance display controller
140 VR glasses
141 motion/position sensor
142 volume button
143 power switch
144 battery
145 power supply control element
146 AV input terminal
147 USB
148 wireless communication element
149 BLE (registered trademark)
150 bus converter
151 GPU
151a motion/position detector
151b video display processor
152a, 152b display element
153a, 153b lens
154 EEPROM
155 RAM
156 CPU
156a audio compressor
157a microphone
157b microphone amplifier
157c A/D converter (ADC)
158a D/A converter (DAC)
158b amplifier
158c loudspeaker
158d headphone terminal
160 computer/smartphone
161 AV output terminal
162 USB
163 communication element
164 bus converter
165 GPU
165a motion/position detector
165b VR controller
165c VR video decoder
165d guidance display generator
165e graphics generator
165f VR display controller
166 RAM
167 non-volatile memory
168 power switch
169 power supply control element
170 CPU
170a multiplexer
170b demultiplexer
170c audio decoder
170d audio playback controller
180 second muter
181 first muter
182a audio decoder
182b audio mixer
182c D/A converter
182d loudspeaker
183 AV demultiplexer
184 audio decoder
186 360-degree video processor
187 volume adjuster
200, 200a observation system
201 communicator
202 capturing unit
203 camera
204 remote controller
205 microphone
206 vehicle
210, 210a-210c smartphone
211 guide instruction generator
211a communicator/CODEC for headset
211b input processor
212 input unit
213a A/D converter
213b audio compressor
213c muter
214a audio decoder
214b D/A converter
215 audio interface
216 microphone
217 loudspeaker
219a, 219b metadata additional information
220, 220a-220c headset
230, 230a, 230b guide's remote controller
240a-240d display example using an audio control application
250 VR audio conference unit
300, 300a-300f VR cloud
310, 310a, 310d VR audio conference unit
310b first VR audio conference unit
310c second VR audio conference unit 311 conversation controller
312 audio processor
313 audio mixer
314a-314d audio decoder
315 guide instruction recorder
316 audio decoder
317 audio compressor
320, 320a 360-degree video distributor
321 AV demultiplexer
322 audio decoder
323 audio mixer
324 audio compressor
325 AV mixer
330, 330a, 330b, 331 user management table
332 guide language management table
333 machine translation management table
340 VR tourism service manager
341a-341c group audio conference unit
350 audio switcher
360, 360a-360d machine translator
361a audio decoder
361b translation processing module group S
361c audio compressor
362a audio decoder
362b translation processing module group D
362c audio compressor
370 translation processing module group
400-402 screen display example
400a "questions not allowed"
401a "questions allowed"
402a "question in progress"
410, 411 operation mode explanation table
415 state transition diagram
415a-415e state

The invention claimed is:

1. A video display system that provides a service for an experience of a virtual reality (VR), the video display system comprising:
   a VR system including a display that displays a VR space that is a video for the VR to a participant who participates in the experience, and an audio processor that receives and outputs voice from and to the participant;
   an explainer terminal that receives and outputs voice from and to an explainer, the explainer providing an explanation for the experience to the participant in the VR space;
   a video distributor that distributes a 360-degree video for generating the VR space to the VR system;
   an audio conversation unit that assists an audio conversation between the participant and the explainer via the VR system and the explainer terminal; and
   a controller that controls at least one of the VR system, the explainer terminal, the video distributor, or the audio conversation unit, wherein
   the controller manages an operation mode that selectively takes a first state in which a question from the participant to the explainer is not allowed, a second state in which the question is allowed, and a third state in which the question is being asked, and causes the VR system to display information specifying that the operation mode is the first state, the second state or the third state on the display.

2. The video display system according to claim 1, wherein the participant comprises a plurality of participants,
   the video display system comprises a plurality of VR systems respectively corresponding to the plurality of participants, and
   the controller manages the operation mode corresponding to each of the plurality of VR systems, and causes each of the plurality of VR systems to display the information on the display of the VR system.

3. The video display system according to claim 2, wherein the explainer terminal includes an explainer's input unit that receives an operation indicating whether to receive the question,
   when the explainer's input unit receives an operation of selecting the first state which is a state of not receiving the question, the controller causes each of the plurality of VR systems to display an image indicating the first state on the display of the VR system and mute audio input from a corresponding one of the plurality of participants, and
   when the explainer's input unit receives an operation of selecting the second state which is a state of receiving the question, the controller causes each of the plurality of VR systems to display an image indicating the second state on the display of the VR system and mute audio input from a corresponding one of the plurality of participants.

4. The video display system according to claim 3, wherein each of the plurality of VR systems includes a participant's input unit that receives an operation indicating a request for asking the question from a corresponding one of the plurality of participants, and
   when the participant's input unit of any one of the plurality of VR systems receives the operation indicating the request and the operation mode of the VR system corresponding to the participant's input unit that has received the operation is the second state, the controller causes the VR system to display information specifying that the operation mode is the third state instead of the second state on the display and change the operation mode to the third state by unmuting audio input from the corresponding one of the plurality of participants.

5. The video display system according to claim 4, wherein when the controller causes the VR system to unmute the audio input from the corresponding one of the plurality of participants, the controller causes each remaining VR system excluding the VR system to display the image indicating the first state on the display and change the operation mode to the first state by muting the audio input from the corresponding one of the plurality of participants.

6. The video display system according to claim 3, wherein the explainer's input unit includes a single button for receiving an operation indicating receiving the question and an operation indicating not receiving the question.

7. The video display system according to claim 4, wherein the participant's input unit includes a single button for receiving an operation indicating the request for asking the question and indicating that the question is presently being asked, and an operation indicating that the question is done.

8. The video display system according to claim 2, further comprising:
   an observation system that generates the 360-degree video by capturing a real world, wherein
   the observation system includes a microphone that obtains audio of the explainer, and
   the audio conversation unit assists an audio conversation between the plurality of participants and the explainer, using audio of the explainer obtained by the microphone.

9. The video display system according to claim 2, wherein
the controller (i) includes blocking information including permission denial information indicating whether to block the question from each of the plurality of participants to the explainer, and (ii) based on the blocking information, for each participant indicated as being blocked in the permission denial information, causes one of the plurality of VR systems corresponding to the participant to display the image indicating the first state on the display of the one of the plurality of VR systems and change the operation mode to the first state by muting audio input from the participant.

10. The video display system according to claim 2, further comprising:
a group audio conversation unit that assists a group audio conversation among two or more participants selected from the plurality of participants, wherein
the controller (i) includes group information including affiliation information indicating whether each of the plurality of participants belongs to a predetermined group, and (ii) based on the group information, causes the group audio conversation unit to assist the group audio conversation for participants belonging to a same group, each of the participants being the participant.

11. The video display system according to claim 10, wherein
when the operation mode of each of VR systems corresponding to all of the participants belonging to the same group is the first state or the second state, the controller causes the group audio conversation unit to assist the group audio conversation.

12. The video display system according to claim 11, wherein
when the operation mode of one of the VR systems corresponding to any one of the participants belonging to the same group changes from the second state to the third state, the controller causes the one of the VR systems to stop assisting the group audio conversation, and for each remaining participant excluding the participant, causes a corresponding one of the VR systems to display the image indicating the first state on the display of the corresponding one of the VR systems and mute audio input from the participant.

13. The video display system according to claim 10, wherein
while assisting the group audio conversation, the controller causes VR systems corresponding to the participants belonging to the same group to adjust a volume of at least one of audio from the explainer to the participants belonging to the same group or audio of the group audio conversation.

14. The video display system according to claim 2, wherein
the explainer terminal includes:
a first explainer terminal that receives and outputs voice from and to a first explainer, the first explainer providing the explanation in a first language; and
a second explainer terminal that receives and outputs voice from and to a second explainer, the second explainer providing the explanation in a second language,
the audio conversation unit includes:
a first audio conversation unit that assists an audio conversation between each of the plurality of participants and the first explainer via the plurality of VR systems and the first explainer terminal; and
a second audio conversation unit that assists an audio conversation between each of the plurality of participants and the second explainer via the plurality of VR systems and the second explainer terminal, and
the controller (i) includes language information that associates each of the plurality of participants with a language of the explanation desired by the participant, and (ii) based on the language information, for the participant associated with the first language, causes the first audio conversation unit to assist an audio conversation between the participant and the first explainer, and for the participant associated with the second language, causes the second audio conversation unit to assist an audio conversation between the participant and the second explainer.

15. The video display system according to claim 14, wherein
the second explainer is a simultaneous interpreter who interprets between the first language and the second language, and
the first audio conversation unit also outputs audio from the first explainer to the second explainer.

16. The video display system according to claim 15, further comprising:
an audio switcher that switches between outputting audio from the second explainer to the participant associated with the second language and outputting audio from the second explainer to the participant associated with the first explainer and the first language.

17. The video display system according to claim 14, further comprising:
a machine translator that machine translates between the first language and the second language, wherein
the explainer provides the explanation in the first language, and
the controller (i) includes language information that associates each of the plurality of participants with a language of the explanation desired by the participant, and (ii) based on the language information, causes the machine translator to allow the participant associated with the first language to have an audio conversation with the explainer without via the machine translator, and allow the participant associated with the second language to have an audio conversation with the explainer via the machine translator.

18. The video display system according to claim 17, further comprising:
a plurality of machine translators each of which translates between different languages, and
the controller (i) includes machine translation management information indicating two languages used by each of the plurality of machine translators, and (ii) based on the language information and the machine translation management information, controls the plurality of machine translators such that for each of the plurality of participants, a machine translator that translates between a language associated with the participant and the first language is selected from among the plurality of machine translators and the participant and the explainer have an audio conversation via the machine translator selected.

19. A video display method performed by a video display system that provides a service for an experience of a virtual reality (VR),
the video display system including:
a VR system including a display that displays a VR space that is a video for the VR to a participant who participates in the experience, and an audio processor that receives and outputs voice from and to the participant;

an explainer terminal that receives and outputs voice from and to an explainer, the explainer providing an explanation for the experience to the participant in the VR space;

a video distributor that distributes a 360-degree video for generating the VR space to the VR system; and an audio conversation unit that assists an audio conversation between the participant and the explainer via the VR system and the explainer terminal, and the video display method comprising:

managing an operation mode that selectively takes a first state in which a question from the participant to the explainer is not allowed, a second state in which the question is allowed, and a third state in which the question is being asked, and causing the VR system to display information specifying that the operation mode is the first state, the second state or the third state on the display.

20. The video display method according to claim 19, wherein the participant comprises a plurality of participants, the video display system comprises a plurality of VR systems respectively corresponding to the plurality of participants, and in the managing and causing, managing the operation mode corresponding to each of the plurality of VR systems and causing each of the plurality of VR systems to display the information on the display of the VR system.

21. The video display method according to claim 20, wherein the managing and causing includes: based on blocking information including permission denial information indicating whether to block the question from each of the plurality of participants to the explainer, for each participant indicated as being blocked in the permission denial information, causing one of the plurality of VR systems corresponding to the participant to display the image indicating the first state on the display of the one of the plurality of VR systems and changing the operation mode to the first state by muting audio input from the participant.

22. The video display method according to claim 20, wherein the video display system further includes a group audio conversation unit that assists a group audio conversation among two or more participants selected from the plurality of participants, and the managing and causing includes: based on group affiliation information indicating whether each of the plurality of participants belongs to a predetermined group, causing the group audio conversation unit to assist the group audio conversation for participants belonging to a same group, each of the participants being the participant.

23. The video display method according to claim 20, wherein the explainer terminal includes:

a first explainer terminal that receives and outputs voice from and to a first explainer, the first explainer providing the explanation in a first language; and a second explainer terminal that receives and outputs voice from and to a second explainer, the second explainer providing the explanation in a second language, the audio conversation unit includes:

a first audio conversation unit that assists an audio conversation between each of the plurality of participants and the first explainer via the plurality of VR systems and the first explainer terminal; and a second audio conversation unit that assists an audio conversation between each of the plurality of participants and the second explainer via the plurality of VR systems and the second explainer terminal, and the managing and causing includes: based on language information that associates each of the plurality of participants with a language of the explanation desired by the participant, for the participant associated with the first language, causing the first audio conversation unit to assist an audio conversation between the participant and the first explainer, and for the participant associated with the second language, causing the second audio conversation unit to assist an audio conversation between the participant and the second explainer.

24. The video display method according to claim 20, wherein the explainer provides the explanation in the first language, the video display system further includes a machine translator that machine translates between the first language and the second language, and the managing and causing includes: based on language information that associates each of the plurality of participants with a language of the explanation desired by the participant, causing the machine translator to allow the participant associated with the first language to have an audio conversation with the explainer without via the machine translator, and allow the participant associated with the second language to have an audio conversation with the explainer via the machine translator.

* * * * *